(12) United States Patent
Furutani et al.

(10) Patent No.: US 11,757,390 B2
(45) Date of Patent: Sep. 12, 2023

(54) MOTOR INDUCTANCE MEASUREMENT DEVICE, MOTOR DRIVE SYSTEM, AND MOTOR INDUCTANCE MEASUREMENT METHOD

(71) Applicant: Mitsubishi Electric Corporation, Tokyo (JP)

(72) Inventors: Shinichi Furutani, Tokyo (JP); Shoji Adachi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 17/637,085

(22) PCT Filed: Nov. 1, 2019

(86) PCT No.: PCT/JP2019/043059
§ 371 (c)(1),
(2) Date: Feb. 22, 2022

(87) PCT Pub. No.: WO2021/084739
PCT Pub. Date: May 6, 2021

(65) Prior Publication Data
US 2022/0286070 A1    Sep. 8, 2022

(51) Int. Cl.
*H02P 21/16* (2016.01)
*H02P 21/22* (2016.01)

(52) U.S. Cl.
CPC .............. *H02P 21/16* (2016.02); *H02P 21/22* (2016.02)

(58) Field of Classification Search
CPC .................................. H02P 21/16; H02P 21/22
(Continued)

(56) References Cited

U.S. PATENT DOCUMENTS

| 9,692,339 B2 * | 6/2017 | Rogg .................... H02P 21/32 |
| 2012/0123715 A1 | 5/2012 | Eskola et al. |

(Continued)

FOREIGN PATENT DOCUMENTS

| EP | 2453248 A1 | 5/2012 |
| EP | 3525338 A1 | 8/2019 |

(Continued)

OTHER PUBLICATIONS

JP 2006025548 A "Control Device for Generator, and Method for Setting Control Operation Constant of the Control Device" Date Published: Jan. 26, 2006 Inventor: Morimoto (Year: 2006).*

(Continued)

*Primary Examiner* — Jorge L Carrasquillo
(74) *Attorney, Agent, or Firm* — XSENSUS LLP

(57) ABSTRACT

A motor inductance measurement device comprises an energization control circuitry to perform energization control of the motor such that an AC voltage is applied to at least one axis on two-axis orthogonal rotation coordinates of the motor to cause the AC current to flow, and an inductance calculation circuitry to generate the characteristic regarding the instantaneous value of the AC magnetic flux corresponding to the instantaneous value of the AC current as the inductance information by calculating the instantaneous value of the AC magnetic flux by integrating a residual voltage which is obtained by subtracting a resistance voltage from the AC voltage, the resistance voltage being obtained from the AC current based on a detection current detected from the motor, and from resistances of the motor.

17 Claims, 18 Drawing Sheets

(58) Field of Classification Search
USPC .......................................................... 318/490
See application file for complete search history.

(56) References Cited

U.S. PATENT DOCUMENTS

| | | | |
|---|---|---|---|
| 2014/0002110 A1 | 1/2014 | Adachi et al. | |
| 2020/0382036 A1 | 12/2020 | Shiiya et al. | |

FOREIGN PATENT DOCUMENTS

| | | | |
|---|---|---|---|
| JP | 2006-25548 A | 1/2006 | |
| JP | 4056237 B2 | 3/2008 | |
| JP | 5231792 B2 | 7/2013 | |
| JP | 5332667 B2 | 11/2013 | |
| JP | 5523584 B2 | 6/2014 | |
| JP | 2018-186640 A | 11/2018 | |
| JP | 2019-140807 A | 8/2019 | |
| WO | 2019/163020 A1 | 8/2019 | |

OTHER PUBLICATIONS

JP 5332667 B2 "Induction Motor Control Device" Date Published: Nov. 6, 2013 Inv: Kodaka (Year: 2013).*

JP 2018186640 A "Motor Controller and Method for Controlling Motor Controller" Date Published: Nov. 22, 2018 Inv: Nishimura (Year: 2018).*

International Search Report and Written Opinion dated Jan. 28, 2020, received for PCT Application PCT/JP2019/043059, Filed on Nov. 1, 2019, 13 pages including English Translation.

* cited by examiner

FIG. 16 data3

| No | MOTOR INFORMATION | MOTOR INDUCTANCE INFORMATION SET |
|---|---|---|
| 1 | InfM1 | InfLs1 (data1s-1) |
| 2 | InfM2 | InfLs2 (data1s-2) |
| 3 | InfM3 | InfLs3 (data1s-3) |
| ⋮ | ⋮ | ⋮ |
| n | InfMn | InfLsn (data1s-n) |

FIG. 17 data3

| No | MOTOR INFORMATION | MOTOR INDUCTANCE INFORMATION SET |
|---|---|---|
| 1 | InfM1 | InfLs1 (data2&Rns-1) |
| 2 | InfM2 | InfLs2 (data2&Rns-2) |
| 3 | InfM3 | InfLs3 (data2&Rns-3) |
| ⋮ | ⋮ | ⋮ |
| n | InfMn | InfLsn (data2&Rns-n) |

MOTOR INDUCTANCE MEASUREMENT DEVICE, MOTOR DRIVE SYSTEM, AND MOTOR INDUCTANCE MEASUREMENT METHOD

CROSS-REFERENCE TO RELATED APPLICATION

The present application is based on PCT filing PCT/JP2019/043059, filed Nov. 1, 2019, the entire contents of which are incorporated herein by reference.

TECHNICAL FIELD

The present application relates to a motor inductance measurement device.

BACKGROUND ART

In a motor drive system for driving a motor (electric motor), various motor control methods for controlling the motor have been proposed. In many cases, parameters for the motor are required to construct a control system. In particular, an inductance value of the motor is a frequently used parameter. When a current control system of the motor is constructed, the value of the inductance of the motor is used for calculating a current control gain. This is because the current control gain is set considering an electric time constant determined by a winding resistance value and the inductance value of the motor. Note that the parameters of the motor are referred to as motor parameters as appropriate.

The value of motor inductance is an important parameter, however, there may be a difference between the value estimated in a motor design and an actual value. Further, when the motor is operated, saturation of magnetic flux occurs due to energization, which may result in a change in the value of the inductance. Generally, in a motor drive system, an inductance measurement mode is provided, and when the value of the inductance changes, a current is supplied to the motor in a predetermined voltage application pattern, information on the motor voltage and the motor current is detected, and the value of the inductance is measured by calculating the information. A number of techniques for measuring the inductance of the motor are known, and, for example, Patent Document 1 discloses a technique for measuring a leakage inductance.

CITATION LIST

Patent Document

Patent Document 1: Japanese Patent No. 5332667 (Paragraph 0023 to Paragraph 0035, FIG. 1)

SUMMARY OF INVENTION

Problems to be Solved by Invention

In the technique for measuring the leakage inductance of the control device for the induction motor described in Patent Document 1, an AC current is supplied to the motor, and then an effective value of an AC component of the motor voltage, an effective value of an AC component of the motor current, and an effective power are calculated at the time. After that, the leakage inductance is measured by the calculation using both the effective values and the effective power. It says that the leakage inductance can be measured highly accurately because the current flows actually through the motor.

However, when the technique of Patent Document 1 for measuring the leakage inductance is used, following problems exist. In the technique of Patent Document 1 for measuring the leakage inductance, an AC current is supplied by applying an AC voltage on either axis on two-axis orthogonal rotation coordinates. AC components are extracted from the motor voltage and the motor current on the two-axis orthogonal rotation coordinates at that time, and their effective values are calculated. Patent Document 1 does not show a specific calculation procedure of the effective value calculation, but integral processing over one cycle of the AC energization with respect to the voltage and the current during the AC energization is indispensable when the effective value calculation is performed. Therefore, information on the instantaneous value of the current or the instantaneous value of the voltage with respect thereto is lost. Similarly, in the leakage inductance calculated from the result of the effective value calculation, the technique of Patent Document 1 for measuring the leakage inductance has a problem that the leakage inductance with respect to the instantaneous change in the current cannot be measured.

Here, a situation is assumed that a constant DC current and an AC current superimposed on the DC current flow on rotation coordinates, which is often the case when the motor is actually driven. Specifically, a situation can be considered in which a load device is driven with a higher speed control response while steady load torque is generated from the motor. In order to enhance the speed control response, the current control process, which forms a minor loop, also needs to be highly responsive, that is, to be fast. Thus, in addition to the DC current responsible for the steady load torque, a fast-changing AC current that is responsible for the speed control response is to be superimposed. In such an operating state, the technique of Patent Document 1 for measuring the leakage inductance cannot measure the leakage inductance corresponding to the fast-changing AC current.

From a point of view of the motor control model, inductance is a coupling factor between the motor current and the motor magnetic flux. The authors (inventors) of the present specification have found that the motor magnetic flux corresponding to the AC current varies complicatedly in response to the instantaneous change of the current with the influence of saturation or hysteresis characteristics in the flux, and therefore the inductance also varies complicatedly (Phenomenon 1). Therefore, in the technique of Patent Document 1 for measuring the leakage inductance, since the measurement accuracy of the inductance value corresponding to the instantaneous value of the current is low, the inductance value being alternating due to the phenomenon 1. Thus, it is sometimes difficult to improve the current control response. If the current control response cannot be improved, the speed response cannot be improved, and it becomes difficult to drive the load device with a high-speed control response. Therefore, it is important to accurately measure the inductance of the motor or the characteristic between the motor current and the motor magnetic flux, which corresponds to the inductance. Here, the characteristic between the motor current and the motor magnetic flux is referred to as motor inductance information.

It is an object of the technique disclosed in the present specification to provide a motor inductance measurement device capable of accurately measuring motor inductance information corresponding to an inductance of a motor.

Means for Solving Problems

An example of a motor inductance measurement device disclosed in the specification of the present application is a motor inductance measurement device that measures inductance information containing a characteristic of an instantaneous value of an AC magnetic flux corresponding to an instantaneous value of an AC current flowing in a motor. The motor inductance measurement device comprises an energization control unit to perform energization control of the motor such that an AC voltage is applied to at least one axis on two-axis orthogonal rotation coordinates of the motor to cause the AC current to flow, and an inductance calculation unit to generate the characteristic of the instantaneous value of the AC magnetic flux corresponding to the instantaneous value of the AC current as the inductance information by calculating the instantaneous value of the AC magnetic flux by integrating a residual voltage which is obtained by subtracting a resistance voltage from the AC voltage, the resistance voltage being obtained from the AC current of the motor based on a detection current detected from the motor, and from resistances of the motor.

Effect of Invention

An example of the motor inductance measurement device disclosed in the specification of the present application calculates the AC magnetic flux based on the resistance voltage and the AC voltage, the resistance voltage being obtained from the AC current of the motor based on the detection current, and from the resistances of the motor, and generates the characteristic of the instantaneous value of the AC magnetic flux corresponding to the instantaneous value of the AC current as the inductance information, so that the motor inductance information corresponding to the inductance of the motor can be measured with a high accuracy.

BRIEF DESCRIPTION OF DRAWINGS

FIG. 16 is a diagram showing a first example of accumulated data in which motor inductance information is accumulated.

FIG. 17 is a diagram showing a second example of the accumulated data in which motor inductance information is accumulated.

MODES FOR CARRYING OUT INVENTION

Embodiment 1

Figure 1:
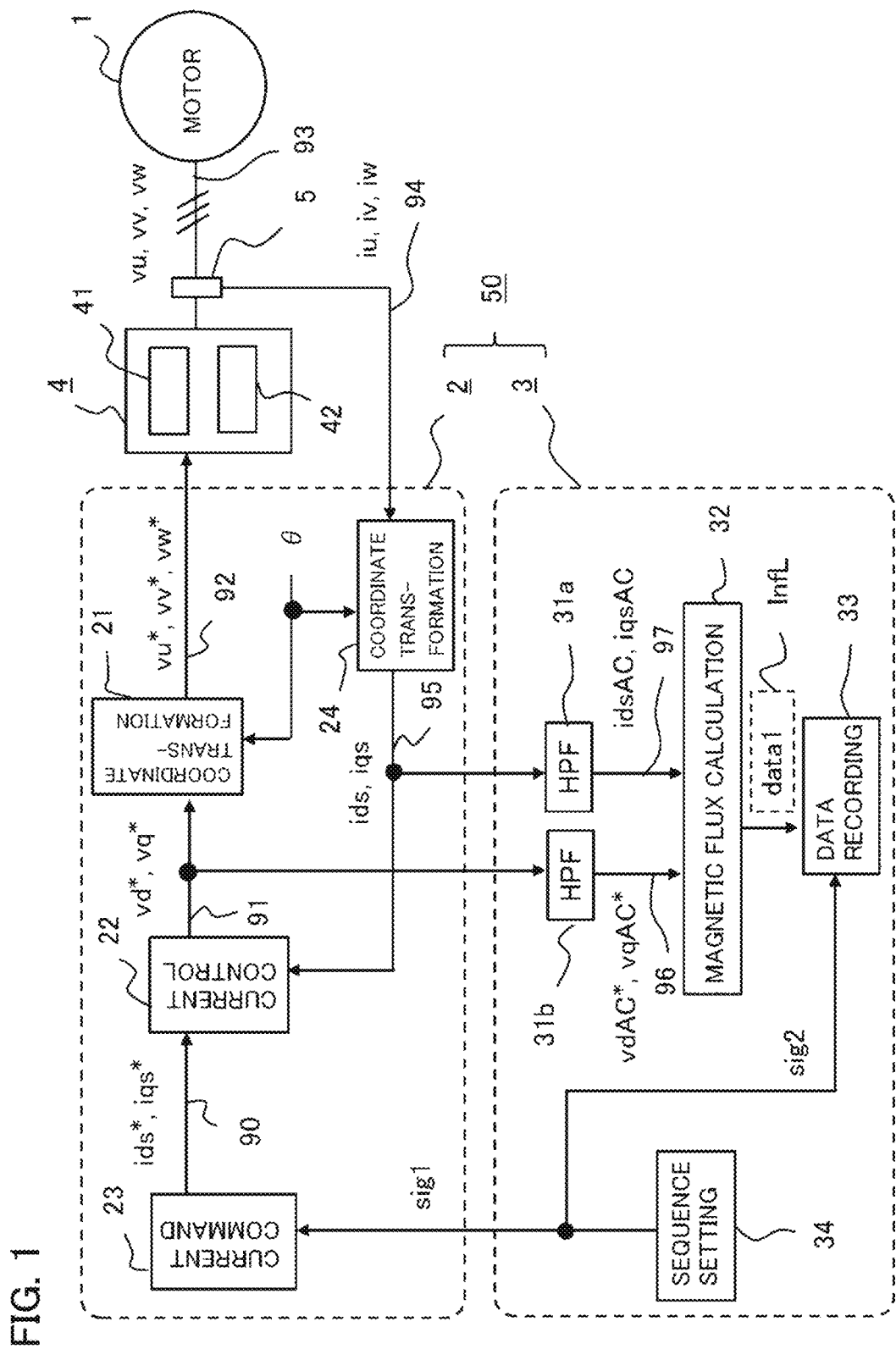
FIG. 1 is a diagram showing a configuration of a motor inductance measurement device according to Embodiment 1.
Figure 2:
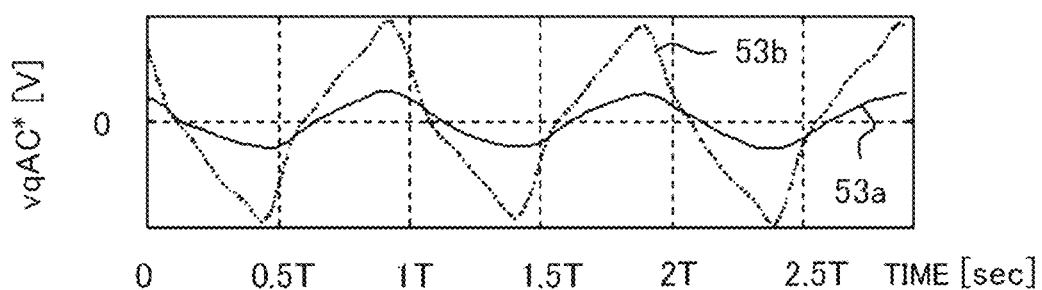
FIG. 2 is a diagram showing a measured waveform of an AC component vqAC* in a q-axis voltage command vq* of FIG. 1.
Figure 3:
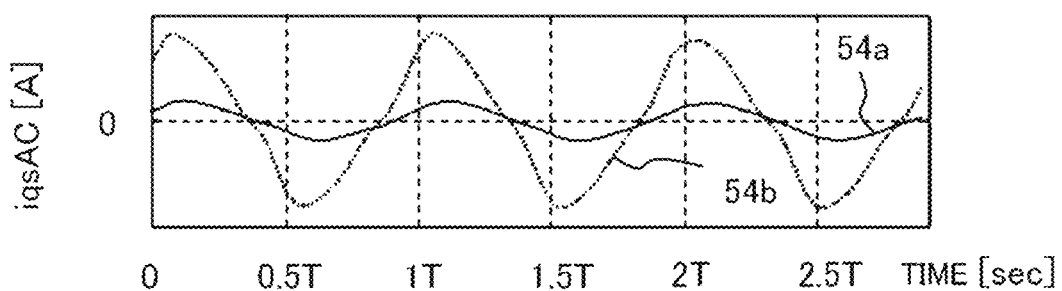
FIG. 3 is a diagram showing a measured waveform of an AC component iqsAC in a q-axis current iqs of FIG. 1.
Figure 4:
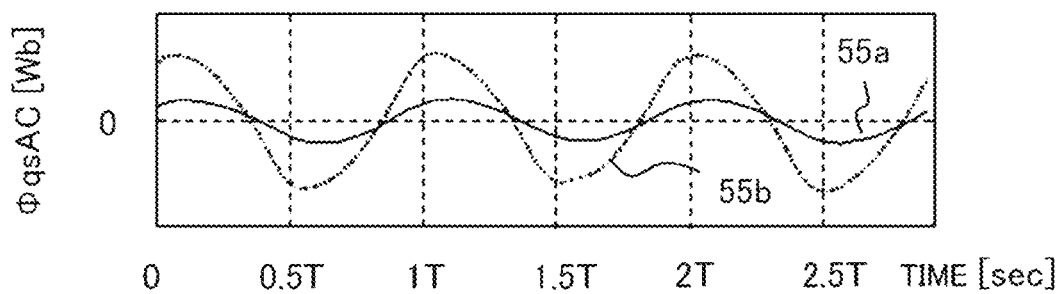
FIG. 4 is a diagram showing a measured waveform of an AC component ΦqsAC of a q-axis magnetic flux Φqs calculated by a magnetic flux calculation unit of FIG. 1.
Figure 5:
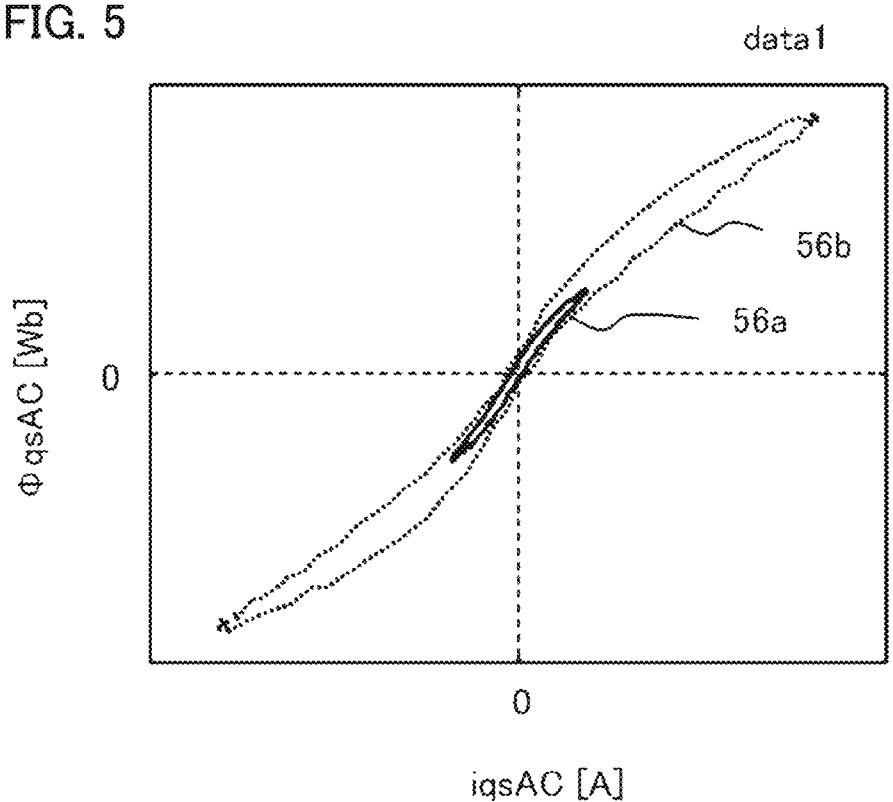
FIG. 5 is a diagram showing loop-shaped flux data data1 of FIG. 1.
Figure 6:
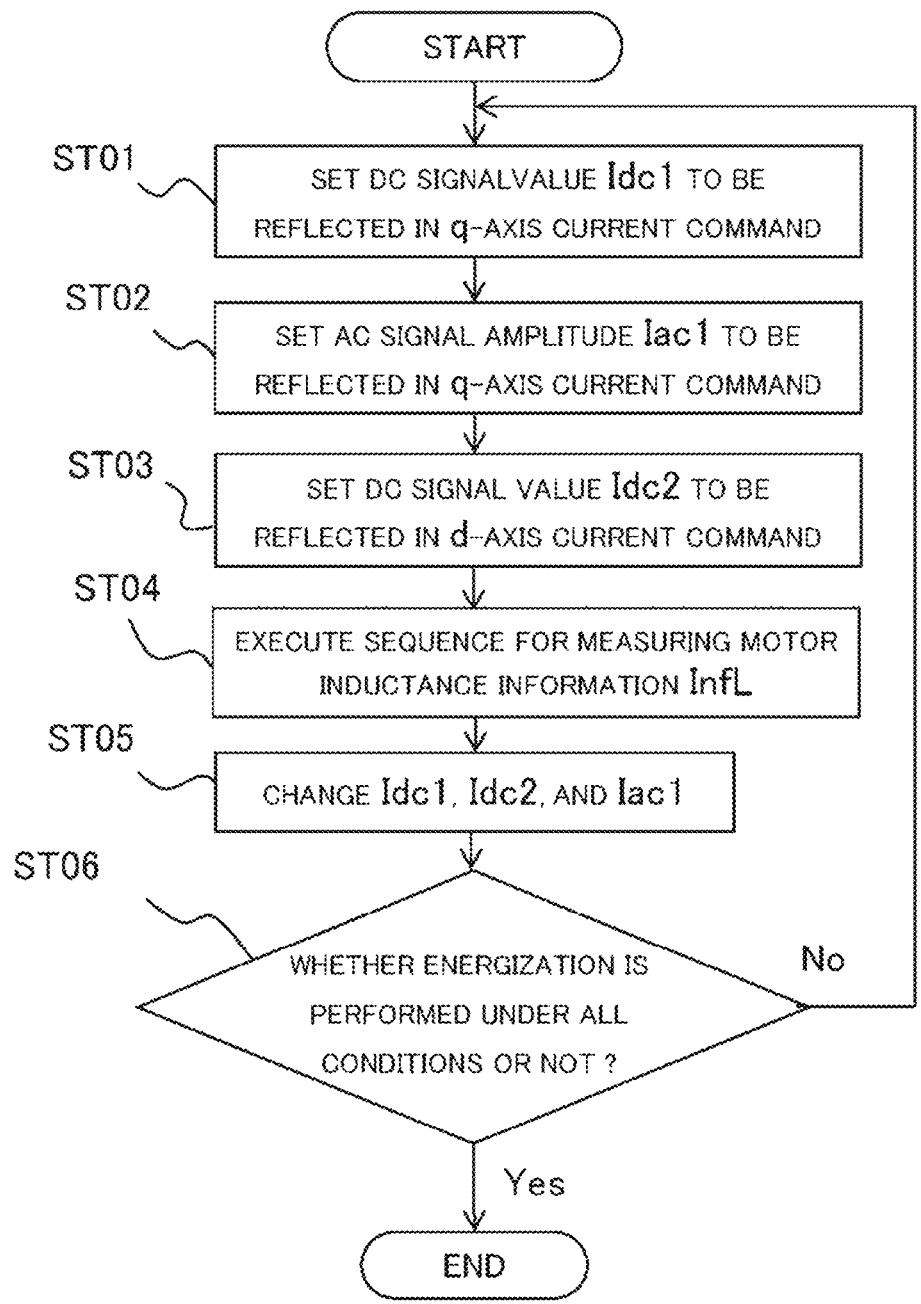
FIG. 6 is a diagram showing an operation flow of a sequence setting unit of FIG. 1.

A motor inductance measurement device 50 of Embodiment 1 will be described referring to the drawings. The same or corresponding components are denoted by the same reference numerals, and a repetitive description may be omitted. In other embodiments, the same or corresponding components are denoted by the same reference numerals, and a repetitive description may be omitted. FIG. 1 is a diagram showing a configuration of a motor inductance measurement device according to Embodiment 1. FIG. 2 is a diagram showing a measured waveform of an AC component vqAC* in a q-axis voltage command vq* of FIG. 1. FIG. 3 is a diagram showing a measured waveform of an AC component iqsAC in a q-axis current iqs of FIG. 1. FIG. 4 is a diagram showing a measured waveform of an AC component ΦqsAC of a q-axis magnetic flux Φqs calculated by a magnetic flux calculation unit of FIG. 1. FIG. 5 is a diagram showing loop-shaped flux data data1 of FIG. 1, and FIG. 6 is a diagram showing an operation flow of a sequence setting unit of FIG. 1. The motor inductance measurement device 50 does not directly measure a value of an inductance but measures a relationship or a characteristic between a motor current and a corresponding motor magnetic flux as motor inductance information InfL corresponding to the inductance. Motor control performance can be improved by utilizing the motor inductance information InfL.

The motor inductance measurement device 50 includes an energization control unit 2 and an inductance calculation unit 3. Note that, in FIG. 1, in order to illustrate a method for measuring the motor inductance information InfL, a motor 1, an inverter device 4, and a current sensor 5 are connected. The inverter device 4 includes an inverter 41 and a control signal generator 42 for controlling the inverter 41. The control signal generator 42 receives voltage commands (vu*, vv*, vw*) and performs PWM (Pulse Width Modulation) processing to generate commands for controlling the inverter 41. Since the details are described in "Practical theory and design of AC servo system", Sogo Denshi Shuppansha, 1990 (Document A), the description thereof will be omitted here. Although the motor 1 is described as an induction motor, the motor inductance information InfL can also be measured in a synchronous motor. Note that, in the present embodiment, although a configuration is described in which the inverter device 4 receives a voltage command 92 and performs the PWM processing, the motor inductance measurement device 50 may be configured to perform the PWM processing and output a switching command to drive the inverter device 4. The voltage command 92 includes an amplitude command value of an AC voltage and a magnitude command value of a DC voltage. The DC voltage is a bias voltage on which the AC voltage is superimposed. Note that other voltage commands to be described later also include amplitude command values of the AC voltage and magnitude command values of the DC voltage.

The energization control unit 2 performs energization control processing such that a preset current flows in the motor 1. The energization control unit 2 includes a coordinate transformation unit 21, a current control unit 22, a current command output unit 23, and a coordinate transformation unit 24. The energization control unit 2 which is constructed on the two-axis orthogonal rotation coordinates of a dq-axis controls the inverter device 4 such that a current in response to a current command 90 output from the current command output unit 23 flows. The current command 90 has two components, namely, a d-axis current command ids* and a q-axis current command iqs*. The vector notation of the current command 90 is (ids*, iqs*). Since the current command 90 is a current command for two axes (d-axis and q-axis) on the two-axis orthogonal rotation coordinates, it can also be expressed as a two-axis current command. The current command (ids*, iqs*) is expressed as a dq-axis current command (ids*, iqs*) as appropriate. The current command 90 includes an amplitude command value of an AC current and a magnitude command value of a DC current. The DC current is a bias current on which the AC current is superimposed. Note that other current commands to be described later include amplitude command values of the AC current and magnitude command values of the DC current. In the inverter device 4, a drive voltage 93 in accordance with the current command 90 is applied to the motor 1 to supply power. The drive voltage 93 has three components, namely, a u-phase drive voltage vu, a v-phase drive voltage vv, and a w-phase drive voltage vw. The vector notation of the drive voltage 93 is (vu, vv, vw). Control of the inverter device 4 requires the PWM processing or the like, but since it is a known technique, a description thereof will be omitted. The current sensor 5 detects a detection current 94 which is a current flowing in the motor 1. The detection current 94 has three components, namely, a u-phase detection current iu, a v-phase detection current iv, and a w-phase detection current iw. The vector notation of the detection current 94 is (iu, iv, iw).

The coordinate transformation unit 24 converts the detection current 94 into a dq-axis current 95, which is a detection current on the two-axis orthogonal rotational coordinates of the dq-axis. The dq-axis current 95 has two components, namely, a d-axis current ids and a q-axis current iqs. The vector notation of the dq-axis current 95 is (ids, iqs). Since the dq-axis current 95 is the current flowing in the two axes (d-axis and q-axis) on the two-axis orthogonal rotation coordinates, it can also be expressed as a two-axis current. The current control unit 22 receives the current command 90 and the dq-axis current 95, performs processing such as proportional integral (PI) control and non-interference control, and outputs a voltage command 91. The voltage command 91 has two components, namely, a d-axis voltage command vd* and a q-axis voltage command vq*. The vector notation of the voltage command 91 is (vd*, vq*). The current control unit 22 generates the amplitude command value of the AC voltage and the magnitude command value of the DC voltage such that the AC current and the DC current commanded by the current command 90 flow in the motor 1. The DC current flowing in the motor 1 is controlled by the DC voltage. The processing and the detailed configuration of the current control unit 22 are a known technology. For example, when inductance measurement is performed by energizing an induction motor, current control for the induction motor may be performed, and the details are described in Document A.

The coordinate transformation unit 21 converts the voltage command 91 into the voltage command 92 of three-phase and outputs it to the inverter device 4. The voltage command 92 has three components, namely, a u-phase voltage command vu*, a v-phase voltage command vv*, and a w-phase voltage command vw*. The vector notation of the voltage command 92 is (vu*, vv*, vw*).

The energization control unit 2 repeats the processing of the coordinate transformation unit 21, the current control unit 22, the current command output unit 23, and the coordinate transformation unit 24, and operates such that a desired current flows in the motor 1. Note that, although the calculation method of the coordinate transformation phase θ used in the coordinate transformation unit 21 and the coordinate transformation unit 24 differs depending on the motor control method, it is an estimated value of a motor rotor magnetic pole position or a phase of the rotor magnetic flux, etc. Further, since the motor inductance measurement method of Embodiment 1 can be implemented independently of the rotational speed of the motor 1, the description of other processing such as speed control is omitted.

Next, the inductance calculation unit 3 will be described. The configuration and the operation of the inductance calculation unit 3 in the case where the motor 1 is an induction motor and the motor inductance information InfL in a q-axis circuit of the motor 1 is measured will be described. The motor inductance information InfL measured at this time is information corresponding to a leakage inductance of the motor 1 which is the induction motor. Therefore, the motor inductance measurement device 50 of Embodiment 1 measures the motor inductance information InfL by causing a constant current on the d-axis side and an AC current on the q-axis side on the two-axis orthogonal rotation coordinates to flow. Therefore, the current command output unit 23 of the energization control unit 2 outputs a DC value to the d-axis current command ids* and the sum of an AC value and a DC value to the q-axis current command iqs* as the current command 90.

The inductance calculation unit 3 includes high-pass filters 31a and 31b, a magnetic flux calculation unit 32, a data recording unit 33, and a sequence setting unit 34. The high-pass filter 31b receives the voltage command 91 as an input and outputs a voltage command AC component 96 which is an AC component contained in the voltage command 91. The voltage command AC component 96 include two components, namely, a d-axis voltage command AC component vdAC* and a q-axis voltage command AC component vqAC*. The vector notation of the voltage command AC component 96 is (vdAC*, vqAC*). The high-pass filter 31a receives the dq-axis current 95 as an input and outputs a dq-axis current AC component 97 which is an AC component contained in the dq-axis current 95. The dq-axis current AC component 97 includes two components, namely, a d-axis current AC component idsAC and a q-axis current AC component iqsAC. The vector notation of the dq-axis current AC component 97 is (idsAC, iqsAC). Here, since the AC current is applied to the q-axis side, vqAC* and iqsAC are used.

The flux calculation unit 32 calculates a q-axis magnetic flux AC component (qsAC to be described later on the basis of the voltage command AC component 96 and the dq-axis current AC component 97, and generates the motor inductance information InfL. The data recording unit 33 records the motor inductance information InfL. The sequence setting unit 34 outputs a measurement execution signal sig1 to the current command output unit 23 and a recording execution signal sig2 to the data recording unit 33. The motor inductance information InfL is loop-shaped magnetic flux data data1, for example, the characteristics 56a and 56b shown in FIG. 5. Next, a description will be given on a method in which the magnetic flux calculation unit 32 calculates the q-axis magnetic flux AC component ΦqsAC.

Since the motor 1 is an induction motor, a state equation of the q-axis current iqs is given by Equation (1) from Document A. In Equation (1), the measurement target is a leakage inductance σLs. A slip frequency ωse is given by Equation (2). Note that Equation (1) is an equation in the case where the d-axis is in the direction of the rotor magnetic flux of the induction motor, and the rotor magnetic flux in the q-axis direction is zero.

[Mathematical 1]

$$\frac{di_{qs}}{dt} = -\omega \cdot i_{ds} + \left(-\frac{R_s}{\sigma L_s} - \frac{R_r \cdot (1-\sigma)}{\sigma L_r}\right) \cdot i_{qs} + \left(-\frac{\omega_{re} \cdot M}{\sigma L_s L_r}\right) \cdot \Phi_{dr} + \frac{1}{\sigma L_s} \cdot v_q \quad (1)$$

[Mathematical 2]

$$\omega_{se} = \frac{M \cdot R_r}{L_r} \cdot \frac{i_{qs}}{\Phi_{dr}} \quad (2)$$

The relationship among a power frequency ω, the slip frequency ωse and an electrical angular frequency ωre is given by Equation (3). A leakage coefficient σ is obtained by Equation (4). A d-axis rotor flux Φdr is given by Equation (5).

[Mathematical 3]

$$\omega = \omega_{re} + \omega_{se} \quad (3)$$

[Mathematical 4]

$$\sigma = 1 - \frac{M^2}{L_s \cdot L_r} \quad (4)$$

[Mathematical 5]

$$\Phi_{dr} = M \cdot i_{ds} \quad (5)$$

Where vq is a q-axis voltage, Rs is a stator resistance, and Rr is a rotor resistance. Ls is a stator inductance, Lr is a rotor inductance, and M is a mutual inductance. Note that the electrical angular frequency ωre is a value obtained by multiplying a rotational speed of the motor by the number of pole pairs.

By combining and transforming Equations (1) to (5), Equation (6) is obtained.

[Mathematical 6]

$$\sigma L_s \cdot \frac{di_{qs}}{dt} = \left(-R_s - \frac{\sigma L_r}{\sigma L_s} \cdot R_r\right) \cdot i_{qs} + \omega_{re} \cdot L_s \cdot i_{ds} + v_q \quad (6)$$

Since a motor torque is generated in proportion to the q-axis current iqs, when the q-axis current iqs contains the AC component, namely, the q-axis current AC component iqaAC, the motor torque changes accordingly, and the rotational speed of the motor 1 also changes. In Equation (6), the rotational speed of the motor 1 corresponds to an electrical angular speed, namely, the electrical angular frequency ωre. However, when a frequency of the q-axis current AC component iqsAC is sufficiently high, the rotational speed of the induction motor cannot respond to the torque generated by the q-axis current AC component iqsAC, which is the AC current, due to the inertia of the motor rotor. Therefore, the electrical angular speed (electrical angular frequency ωre) corresponding to the rotational speed of the motor becomes constant. Therefore, only the AC component is extracted in the case where the frequency of AC energization to the q-axis current iqs is sufficiently high, Equation (7) can be obtained. Here, it is assumed that the stator inductance Ls and the rotor inductance Lr are substantially equal to each other. vqAC is a q-axis voltage AC component of the q-axis voltage vq.

[Mathematical 7]

$$\sigma L_s \cdot \frac{di_{qsAC}}{dt} = -(R_s + R_r) \cdot i_{qsAC} + v_{qAC} \quad (7)$$

The q-axis magnetic flux AC component ΦqsAC is represented by Equation (8), and when Equation (7) is transformed using Equation (8), Equation (9) is obtained.

[Mathematical 8]

$$\Phi q_{sAC} = \sigma L_s \cdot i_{qsAC} \quad (8)$$

[Mathematical 9]

$$\Phi_{qsAC} = \int \{v_{qAC} - (R_s + R_r) \cdot i_{qsAC}\} \cdot dt \quad (9)$$

Here, the stator resistance Rs and the rotor resistance Rr are assumed to be known. The q-axis voltage AC component vqAC is substituted with the q-axis voltage command AC component vqAC*, and the q-axis current AC component iqsAC is obtained from the detection current 94 detected by the current sensor 5. Therefore, the right side term of Equation (9) can be calculated. The magnetic flux calculation unit 32 performs the calculation of Equation (9) to generate the q-axis magnetic flux AC component ΦqsAC. Further, the relationship between the q-axis flux AC component ΦqsAC and the q-axis current AC component iqsAC, namely, the characteristic between the q-axis magnetic flux AC component ΦqsAC and the q-axis current AC component iqsAC, should be extracted to calculate the leakage inductance σLs of the measurement target.

Equation (9) shows that the AC magnetic flux can be calculated by integrating a residual voltage obtained by subtracting a resistance voltage, namely, (Rs+Rr)·iqsAC, by the q-axis current AC component iqsAC that is the AC current from the q-axis voltage AC component vqAC that is the applied AC voltage. The characteristics 56a and 56b shown in FIG. 5 are examples of the characteristics representing the instantaneous values of the AC magnetic flux corresponding to the instantaneous values of the AC current in a certain induction motor. The characteristics 56a and 56b are in loop-shaped, and they each are magnetic flux data data1, that is, motor inductance information InfL. The motor inductance information InfL can be said to be a characteristic representing the instantaneous value of the AC magnetic flux corresponding to the instantaneous value of the AC current.

A specific example of the motor inductance information InfL will be described. The measurement results for a certain induction motor are shown in FIG. 2 to FIG. 5. FIG. 2 shows waveforms 53a and 53b of the q-axis voltage command AC component vqAC*, FIG. 3 shows waveforms 54a and 54b of the q-axis current AC component iqsAC, and FIG. 4 shows waveforms 55a and 55b of the q-axis magnetic flux AC component ΦqsAC. In FIG. 2 to FIG. 4, the horizontal axis represents time [sec], and the vertical axes in FIG. 2 to FIG. 4 represent the voltage [V] of the q-axis voltage command AC component vqAC*, the current [A] of the q-axis current AC component iqsAC, and the magnetic flux [Wb] of the q-axis magnetic flux AC component ΦqsAC, respectively. In FIG. 2 to FIG. 4. T represents the period of the AC component. FIG. 5 shows the characteristics 56a and 56b of the loop-shaped magnetic flux data data1, which is an example of the motor inductance information InfL. In FIG. 5, the horizontal axis represents the current [A] of the q-axis current AC component iqsAC, and the vertical axis represents the magnetic flux [Wb] of the q-axis magnetic flux AC component ΦqsAC.

The q-axis voltage command AC component vqAC* in FIG. 2 and the q-axis current AC component iqsAC in FIG. 3 are measurement results of signals corresponding to vqAC and iqsAC as parameters on the right side of Equation (9), respectively. The q-axis magnetic flux AC component ΦqsAC in FIG. 4 is a result of the calculation using Equation (9). Here, vqAC* is used as a substitute for vqAC in the calculation of Equation (9). FIG. 2 to FIG. 4 show cases where the amplitude of the AC component is small and large. The waveforms 53a, 54a and 55a correspond to the case where the amplitude of the AC component contained in the q-axis current command iqs* is small and the waveforms 53b, 54b and 55b correspond to the case where the amplitude of the AC component is large. The characteristic 56a in FIG. 5 is the case where the amplitude of the AC component contained in the q-axis current command iqs* is small, and is a characteristic based on the waveform 54a of the q-axis current AC component iqsAC and the waveform 55a of the q-axis magnetic flux AC component ΦqsAC. The characteristic 56b shown in FIG. 5 is the case where the amplitude of the AC component is large, and is a characteristic based on the waveform 54b of the q-axis current AC component iqsAC and the waveform 55b of the q-axis magnetic flux AC component ΦqsAC.

According to Equation (8), the leakage inductance σLs can be calculated by calculating the inclination (proportional coefficient) of the q-axis magnetic flux AC component ΦqsAC with respect to the q-axis current AC component iqsAC. However, when the signals of the q-axis current AC component iqsAC and the q-axis magnetic flux AC component ΦqsAC are plotted on the axes, ΦqsAC with respect to the q-axis current AC component iqaAC has a distorted and loop-shaped characteristic and it varies with a hysteresis characteristic, as shown in FIG. 5 (Phenomenon 1). Thus, if a simple proportional coefficient is considered, the accuracy of the leakage inductance σLs decreases. Note that, although the description of the phenomenon 1 is different from the description of the previously described phenomenon 1, it is a similar phenomenon. In the technique of Patent Document 1 for measuring the leakage inductance, the value of inductance is calculated on the basis of the effective values of a voltage and a current. However, as shown in FIG. 3 and FIG. 4, the q-axis magnetic flux AC component instantaneously changes with respect to the q-axis current AC component iqsAC, and it can be said that the technique of Patent Document 1 for measuring the leakage inductance cannot calculate inductance information with sufficient accuracy.

In contrast, in the motor inductance measurement device 50 of Embodiment 1, the data recording unit 33 records the loop-shaped magnetic flux data data1 as it is, which are change characteristics (characteristics 56a, 56b) of the q-axis magnetic flux AC component ΦqsAC corresponding to the q-axis current AC component iqsAC, as the motor inductance information InfL, instead of the leakage inductance σLs which is simply a coefficient of the inclination shown in Equation (8). As a result, the motor inductance measurement device 50 of Embodiment 1 can measure and hold the motor inductance information InfL that can be calculated into the leakage inductance with extremely high accuracy. Further, the motor inductance measurement device 50 of Embodiment 1 can measure and hold the motor inductance information InfL suitable for a motor drive device for controlling the motor 1, by utilizing magnetic flux such as the q-axis magnetic flux AC component ΦqsAC reflecting the influence of the leakage inductance. Note that, in Embodiment 1, the case where the motor inductance information InfL is measured by the AC energization to the q-axis side has been described but the same motor inductance information InfL can be measured by AC energization to the d-axis side as well. Further, in the case where the motor 1 is a synchronous motor, the inductance information can be measured by the same procedure.

In FIG. 5, measurement results of the q-axis magnetic flux AC component ΦqsAC corresponding to the q-axis current AC component iqsAC of the two types of amplitudes: the larger and the smaller, are shown. As can be seen from FIG. 5, as the amplitude of the q-axis current AC component iqsAC changes, the shape of the loop in the q-axis magnetic flux AC component ΦqsAC corresponding to the q-axis current AC component iqsAC also changes. Therefore, if measurement is performed under the same conditions as the actual operating conditions of the motor 1, namely, the energization conditions, and loop-shaped data which is the motor inductance information InfL, namely, the loop-shaped magnetic flux data data1, is recorded for each of the operating conditions, the motor 1 can be controlled using the motor inductance information InfL that is suitable for the actual motor operation. Therefore, by controlling the motor 1 using the motor inductance information InfL, an effect of improving the motor control performance is brought about. The improvement of motor control performance will be described in detail in a motor drive system 70 in Embodiments 5 to 8.

In FIG. 5, the measurement result in which only the amplitude of the q-axis current AC component iqsAC is changed is described as an example, but the magnitude of the d-axis current ids of a DC, and a DC current (DC component) contained in the q-axis current iqs, etc., also change the loop-shaped data (loop-shaped magnetic flux data data1) which is the motor inductance information InfL. Therefore, the sequence setting unit 34 operates to measure highly accurate motor inductance information InfL that is suitable for the operating state of the motor 1. Specifically, the sequence setting unit 34 sets an energization sequence and gives an instruction to the current command output unit 23, and simultaneously gives an instruction to the data recording unit 33 to record the motor inductance information InfL. The sequence setting unit 34 outputs the measurement execution signal sig1 to the current command output unit 23 and the recording execution signal sig2 to the data recording unit 33.

FIG. 6 is an example of an operation flow of the sequence setting unit 34 and is a flow chart when AC energization is performed on the q-axis side. For the measurement in which the operating conditions of the motor 1 are fully covered, the sequence setting unit 34 appropriately changes a current command condition and output instructions to the current command output unit 23 and the data recording unit 33 so as to measure the detection current 94 and the motor inductance information InfL. Here, an example will be described in which an AC signal amplitude Iac1 being the value of the AC component in the q-axis current command iqs* and a DC signal value Idc1 being the value of the DC component therein, and further a DC signal value Idc2 being the value of the DC component in the d-axis current command ids* are changed, the AC signal amplitude Iac1, the DC signal value Idc1, and the DC signal value Idc2 being predetermined by the operating conditions of the motor 1.

In an induction motor, the d-axis current command ids* may be a fixed constant value. Alternatively, the d-axis current command ids* is changed by weakly performing control or the like with respect to the d-axis rotor magnetic flux Φdr by magnetic flux control. In this case as well, since the responsiveness of the rotor magnetic flux of the induction motor is low, the magnetic flux command is made rarely changed rapidly, and the d-axis current command ids* is also not made changed rapidly. Therefore, the d-axis current command ids* is set as the DC signal value Idc2 having a constant value.

On the other hand, the q-axis current command iqs* is a torque current command. In order to drive the load device connected to the motor 1, a constant load torque is required, and in some cases, torque that changes with a high response in response to the speed control of the motor 1 is required. To cope with a case above, the q-axis current command iqs* is set by the sum of the DC signal value Idc1 of a constant value and the AC signal amplitude Iac1 that changes. Note that the higher the frequency of the AC signal to be contained in the q-axis current command iqs* are, the larger the voltage resulting from the time variation of the q-axis magnetic flux AC component ΦqsAC becomes, so that the S/N ratio with respect to the noise can be improved for the measurement. However, since there is an upper limit to the voltage that can be output by the inverter device 4, it is necessary to consider the limitation. Further, a frequency at which the rotational speed of the motor can be regarded to be constant, that is, a frequency to such an extent at which Equation (9) holds, is set in consideration of the characteristic of the load device connected to the motor 1.

The flow of the sequence setting unit 34 shown in FIG. 6 and a motor inductance measuring method of Embodiment 1 will be described. In step ST01, the sequence setting unit 34 sets the DC signal value Idc1 to be reflected in the q-axis current command iqs*. In step ST02, the sequence setting unit 34 sets the AC signal amplitude Iac1 to be reflected in the q-axis current command iqs*. In step ST03, the sequence setting unit 34 sets the DC signal value Idc2 to be reflected in the d-axis current command ids*. Steps ST01, ST02, and ST03 are current command setting procedures. In step ST04, the sequence setting unit 34 executes a sequence for measuring the motor inductance information InfL (motor inductance information measurement procedure). Specifically, the sequence setting unit 34 outputs the measurement execution signal sig1 containing the DC signal value Idc1, the AC signal amplitude Iac1, and the DC signal value Idc2 to the current command output unit 23. The sequence setting unit 34 outputs the measurement execution signal sig1 containing an amplitude command value of the AC current (AC signal amplitude Iac1) and a magnitude command value of the DC current (DC signal value Idc1) to the current command output unit 23 of the energization control unit 2 such that the DC current is superimposed to flow by further applying the DC voltage to the q-axis to which the AC voltage is to be applied. The magnetic flux calculation unit 32 generates the loop-shaped magnetic flux data data1 which is the motor inductance information InfL on the basis of the voltage command AC component 96 generated by using the measurement execution signal sig1 as a trigger and the dq-axis current AC component 97 generated by the detection current 94 detected from the motor 1 driven by the measurement execution signal sig1 (measurement execution procedure). Note that a procedure for detecting the detection current 94 from the motor 1 based on the current command 90 set in the current command setting procedures is a current detection procedure. Since the measurement execution procedure generates the loop-shaped magnetic flux data data1 which is the motor inductance information InfL, it can also be referred to as an inductance information generation procedure. By the measurement execution procedure, the motor inductance measurement device 50 measures the loop-shaped magnetic flux data data1 which is the motor inductance information InfL. Further, the sequence setting unit 34 outputs the recording execution signal sig2 to the data recording unit 33 so that the loop-shaped magnetic flux data data1 generated by the magnetic flux calculation unit 32 is recorded as the motor inductance information InfL (data recording execution procedure).

When step ST04 is executed, the loop-shaped magnetic flux data data1 in response to one set of q-axis current command iqs* and d-axis current command ids* is generated by the magnetic flux calculation unit 32, and the loop-shaped magnetic flux data data1 is recorded in the data recording unit 33. The recording execution signal sig2 is output, for example, at a timing after an estimated time at which the processing of the magnetic flux calculation unit 32 ends after the measurement execution signal sig1 is output. Alternatively, the sequence setting unit 34 may receive a generation end signal indicating the completion of the generation of the loop-shaped magnetic flux data data1 from the magnetic flux calculation unit 32, and may output the recording execution signal sig2 to the data recording unit 33.

In step ST05, the sequence setting unit 34 changes the DC signal value Idc1, the DC signal value Idc2, and the AC signal amplitude Iac1 (current command change procedure). In step ST06, the sequence setting unit 34 determines whether or not the energization is performed under all the conditions for the DC signal value Idc1, the DC signal value Idc2, and the AC signal amplitude Iac1 (measurement end determination procedure). If the sequence setting unit 34 determines that the energization is performed under all the conditions for the DC signal value Idc1, the DC signal value Idc2, and the AC signal amplitude Iac1, the sequence setting unit 34 ends the processing. If the sequence setting unit 34 determines that the energization is performed under not all the conditions of the DC signal value Idc1, the DC signal value Idc2, and the AC signal amplitude Iac1, the processing returns to step ST01. For example, when a value indicating the end is set in the last set values of the DC signal value Idc1, the DC signal value Idc2, and the AC signal amplitude Iac1, the sequence setting unit 34 determines in step ST06 that the energization is performed under all conditions. The value indicating the end is, for example, a null, a negative value, or the like.

By repeatedly executing step ST01 to step ST06, the loop-shaped magnetic flux data data1 containing a plurality of characteristics 56a, 56b corresponding to a plurality of current command conditions can be measured in a set. By repeatedly executing step ST01 to step ST06 n times, it is possible to acquire a set of the loop-shaped magnetic flux data data1 corresponding to n current command conditions, that is, a set of the motor inductance information InfL corresponding to n current command conditions. Accordingly, in the data recording unit 33, a loop-shaped magnetic flux data set containing a plurality of the loop-shaped magnetic flux data data1, that is, a motor inductance information set including a plurality of pieces of the motor inductance information InfL is recorded. Note that, in FIG. 6, an example is described in which the current command change procedure in step ST05 is executed before the measurement end determination procedure in step ST06, but the current command change procedure in step ST05 may be executed after the No determination in the measurement end determination procedure in step ST06. In this case, after the setting of values for the DC signal value Idc1, the DC signal value Idc2, and the AC signal amplitude Iac1 that are effective are finished, the processing ends without changing the DC signal value Idc1, the DC signal value Idc2, and the AC signal amplitude Iac1.

In the flow chart of the sequence setting unit 34 shown in FIG. 6, an example is shown in which a sequence for measuring the loop-shaped magnetic flux data data1 which is the motor inductance information InfL for each condition is executed by changing the dq-axis current command (ids*, iqs*), that is, the current command 90. The motor inductance measurement device 50 of Embodiment 1 can measure the motor inductance information InfL in accordance with the actual operating conditions of the motor 1 by the operation of the sequence setting unit 34 shown in FIG. 6. Note that, in the flow chart of FIG. 6, the case where the AC energization is performed on the q-axis side is described, but an energization sequence for measuring a plurality of pieces of the motor inductance information InfL may be set so as to cover the conditions of the current command 90 depending on the type of the motor 1 to be the measurement target and the energization pattern.

The motor inductance measurement device 50 of Embodiment 1 generates and records the loop-shaped magnetic flux data data1 as shown in FIG. 5 as the motor inductance information InfL, instead of a coefficient that links the motor current and the magnetic flux. Since the motor inductance measurement device 50 of Embodiment 1 can control the motor 1 utilizing a magnetic flux such as the q-axis magnetic flux AC component ΦqsAC reflecting the influence of the leakage inductance from the loop-shaped magnetic flux data data1, it can be said that the motor inductance information InfL in response to the instantaneous value of the motor current can be accurately measured. In other words, the motor inductance measurement device 50 of Embodiment 1 can highly accurately measure the motor inductance information InfL which is suitable in the case where the motor current changes in high response.

Note that, as an example of the motor inductance information InfL, the loop-shaped data, namely, the loop-shaped magnetic flux data data1, is described. However, the shape of the magnetic flux data generated by the magnetic flux calculation unit 32 of the inductance calculation unit 3 is not limited to the loop shape because it depends on the characteristic of the motor. Therefore, the motor inductance information InfL may be data of a first shape, that is, the first magnetic flux data. The loop-shaped magnetic flux data data1 may be referred to as the first magnetic flux data data1.

As described above, the motor inductance measurement device 50 of Embodiment 1 is a motor inductance measurement device for measuring the inductance information (motor inductance information InfL) containing the characteristics 56a, and 56b regarding the instantaneous value of the AC magnetic flux (q-axis magnetic flux AC component ΦqsAC) corresponding to the instantaneous value of the AC current (q-axis current AC component iqsAC) flowing in the motor 1. The motor inductance measurement device 50 of Embodiment 1 comprises the energization control unit 2 that controls the energization of the motor 1 such that the AC current (q-axis current AC component iqsAC) is caused to flow by applying the AC voltage (q-axis voltage AC component vqAC) to at least one axis (q-axis) on the two-axis orthogonal rotation coordinates of the motor 1, and the inductance calculation unit 3 that calculates the instantaneous value of the AC magnetic flux (q-axis magnetic flux AC component ΦqsAC) by integrating the residual voltage obtained by subtracting the resistance voltage ((Rs+Rr)·iqsAC) from the AC voltage (q-axis voltage AC component vqAC), the resistance voltage being obtained from the AC current of the motor 1 (q-axis current AC component iqsAC) based on the detection current 94 detected from the motor 1, and from the resistances of the motor 1 (stator resistance Rs, rotor resistance Rr), and that generates the characteristics 56a, and 56b regarding the instantaneous value of the AC magnetic flux (q-axis magnetic flux AC component ΦqsAC) corresponding to the instantaneous value of the AC current (q-axis current AC component iqsAC) as the inductance information (motor inductance information InfL). With the configuration, the motor inductance measurement device 50 of Embodiment 1 calculates the AC magnetic flux (q-axis magnetic flux AC component ΦqsAC) on the basis of the resistance voltage ((Rs+Rr)·iqsAC) and the AC voltage, the resistance voltage being obtained from the AC current of the motor 1 (q-axis current AC component iqsAC) based on the detection current 94 and from the resistances of the motor 1 (stator resistance Rs, rotor resistance Rr), and generates the characteristics 56a, and 56b regarding the instantaneous value of the AC magnetic flux (q-axis magnetic flux AC component ΦqsAC) corresponding to the instantaneous value of the AC current (q-axis current AC component iqsAC) as the inductance information (motor inductance information InfL), so that the motor inductance information InfL corresponding to the inductance of the motor 1 can be highly accurately measured.

The motor inductance measurement method of Embodiment 1 is a motor inductance measurement method for measuring the inductance information (motor inductance information InfL) containing the characteristics 56a, and 56b regarding the instantaneous value of the AC magnetic flux (q-axis magnetic flux AC component ΦqsAC) corresponding to the instantaneous value of the AC current (q-axis current AC component iqsAC) flowing in the motor 1. The motor inductance measurement method of Embodiment 1 comprises the current command setting procedure for setting the current values (DC signal value Idc2, DC signal value Idc1, AC signal magnitude value Iac1) of the current command 90 which controls the current (dq-axis current 95)

flowing to the two axes (d-axis and q-axis) on the two-axis orthogonal rotation coordinates of the motor 1 such that the AC current (q-axis current AC component iqsAC) is caused to flow by applying the AC voltage (q-axis voltage AC component vqAC) to at least one axis (q-axis) on the two-axis orthogonal rotation coordinates of the motor 1, and the current detection procedure for detecting the detection current 94 from the motor 1 on the basis of the current command 90 set in the current command setting procedure. Further, the motor inductance measurement method of Embodiment 1 comprises the inductance information generation procedure in which the instantaneous value of the AC magnetic flux (q-axis magnetic flux AC component ΦqsAC) is calculated by integrating the residual voltage obtained by subtracting the resistance voltage ((Rs+Rr) iqsAC) from the AC voltage (q-axis voltage AC component vqAC), the resistance voltage being obtained from the AC current of the motor 1 (q-axis current AC component iqsAC) based on the detection current 94 detected in the current detection procedure and from the resistances of the motor 1 (stator resistance Rs, rotor resistance Rr), and the characteristics 56a, and 56b regarding the instantaneous value of the AC magnetic flux (q-axis magnetic flux AC component ΦqsAC) corresponding to the instantaneous value of the AC current (q-axis current AC component iqsAC) are generated as the inductance information (motor inductance information InfL). With the configuration, the motor inductance measurement device 50 of Embodiment 1 calculates the AC magnetic flux (q-axis magnetic flux AC component ΦqsAC) on the basis of the resistance voltage ((Rs+Rr)·iqsAC) and the AC voltage, the resistance voltage being obtained from the AC current of the motor 1 (q-axis current AC component iqsAC) based on the detection current 94 and from the resistances of the motor 1 (stator resistance Rs, rotor resistance Rr), and generates the characteristics 56a, and 56b regarding the instantaneous value of the AC magnetic flux (q-axis magnetic flux AC component ΦqsAC) corresponding to the instantaneous value of the AC current (q-axis current AC component iqsAC) as the inductance information (motor inductance information InfL), so that the motor inductance information InfL corresponding to the inductance of the motor 1 can be highly accurately measured.

Embodiment 2

Figure 7:
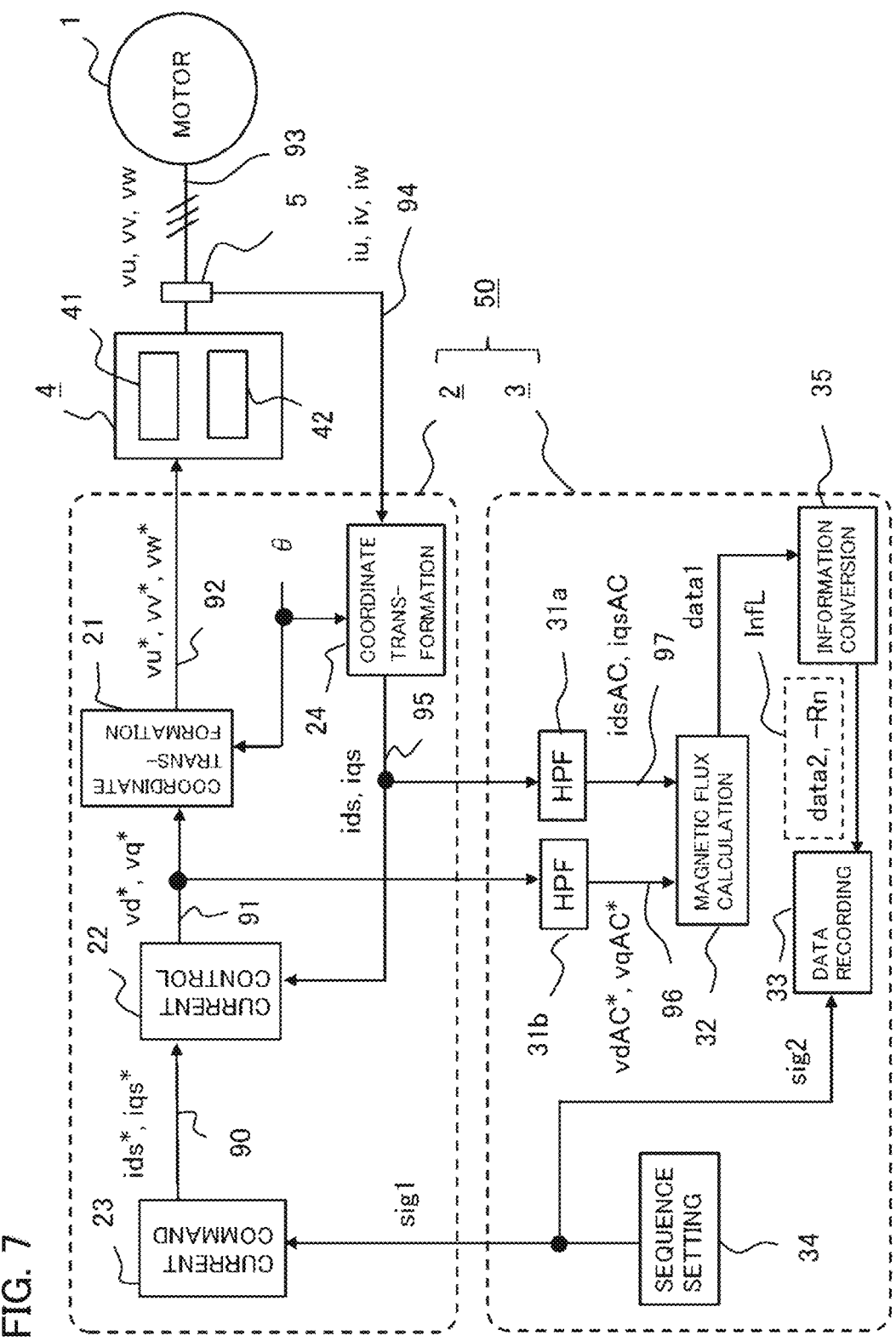
FIG. 7 is a diagram showing a configuration of a motor inductance measurement device according to Embodiment 2.
Figure 8:
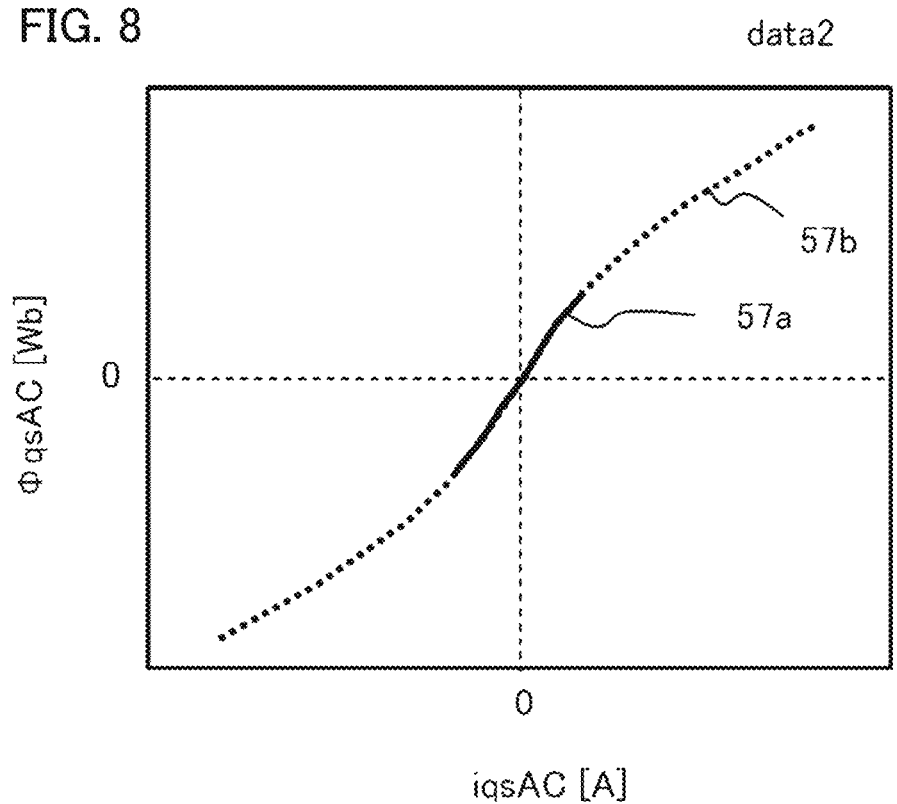
FIG. 8 is a diagram showing non-loop-shaped magnetic flux data data2 of FIG. 7.
Figure 9:
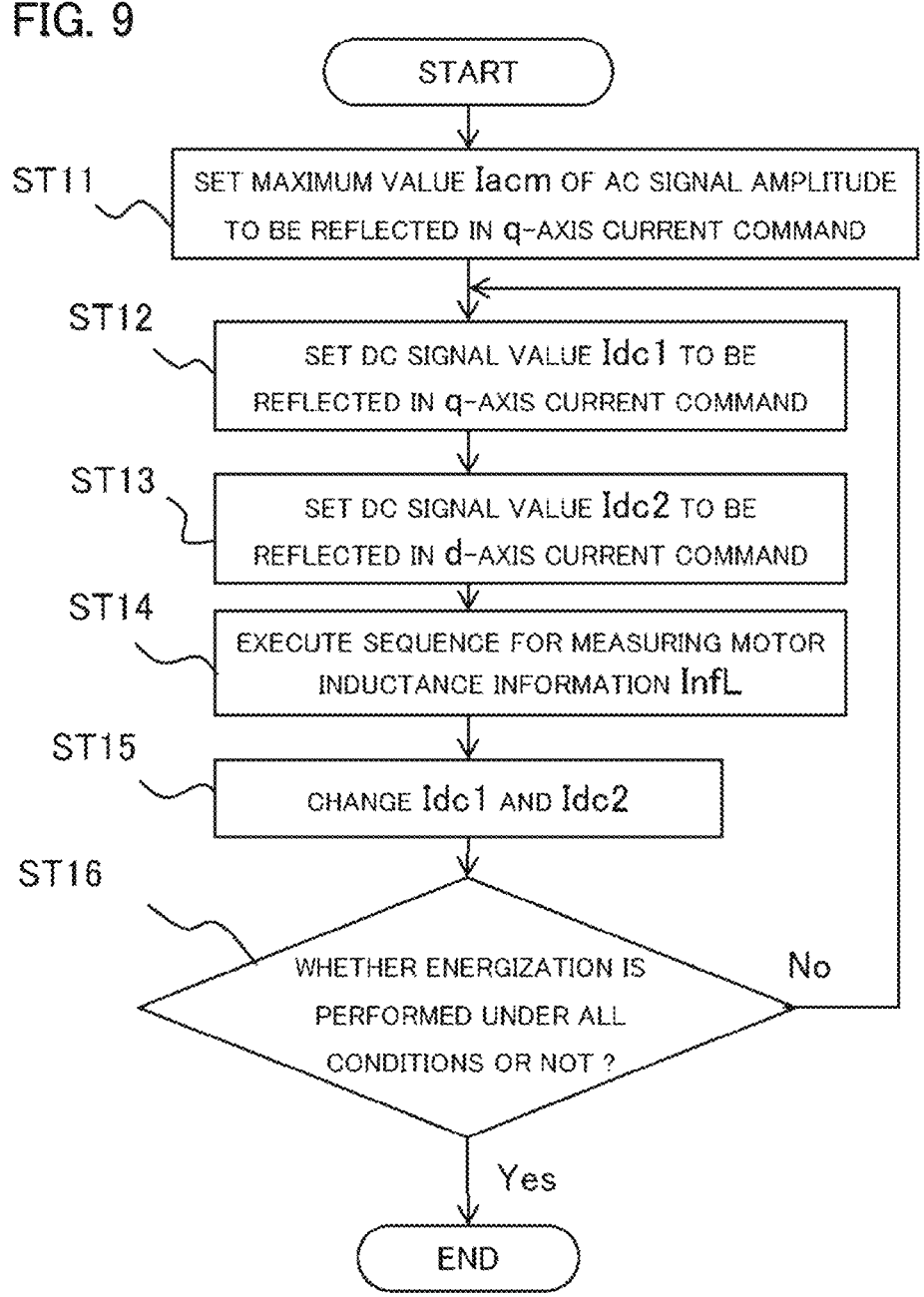
FIG. 9 is a diagram showing an operation flow of the sequence setting unit of FIG. 7.

FIG. 7 is a diagram showing a configuration of a motor inductance measurement device according to Embodiment 2. FIG. 8 shows a non-loop-shaped magnetic flux data data2 of FIG. 7, and FIG. 9 is a diagram showing an operation flow of a sequence setting unit of FIG. 7. The motor inductance measurement device 50 of Embodiment 2 is different from the motor inductance measurement device 50 of Embodiment 1 in that an information conversion unit 35 is added to the inductance calculation unit 3, and the information conversion unit 35 converts the loop-shaped magnetic flux data data1 generated by the magnetic flux calculation unit 32 into the non-loop-shaped magnetic flux data data2 and an negative resistance Rn, and records them in the data recording unit 33 as the motor inductance information InfL. Different parts from the motor inductance measurement device 50 of Embodiment 1 will be mainly described.

The magnetic flux calculation unit 32 generates the loop-shaped magnetic flux data data1 having a distorted loop shape shown in FIG. 5. Similar to Embodiment 1, a case as an example will be described in which the motor 1 is an induction motor, AC energization is performed on the q-axis side, and the motor inductance information InfL corresponding to a leakage inductance is measured. In the motor inductance measurement device 50 of Embodiment 2, the q-axis magnetic flux ΦqsAC is calculated by using Equation (10) instead of Equation (9).

[Mathematical 10]

$$\Phi_{qsAC} = \int \{v_{qAC} - (R_s + R_r - R_n) \cdot i_{qsAC}\} \cdot dt \quad (10)$$

The resistance Rn in Equation (10) is the negative resistance value, namely, the negative resistance. In Equation (10), "−Rn" is used, and the minus sign specifies that the negative resistance Rn has a negative value in Equation (10). It is shown that a resistance voltage (−Rn·iqsAC) due to Rn, which is the negative resistance value, has a function of lowering the q-axis voltage AC component vqAC, similarly to the resistance voltages (Rs·iqsAC, Rr·iqsAC) of the stator resistance Rs and the rotor resistance Rr, which are positive resistance values. In FIG. 7, the negative resistance Rn is denoted with "−" and is denoted as "−Rn". That is, "−Rn" is used to indicate a positive value. A characteristic of the negative resistance Rn and a method for selecting the value thereof will be described.

The author (inventor) of the present specification have found that, when the negative resistance Rn is taken into consideration, the value thereof is appropriately selected, and the q-axis magnetic flux AC component (qsAC is calculated according to Equation (10), the loop-shaped magnetic flux data data1 (refer to FIG. 5) changes into a curved line as shown in FIG. 8, thereby obtaining the non-loop-shaped magnetic flux data data2, namely, the q-axis magnetic flux AC component ΦqsAC that does not form a loop with respect to the q-axis current AC component iqsAC. In FIG. 8, the horizontal axis represents the current [A] of the q-axis current AC component iqsAC, and the vertical axis represents the magnetic flux [Wb] of the q-axis flux AC component ΦqsAC. The characteristic 57a in FIG. 8 corresponds to a case where the amplitudes of the q-axis current and the AC component of the q-axis magnetic flux are small, and the characteristic 57b in FIG. 8 corresponds to a case where the amplitudes of the AC components are large.

Further, as shown in FIG. 8, it has been found that the characteristic 57a of the non-loop-shaped magnetic flux data data2, which is the motor inductance information InfL, overlaps the characteristic 57b even when the amplitude of the q-axis current AC component iqsAC is changed. It has been also found that the negative resistance Rn has the same value even when the amplitude of the q-axis current AC component iqsAC is changed (Phenomenon 2).

When this phenomenon 2 is used, the loop-shaped magnetic flux data data1 (refer to FIG. 5) which is the motor inductance information InfL of Embodiment 1 can be considered as a combination of the non-loop-shaped magnetic flux data data2 of FIG. 8 and the negative resistance Rn which generates the resistance voltage (Rn·iqsAC). That is, a combination of the non-loop-shaped magnetic flux data data2 and the negative resistance Rn can be the motor inductance information InfL. Therefore, the non-loop-shaped magnetic flux data data2 and the negative resistance Rn are defined to be the motor inductance information InfL of Embodiment 2. In this case, since the motor inductance information InfL of Embodiment 2 recorded in the data recording unit 33 can be made only to include a single curve characteristic (characteristic 57b) and the negative resistance Rn even if the amplitude of the q-axis current AC component iqsAC changes, the information to be kept in the data recording unit 33 can be significantly compressed to reduce the recording capacity. Therefore, the motor inductance measurement device 50 of Embodiment 2 can reduce the recording capacity for the motor inductance information InfL as compared with the motor inductance measurement device 50 of Embodiment 1. The motor inductance measurement device 50 of Embodiment 2 can reduce the recording capacity for the motor inductance information set containing a plurality of pieces of the motor inductance information InfL as compared with the motor inductance measurement device 50 of Embodiment 1.

Equation (10) shows that the AC magnetic flux can be calculated by integrating the residual voltage obtained by subtracting the resistance voltage, namely, (Rs+Rr−Rn)·iqsAC, caused by the q-axis current AC component iqsAC that is the AC current from the q-axis voltage AC component vqAC that is the applied AC voltage. Here, the residual voltage is vqAC−(Rs+Rr−Rn)·iqsAC. The characteristics 57a and 57b shown in FIG. 8 represent the instantaneous values of the AC magnetic flux corresponding to the instantaneous values of the AC current. The characteristics 57a and 57b are non-loop-shaped and they each are non-loop-shaped magnetic flux data data2. Since the non-loop-shaped magnetic flux data data2 is a characteristic obtained by appropriately selecting the negative resistance Rn, a combination of the non-loop-shaped magnetic flux data data2 and the negative resistance Rn is the motor inductance information InfL. The motor inductance information InfL can be regarded to be a characteristic representing the instantaneous value of the AC magnetic flux corresponding to the instantaneous values of the AC current. The negative resistance Rn can be regarded as a resistance type parameter for converting the loop-shaped magnetic flux data data1 into the non-loop-shaped magnetic flux data data2.

The operation of the information conversion unit 35 will be described. The information conversion unit 35 converts the loop-shaped magnetic flux data data1 generated by the magnetic flux calculation unit 32 into the non-loop-shaped magnetic flux data data2 and the negative resistance Rn as follows. The procedure of the loop-shaped magnetic flux data data1 generated by the magnetic flux calculation unit 32 is a magnetic flux data generation procedure. The information conversion unit 35 substitutes an initial value of the negative resistance Rn into Equation (10) to calculate the q-axis flux AC component ΦqsAC (magnetic flux AC component calculation procedure). Thereafter, the information conversion unit 35 determines whether the calculated q-axis flux AC component ΦqsAC is in non-loop-shaped (non-loop determination procedure). If it is determined in the non-loop determination procedure that the q-axis flux AC component ΦqsAC is in non-loop-shaped, the negative resistance Rn that is selected and the non-loop-shaped magnetic flux data data2 are generated as the motor inductance information InfL (information generation procedure). If it is determined in the non-loop determination procedure that the q-axis magnetic flux AC component ΦqsAC is not in non-loop-shaped, the value of the negative resistance Rn is changed and the magnetic flux AC component calculation procedure is performed. The information conversion unit 35 converts the loop-shaped magnetic flux data data1 generated in the magnetic flux data generation procedure into the non-loop-shaped magnetic flux data data2 in non-loop-shaped using the negative resistance Rn, which is the resistance type parameter, by the magnetic flux AC component calculation procedure and the non-loop determination procedure (magnetic flux data conversion procedure).

The method for generating the non-loop-shaped magnetic flux data data2 and the negative resistance Rn described above are a method in which the calculation using Equation (10) is performed by appropriately changing the value of the negative resistance Rn such that the shape of the q-axis magnetic flux AC component ΦqsAC calculated by the Equation (10) becomes non-loop-shaped, and the value of the negative resistance Rn which makes the shape of the q-axis magnetic flux AC component ΦqsAC becomes closest to be non-loop-shaped is selected.

Furthermore, as is apparent from FIG. 8, the non-loop-shaped magnetic flux data data2 changes gradually with respect to the q-axis current AC component iqsAC. For this reason, the information conversion unit 35 may hold data for several points of the current, and may output the non-loop-shaped magnetic flux data data2 generated by reducing data points to the data recording unit 33 so that the characteristic 57b can be reproduced by processing such as interpolation. As a result, the motor inductance measurement device 50 of Embodiment 2 can further reduce the recording capacity for the motor inductance information InfL.

In the motor inductance measurement device 50 of Embodiment 2, the information conversion unit 35 converts the loop-shaped magnetic flux data data1 generated by the magnetic flux calculation unit 32 into the non-loop-shaped magnetic flux data data2 and the negative resistance Rn, and records them in the data recording unit 33 as the motor inductance information InfL. Since a single curve characteristic in the case in which the q-axis current AC component iqsAC has the maximum amplitude is sufficient for the non-loop-shaped magnetic flux data data2, the motor inductance measurement device 50 of Embodiment 2 can omit the measurement in other amplitudes of the q-axis current AC component iqsAC when the motor inductance information InfL is measured only for the q-axis current AC component iqsAC having the maximum amplitude. That is, in the motor inductance measurement device 50 of Embodiment 2, only the maximum value of the AC signal amplitude Iac1 of the q-axis current command ids* is used in the measurement sequence of the motor inductance information InfL, and other energization conditions are to be manipulated. Therefore, the motor inductance measurement device 50 of Embodiment 2 can reduce the energization conditions to be manipulated than the motor inductance measurement device 50 of Embodiment 1, and can greatly reduce the time required for measuring a plurality of pieces of the motor inductance information InfL, that is, the time required for acquiring the motor inductance information set containing a plurality of pieces of the motor inductance information InfL. In the motor inductance measurement device 50 of Embodiment 2, the motor inductance information InfL is measured in the sequence setting unit 34 reflecting the operation described above.

The flow of the sequence setting unit 34 shown in FIG. 9 and the motor inductance measuring method of Embodiment 2 will be described. In step ST11, the sequence setting unit 34 sets the maximum value of the AC signal amplitude Iac1 to be reflected in the q-axis current command iqs*, that is, the maximum value Iacm of the AC signal amplitude. In step ST12, the sequence setting unit 34 sets the DC signal value Idc1 to be reflected in the q-axis current command iqs*. In step ST13, the sequence setting unit 34 sets the DC signal value Idc2 to be reflected in the d-axis current command ids*. Steps ST11, ST12, and ST13 are current command setting procedures. Further, step ST11 is an AC current command setting procedure, and ST12 and ST13 are DC current command setting procedures.

In step ST14, the sequence setting unit 34 executes a sequence for measuring the motor inductance information InfL (motor inductance information measurement procedure). Specifically, the sequence setting unit 34 outputs the measurement execution signal sig1 containing the DC signal value Idc1, the maximum value Iacm of the AC signal amplitude, and the DC signal value Idc2 to the current command output unit 23. The sequence setting unit 34 outputs the measurement execution signal sig1 containing the amplitude command value of the AC current (maximum value Iacm of the AC signal amplitude) and the magnitude command value of the DC current (DC signal value Idc1) to the current command output unit 23 of the energization control unit 2 such that the DC current is superimposed to flow by further applying the DC voltage to the q-axis to which the AC voltage is to be applied. The magnetic flux calculation unit 32 generates the loop-shaped magnetic flux data data1 on the basis of the voltage command AC component 96 generated by using the measurement execution signal sig1 as a trigger and the dq-axis current AC component 97 generated by the detection current 94 detected from the motor 1 driven by the measurement execution signal sig1. The information conversion unit 35 generates the non-loop-shaped magnetic flux data data2 and the negative resistance Rn which are the motor inductance information InfL on the basis of the loop-shaped magnetic flux data data1 (measurement execution procedure). By the measurement execution procedure, the motor inductance measurement device 50 measures the non-loop-shaped magnetic flux data data2 and the negative resistance Rn which are the motor inductance information InfL. Further, the sequence setting unit 34 outputs the recording execution signal sig2 to the data recording unit 33 so as to record the non-loop shaped magnetic flux data data2 and the negative resistance Rn generated through the conversion by the information conversion unit 35 from the loop-shaped magnetic flux data data1 generated by the magnetic flux calculating unit 32 (data recording execution procedure).

When step ST14 is executed, the loop-shaped magnetic flux data data1 in response to a pair of the q-axis current command iqs* and the d-axis current command ids* is generated by the magnetic flux calculation unit 32, and the non-loop-shaped magnetic flux data data2 and the negative resistance Rn generated by the information conversion unit 35 through the conversion from the loop-shaped magnetic flux data data1 are recorded in the data recording unit 33. The timing for outputting the recording execution signal sig2 is, for example, the timing when the processing of the magnetic flux calculation unit 32 and the information conversion unit 35 is assumed to be completed after the measurement execution signal sig1 is output. Alternatively, the sequence setting unit 34 may receive the generation end signal indicating the completion of the generation of the non-loop-shaped magnetic flux data data2 from the information conversion unit 35, and may output the recording execution signal sig2 to the data recording unit 33.

In step ST15, the sequence setting unit 34 changes the DC signal value Idc1 and the DC signal value Idc2 (current command change procedure). In step ST16, the sequence setting unit 34 determines whether or not the energization is performed under all conditions for the DC signal value Idc1 and the DC signal value Idc2 (measurement end determination procedure). If the sequence setting unit 34 determines that the energization is performed under all the conditions for the DC signal value Idc1 and the DC signal value Idc2, the sequence setting unit 34 ends the processing. If the sequence setting unit 34 determines that the energization is performed under not all the conditions of the DC signal value Idc1 and the DC signal value Idc2, the processing returns to step ST12. For example, when a value indicating the end is set in the last set values of the DC signal value Idc1, and the DC signal value Idc2, the sequence setting unit 34 determines in step ST16 that the energization is performed under all conditions. The value indicating the end is, for example, a null, a negative value, or the like.

By repeatedly executing step ST12 to step ST16 after the execution of step ST11, a plurality of the non-loop-shaped magnetic flux data data2 and the negative resistances Rn corresponding to a plurality of the current command conditions can be measured in a set. By repeatedly executing step ST12 to step ST16 n times after the execution of step ST11, it is possible to acquire a set of the non-loop-shaped magnetic flux data data2 and the negative resistances Rn corresponding to n current command conditions, that is, a set of the motor inductance information InfL corresponding to n current command conditions. Accordingly, the data recording unit 33 records the set of the magnetic flux data and the negative resistance that contains a plurality of pieces of the non-loop-shaped magnetic flux data data2 and the negative resistances Rn, that is, the motor inductance information set containing a plurality of pieces of the motor inductance information InfL. Note that, in FIG. 9, an example is described in which the current command change procedure in step ST15 is executed before the measurement end determination procedure in step ST16, but the current command change procedure in step ST15 may be executed after the No determination in the measurement end determination procedure in step ST16. In this case, after the setting values of the DC signal value Idc1 and the DC signal value Idc2 that are effective are finished, the processing ends without changing the DC signal value Idc1 and the DC signal value Idc2.

The motor inductance measurement device 50 of Embodiment 2 includes the information conversion unit 35 for converting the loop-shaped magnetic flux data data1 generated by the magnetic flux calculation unit 32 into the non-loop-shaped magnetic flux data data2 and the negative resistance Rn in which the amount of data is reduced, namely, the non-loop-shaped magnetic flux data data2 and the negative resistance Rn which are compressed. An information conversion unit 35 converts the relationship between the q-axis current AC component iqsAC corresponding to the instantaneous value of the AC current and the q-axis magnetic flux AC component ΦqsAC corresponding to the instantaneous value of the AC magnetic flux, namely, the loop-shaped magnetic flux data data1, into negative resistance Rn, which is a resistance-type parameter for generating a resistance voltage due to the instantaneous value of the AC current, and into the non-loop-shaped magnetic flux data data2 referring to the instantaneous value of the AC current, and generates a combination of information on the non-loop-shaped magnetic flux data data2 and the negative resistance Rn as the motor inductance information InfL.

As an example of the motor inductance information InfL, the loop-shaped data, namely, the non-loop-shaped data converted from the loop-shaped magnetic flux data data1, namely, a combination of the information on the non-loop-shaped magnetic flux data data2 and the negative resistance Rn, has been described. However, as described in Embodiment 1, the shape of the magnetic flux data generated by the magnetic flux calculation unit 32 of the inductance calculation unit 3 depends on the characteristics of the motor, and is not limited to the loop shape. Therefore, the magnetic flux data generated by the magnetic flux calculation unit 32 may be data having a first shape, that is, first magnetic flux data, and the magnetic flux data generated by the information conversion unit 35 may be data having a second shape, that is, second magnetic flux data. The loop-shaped magnetic flux data data1 may be referred to as the first magnetic flux data data1, and the non-loop-shaped magnetic flux data data2 may be referred to as the second magnetic flux data data2.

The motor inductance measurement device 50 of Embodiment 2 generates and records the non-loop-shaped magnetic flux data data2 and the negative resistance Rn as the motor inductance information InfL, instead of a coefficient that links the motor current and the magnetic flux, as the characteristic 57b shown in FIG. 8. The motor inductance measurement device 50 of Embodiment 2 can thereby measure accurately the motor inductance information InfL in accordance with the instantaneous value of the motor current. In other words, the motor inductance measurement device 50 of Embodiment 2 can highly accurately measure the motor inductance information InfL which is suitable in the case where the motor current changes in high response.

As described above, the motor inductance measurement device 50 of Embodiment 2 is a motor inductance measurement device for measuring the inductance information (motor inductance information InfL) containing the characteristic 57b of the instantaneous value of the AC magnetic flux (q-axis magnetic flux AC component qsAC) corresponding to the instantaneous value of the AC current (q-axis current AC component iqsAC) flowing in the motor 1. The motor inductance measurement device 50 of Embodiment 2 comprises the energization control unit 2 that controls the energization of the motor 1 such that the AC current (q-axis current AC component iqsAC) is caused to flow by applying the AC voltage (q-axis voltage AC component vqAC) to at least one axis (q-axis) on the two-axis orthogonal rotation coordinates of the motor 1, and the inductance calculation unit 3 that calculates the instantaneous value of the AC magnetic flux (q-axis magnetic flux AC component ΦqsAC) by integrating the residual voltage obtained by subtracting the resistance voltage ((Rs+Rr−Rn)·iqsAC) from the AC voltage (q-axis voltage AC component vqAC), the resistance voltage being obtained from the AC current of the motor 1 (q-axis current AC component iqsAC) based on the detection current 94 detected from the motor 1, and from the resistances of the motor 1 (stator resistance Rs, rotor resistance Rr, and negative resistance Rn), and that generates the characteristic 57b of the instantaneous value of the AC magnetic flux (q-axis magnetic flux AC component ΦqsAC) corresponding to the instantaneous value of the AC current (q-axis current AC component iqsAC) as the inductance information (motor inductance information InfL). With the configuration, the motor inductance measurement device 50 of Embodiment 2 calculates the AC magnetic flux (q-axis magnetic flux AC component ΦqsAC) on the basis of the resistance voltage ((Rs+Rr−Rn)·iqaAC) and the AC voltage, the resistance voltage being obtained from the AC current of the motor 1 (q-axis current AC component iqsAC) based on the detection current 94 and from the resistances of the motor 1 (stator resistance Rs, rotor resistance Rr, and negative resistance Rn), and generates the characteristic 57b of the instantaneous value of the AC magnetic flux (q-axis magnetic flux AC component ΦqsAC) corresponding to the instantaneous value of the AC current (q-axis current AC component iqsAC) as the inductance information (motor inductance information InfL), so that the motor inductance information InfL corresponding to the inductance of the motor 1 can be highly accurately measured.

The motor inductance measurement method of Embodiment 2 is a motor inductance measurement method for measuring the inductance information (motor inductance information InfL) containing the characteristic 57b of the instantaneous value of the AC magnetic flux (q-axis magnetic flux AC component ΦqsAC) corresponding to the instantaneous value of the AC current (q-axis current AC component iqsAC) flowing in the motor 1. The motor inductance measurement method of Embodiment 2 comprises the current command setting procedure for setting the current values (DC signal value Idc2, DC signal value Idc1, maximum value Iacm of AC signal amplitude) of the current command 90 which controls the current (dq-axis current 95) flowing to the two axes (d-axis and q-axis) on the two-axis orthogonal rotation coordinates of the motor 1 such that the AC current (q-axis current AC component iqsAC) is caused to flow by applying the AC voltage (q-axis voltage AC component vqAC) to at least one axis (q-axis) on the two-axis orthogonal rotation coordinates of the motor 1, and the current detection procedure for detecting the detection current 94 from the motor 1 on the basis of the current command 90 set in the current command setting procedure. Further, the motor inductance measurement method of Embodiment 2 comprises the inductance information generation procedure in which the characteristic 57b of the instantaneous value of the AC magnetic flux (q-axis magnetic flux AC component ΦqsAC) is calculated by integrating the residual voltage obtained by subtracting the resistance voltage ((Rs+Rr−Rn)·iqsAC) from the AC voltage (q-axis voltage AC component vqAC), the resistance voltage being obtained from the AC current of the motor 1 (q-axis current AC component iqsAC) based on the detection current 94 detected in the current detection procedure and from the resistances of the motor 1 (stator resistance Rs, rotor resistance Rr, and negative resistance Rn), and the characteristic 57b of the instantaneous value of the AC magnetic flux (q-axis magnetic flux AC component ΦqsAC) corresponding to the instantaneous value of the AC current (q-axis current AC component iqsAC) is generated as the inductance information (motor inductance information InfL). With the configuration, the motor inductance measurement device 50 of Embodiment 2 calculates the AC magnetic flux (q-axis magnetic flux AC component ΦqsAC) on the basis of the resistance voltage ((Rs+Rr−Rn)·iqsAC) and the AC voltage, the resistance voltage being obtained from the AC current of the motor 1 (q-axis current AC component iqsAC) based on the detection current 94 and from the resistances of the motor 1 (stator resistance Rs, rotor resistance Rr, and negative resistance Rn), and generates the characteristic 57b of the instantaneous value of the AC magnetic flux (q-axis magnetic flux AC component ΦqsAC) corresponding to the instantaneous value of the AC current (q-axis current AC component iqsAC) as the inductance information (motor inductance information InfL), so that the motor inductance information InfL corresponding to the inductance of the motor 1 can be highly accurately measured.

Embodiment 3

Figure 10:
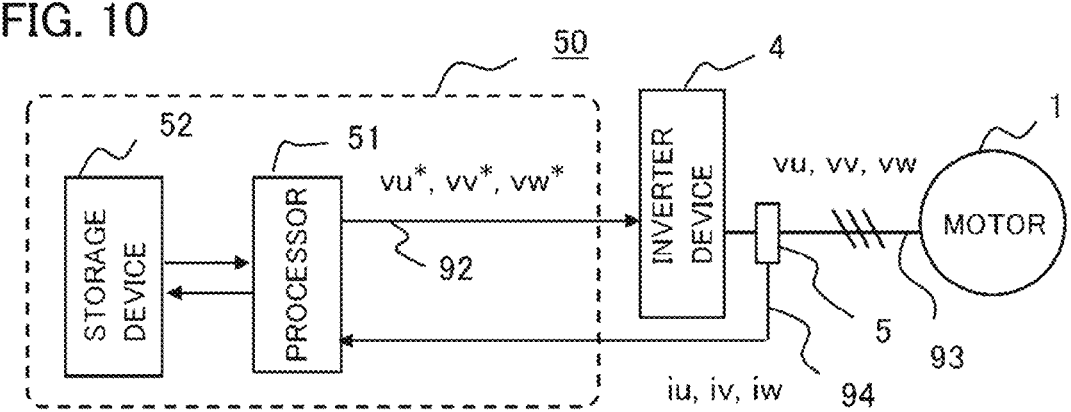
FIG. 10 is a diagram showing a configuration of a motor inductance measurement device according to Embodiment 3.

FIG. 10 is a diagram showing a configuration of a motor inductance measurement device according to Embodiment 3. In the motor inductance measurement device 50 described in Embodiment 1 and Embodiment 2, the components having specific functions operate in cooperation with each other to solve the problems. However, the motor inductance measurement device 50 may be configured such that its function is implemented by signal processing in a program executed on a processor and a result of signal processing in a logic circuit provided on the processor. FIG. 10 shows a configuration in which the operation of the motor inductance measurement device 50 is performed by a processor 51 and processing of a program running thereon. The processor 51 reads out the program from a storage device 52 and executes the program. Further, the processor 51 writes and reads out information that is to be temporarily stored in a process of the processing. For example, in the motor inductance measurement device 50 in Embodiment 1 and Embodiment 2, the processing implemented by executing the program in the processor 51 is processing of the energization control unit 2 and the inductance calculation unit 3. A plurality of the processors 51 may cooperate to implement the functions of the energization control unit 2 and the inductance calculation unit 3.

In the motor inductance measurement device 50 in Embodiment 1 and Embodiment 2, signals transmitted between processing units, namely, signals such as the current command 90, the voltage command 91, the voltage command 92, the dq-axis current 95, the voltage command AC component 96, the dq-axis current AC component 97, the measurement execution signal sig1, and the recording execution signal sig2, are implemented as information temporarily stored in the storage device 52. The same effects described in Embodiment 1 and Embodiment 2 can also be obtained by a configuration in which the function is implemented by signal processing of a program executed on the processor 51 and a result of signal processing in a logic circuit provided on the processor 51. The motor inductance measurement device 50 of Embodiment 3 has the same effect as the motor inductance measurement devices 50 of Embodiment 1 and Embodiment 2.

Embodiment 4

Figure 11:
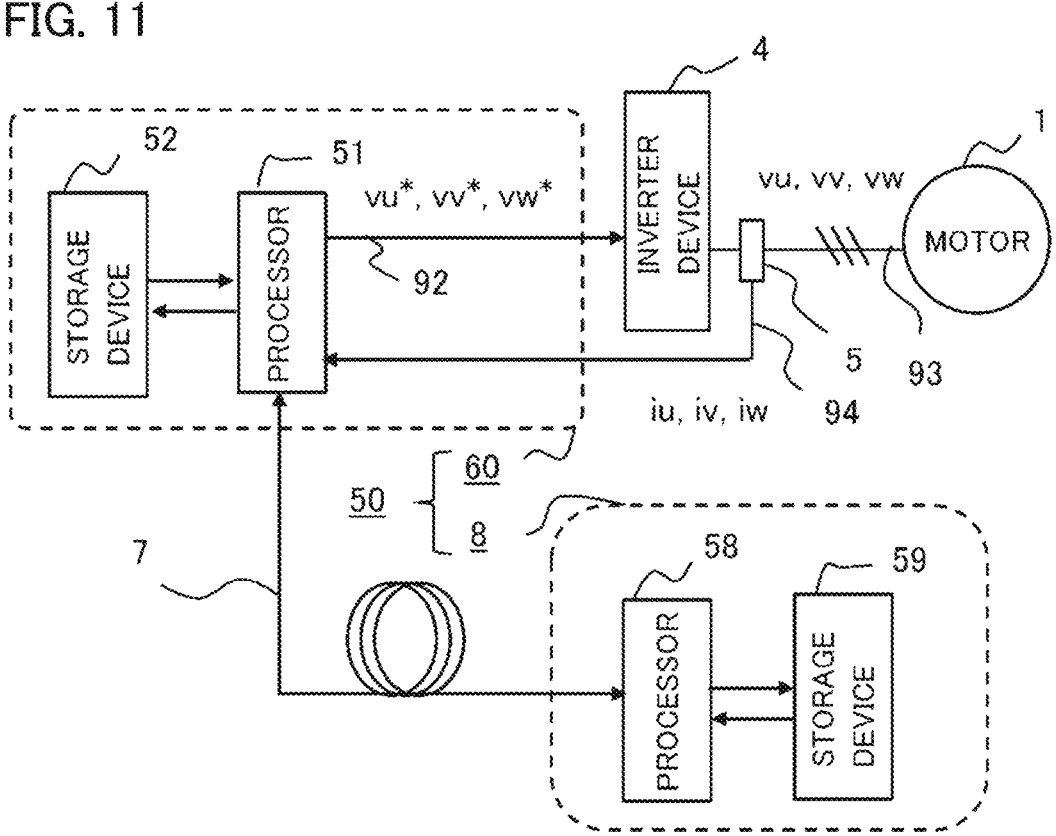
FIG. 11 is a diagram showing a configuration of a motor inductance measurement device according to Embodiment 4.
Figure 12:
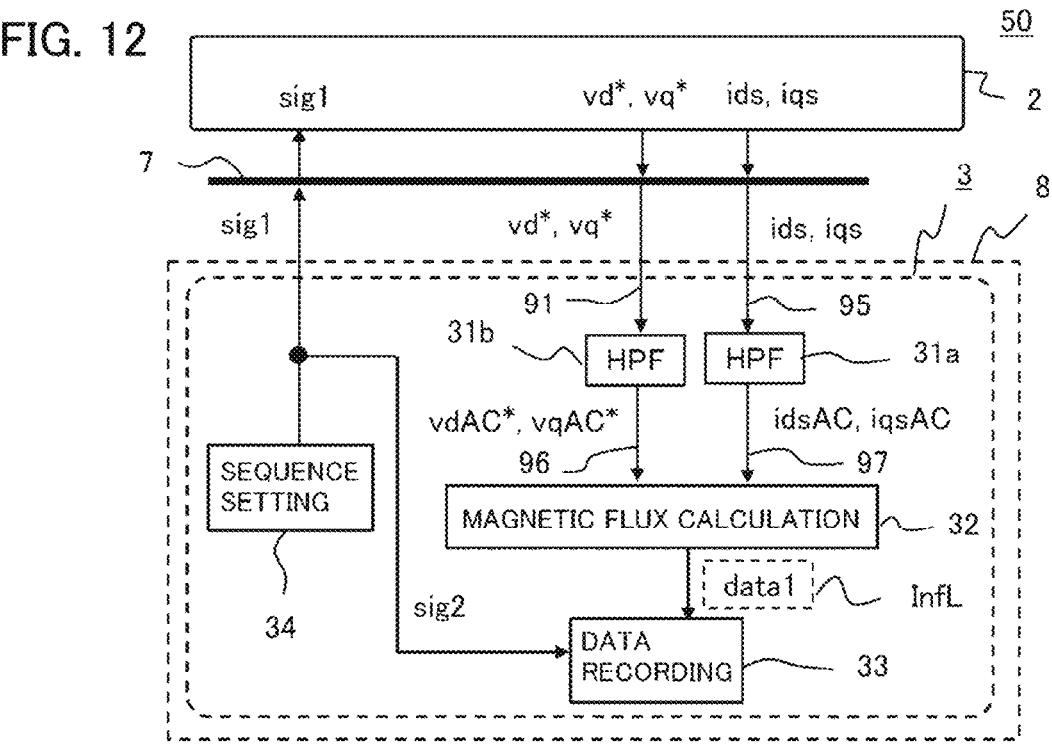
FIG. 12 is a diagram showing a first example of a circuit block constructed in a server of FIG. 11.
Figure 13:
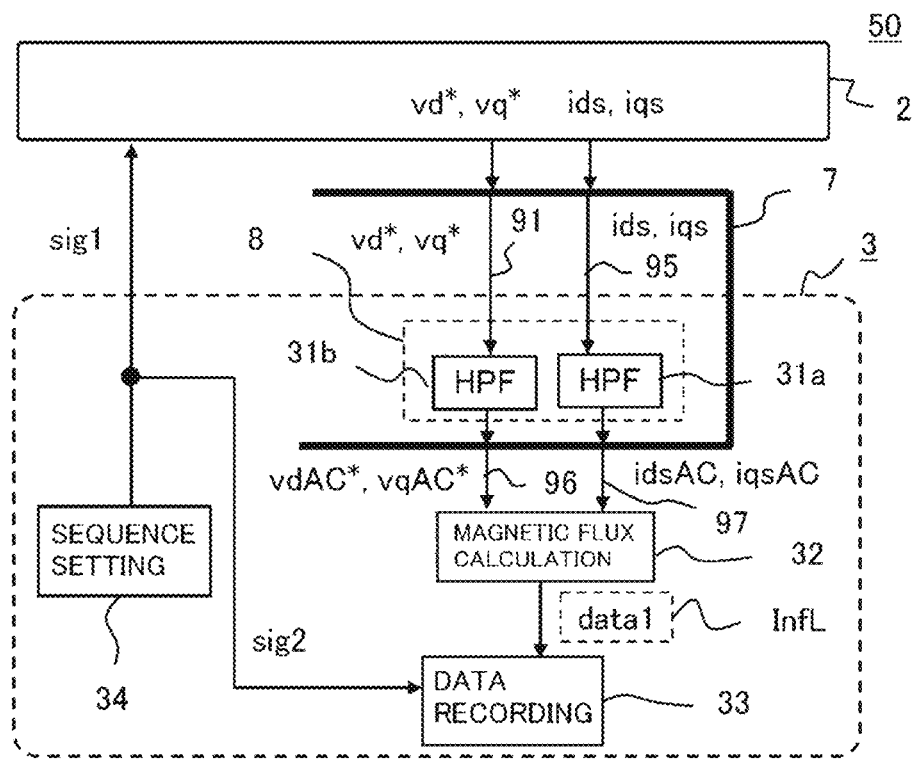
FIG. 13 is a diagram showing a second example of the circuit block constructed in the server of FIG. 11.
Figure 14:
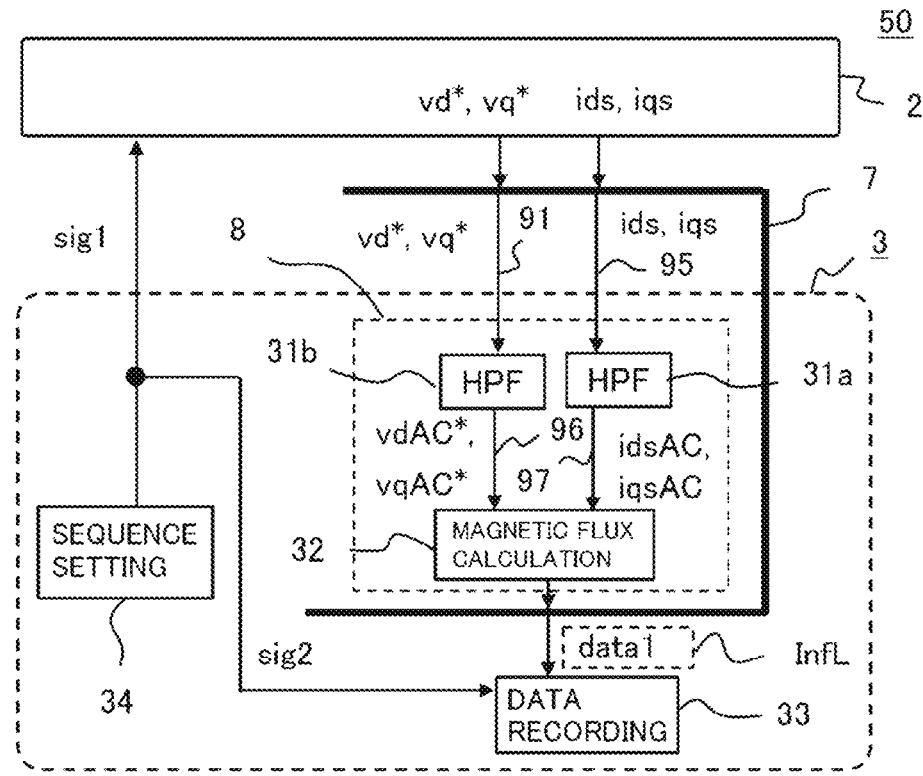
FIG. 14 is a diagram showing a third example of the circuit block constructed in the server of FIG. 11.
Figure 15:
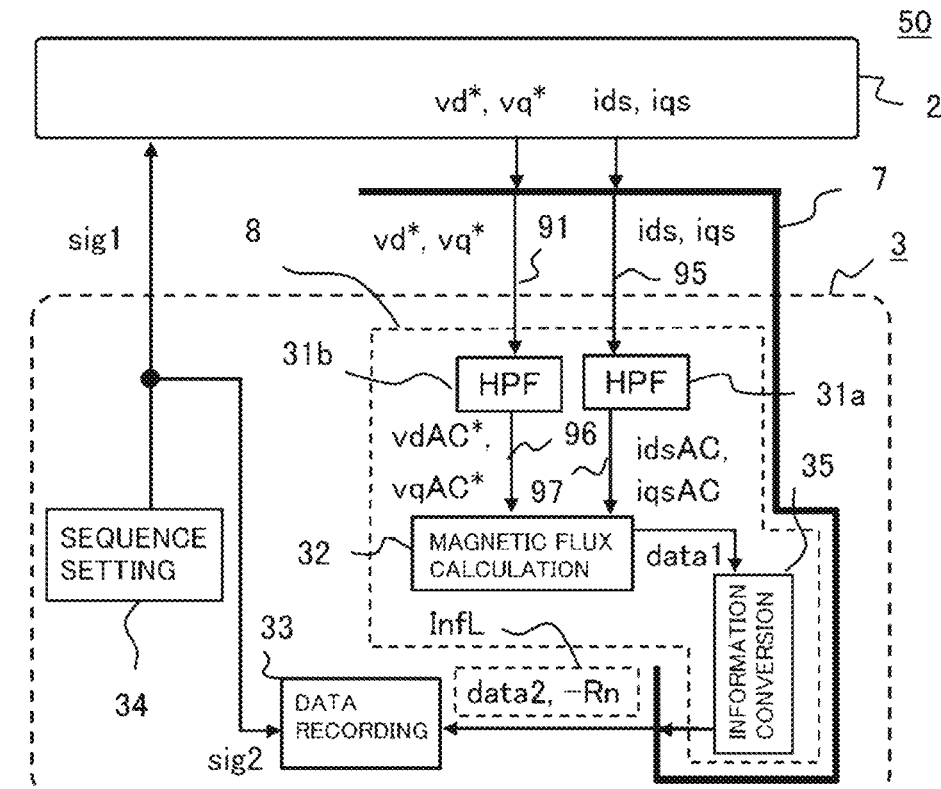
FIG. 15 is a diagram showing a fourth example of the circuit block constructed in the server of FIG. 11.

FIG. 11 is a diagram showing a configuration of a motor inductance measurement device according to Embodiment 4. FIG. 12 is a diagram showing a first example of a circuit block constructed in a server of FIG. 11, and FIG. 13 is a diagram showing a second example of the circuit block constructed in the server of FIG. 11. FIG. 14 is a diagram showing a third example of the circuit block constructed in the server of FIG. 11, and FIG. 15 is a diagram showing a fourth example of the circuit block constructed in the server of FIG. 11. FIG. 16 is a diagram showing a first example of accumulated data in which motor inductance information is accumulated, and FIG. 17 is a diagram showing a second example of the accumulated data in which the motor inductance information is accumulated. In the motor inductance measurement device 50, the energization control unit 2 and the inductance calculation unit 3 may be built in the same housing, or all or a part of the inductance calculation unit 3 may be constructed on the server 8 located externally via a communication network 7.

The motor inductance measurement device 50 according to Embodiment 4 is provided with a computer 60 including the processor 51 and the storage device 52, and the server 8 including a processor 58 and a storage device 59. When all or a part of the inductance calculation unit 3 is constructed on the external server 8 via the communication network 7, processing resources to be provided in the device on which the energization control unit 2 is mounted can be reduced by performing processing required for inductance measurement externally. There are a number of possible configurations for the inductance calculation unit 3 to be implemented on the server 8. FIG. 12 shows the motor inductance measurement device 50 of a first example having a configuration in which the function of the inductance calculating unit 3 is implemented by the server 8. FIG. 13 shows the motor inductance measurement device 50 of a second example having a configuration in which the high-pass filters 31a and 31b in the inductance calculating unit 3 are implemented by the server 8. In the case of FIG. 13, the high-pass filters 31a and 31b receive the dq-axis current 95 and the voltage command 91 respectively via the communication network 7. The high-pass filters 31a and 31b output signals of the dq-axis current AC component 97 and the voltage command AC component 96, which are processing results, to the magnetic flux calculation unit 32 of the inductance calculation unit 3 via the communication network 7.

FIG. 14 shows a motor inductance measurement device 50 of a third example having a configuration in which the high-pass filters 31a and 31b and the magnetic flux calculation unit 32 in the inductance calculation unit 3 are implemented by the server 8. In the case of FIG. 14, the high-pass filters 31a and 31b receive the dq-axis current 95 and the voltage command 91 respectively via the communication network 7. Further, the high-pass filters 31a and 31b output signals of the dq-axis current AC component 97 and the voltage command AC component 96, which are processing results, to the magnetic flux calculation unit 32. The magnetic flux calculation unit 32 outputs the motor inductance information InfL, which is the processing result, to the data recording unit 33 of the inductance calculation unit 3 via the communication network 7. Note that, in FIG. 12 to FIG. 14, the inductance calculation unit 3 of Embodiment 1 has been described as an example of the configuration of the inductance calculation unit 3, but also in the inductance calculation unit 3 of Embodiment 2, all or a part of the inductance calculation unit 3 can be implemented by the server 8.

FIG. 15 shows a motor inductance measurement device 50 of the fourth example having a configuration in which the high-pass filters 31a and 31b, the magnetic flux calculation unit 32, and the information conversion unit 35 in the inductance calculating unit 3 are implemented by the server 8. In the case of FIG. 15, the high-pass filters 31a and 31b receive the dq-axis current 95 and the voltage command 91 respectively via the communication network 7. The high-pass filters 31a and 31b output signals of the dq-axis current AC component 97 and the voltage command AC component 96, which are processing results, to the magnetic flux calculation unit 32. The magnetic flux calculation unit 32 outputs the loop-shaped magnetic flux data data1 which is the processing result to the information conversion unit 35. The information conversion unit 35 outputs the motor inductance information InfL, which is the processing result, to the data recording unit 33 of the inductance calculation unit 3 via the communication network 7.

The motor inductance measurement device 50 of Embodiment 4 can be set appropriately in consideration of the communication rate and capacity of the communication network 7 and the resources of the device in which the energization control unit 2 is mounted. Therefore, the motor inductance measurement device 50 of Embodiment 4 has an effect that the motor inductance measurement method described in Embodiment 1 or Embodiment 2 can be implemented with a larger number of configurations.

Further, since the motor inductance measurement device 50 of Embodiment 4 includes the server 8 and a device in which the energization control unit 2 such as the computer 60 is installed, a motor type name or a motor specification and the corresponding set of motor inductance information InfL, that is, the motor inductance information set InfLs, may be accumulated in the server 8. Here, the subscript s indicates that the motor inductance information InfL measured for a certain motor under a plurality of the energization conditions is a set obtained by collecting a plurality of pieces of the motor inductance information InfL corresponding to a plurality of the energization conditions. FIG. 16 and FIG. 17 show a first example and a second example of accumulated data data3 in which sets of the motor inductance information InfL are accumulated, respectively. In the accumulated data data3 shown in FIG. 16, the set of the motor inductance information InfL is a set of the loop-shaped magnetic flux data data1 described in Embodiment 1, namely, loop-shaped magnetic flux data set data1s, and is accumulated in association with motor information InfM. In FIG. 16, data of n motors are accumulated, and the motor information and the motor inductance information set for the n-th motor are denoted as InfMn and InfLsn, respectively. Loop-shaped flux data set data1s for the n-th motor is denoted as data1s-n. For the first to third motors, n is changed to 1, 2, and 3 for the denotation, respectively.

In the accumulated data data3 shown in FIG. 17, the set of the motor inductance information InfL is a set of the non-loop-shaped magnetic flux data data2 and the negative resistance Rn described in Embodiment 2, that is, magnetic flux data and negative resistance set data2&Rns, and is accumulated in association with the motor information InfM. In FIG. 17, data of n motors are accumulated, the motor information and the motor inductance information set for the n-th motor are denoted as InfMn and InfLsn, respectively. The magnetic flux data and negative resistance set data2&Rns for the n-th motor is denoted as data2&Rns-n. For the first to third motors, n is changed to 1, 2, and 3 for the denotation, respectively.

When the set of motor inductance information InfL, namely, the motor inductance information set InfLs, is accumulated as in the accumulated data data3, the motor inductance information InfL of the corresponding motor can be received from the server 8 by transmitting the motor specification or the motor type name to the server 8. Even if there is no corresponding motor, the motor inductance information set InfLs of a motor having a similar specification can be received. As a result, by using the motor inductance information InfL of the motor having a similar specification, it is also possible to reduce the time required for the measurement operation such as energization to zero.

Embodiment 5

Figure 18:
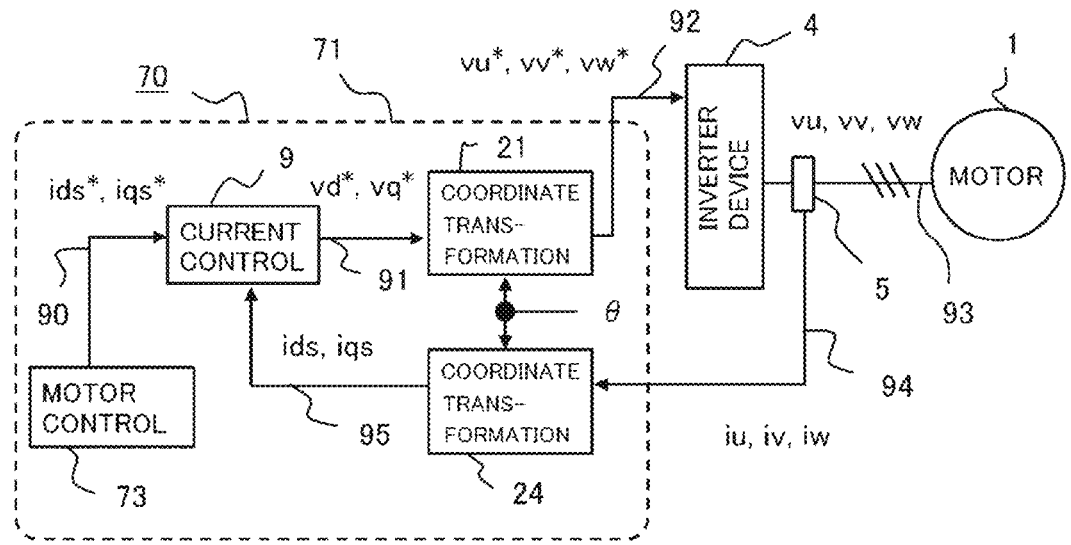
FIG. 18 is a diagram showing a configuration of a motor drive system according to Embodiment 5.
Figure 19:
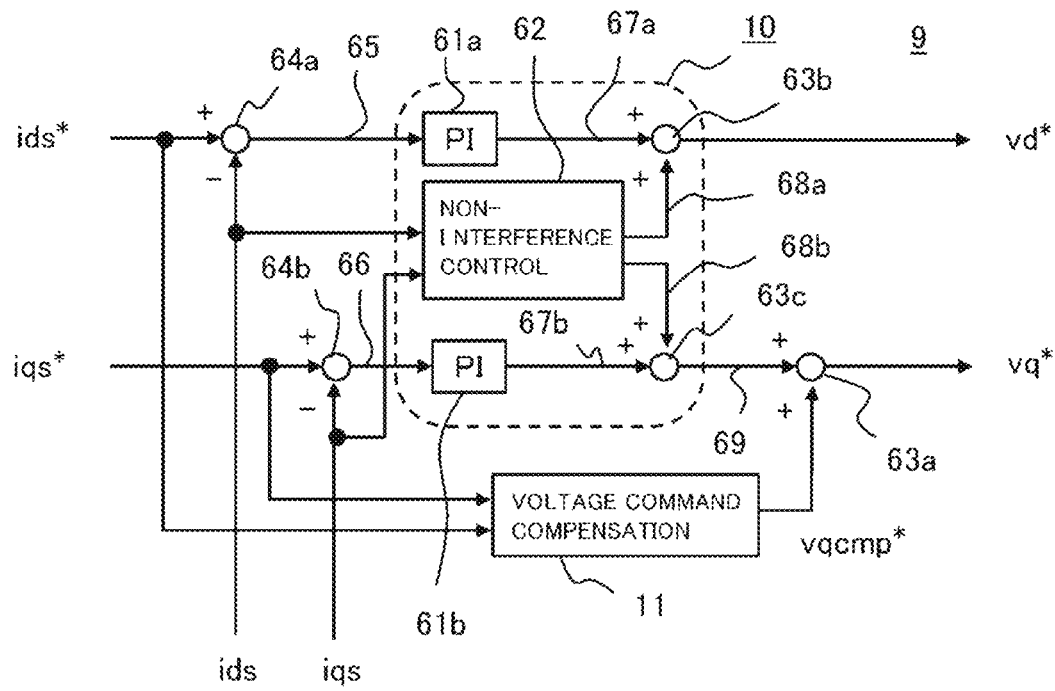
FIG. 19 is a diagram showing a configuration of a current control unit of FIG. 18.
Figure 20:
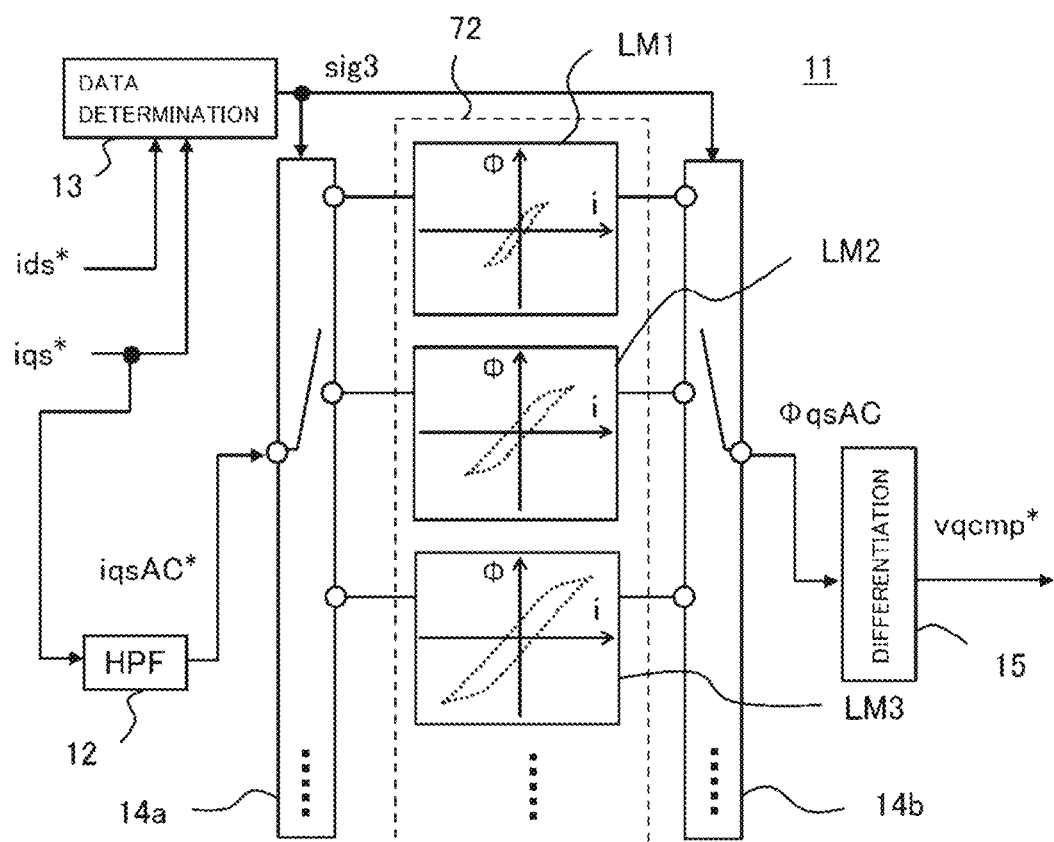
FIG. 20 is a diagram showing the configuration of a voltage command compensation unit of FIG. 19.

FIG. 18 is a diagram showing a configuration of a motor drive system according to Embodiment 5. FIG. 19 is a diagram showing a configuration of a current control unit of FIG. 18, and FIG. 20 is a diagram showing a configuration of a voltage command compensation unit of FIG. 19. The motor drive system 70 of Embodiment 5 is composed of an energization control device 71 for performing energization control processing so that a desired current can flow through the motor 1. The motor drive system 70 of Embodiment 5 utilizes the motor inductance information InfL described in Embodiment 1 for the motor control. Here, a description will be given on a configuration which is utilized for a high response in the motor current control.

The energization control device 71 includes a motor control unit 73, a current control unit 9, the coordinate transformation unit 21, and the coordinate transformation unit 24. The motor control unit 73 outputs the current command 90 for the motor control. The motor control unit 73 corresponds to the current command output unit 23 of Embodiment 1. The current control unit 9 receives the current command 90 and the dq-axis current 95, performs processing such as PI control and non-interference control, and outputs the voltage command 91. The current control unit 9 corresponds to the current control unit 22 of Embodiment 1.

The current control unit 9 will be described. The current control unit 9 includes a voltage command generation unit 10, a voltage command compensation unit 11, subtractors 64a and 64b, and an adder 63a. The current control unit 9 compensates for an initial dq-axis voltage command (two-axis voltage command) output by the voltage command generation unit 10 on the basis of a compensation voltage command vqcmp* output by the voltage command compensation unit 11 to generate the voltage command 91 which is a dq-axis voltage command. The subtractor 64a subtracts the d-axis current ids from the d-axis current command ids* to output a d-axis current control deviation 65. The subtractor 64b subtracts the q-axis current iqs from the q-axis current command iqs* to output a q-axis current control deviation 66. The voltage command generation unit 10 includes PI controllers 61a and 61b, a non-interference control unit 62, and adders 63b and 63c. The voltage command generation unit 10 receives the control deviations of the dq-axis current, namely, the d-axis current control deviation 65 and the q-axis current control deviation 66, as well as the d-axis current ids and the q-axis current iqs, performs the PI control processing and the non-interference control, and outputs the d-axis voltage command vd* and a signal 69 before the compensation processing of the q-axis voltage command vq* in the dq-axis voltage command 91. Note that the signal 69 can also be called the initial command of the q-axis voltage command vq*. The non-interference control is processing for suppressing the electromagnetic interference term between the d and q axes.

The adder 63b adds a signal 67a output from the PI controller 61a and a signal 68a output from the non-interference control unit 62 to output the d-axis voltage command vd* of the voltage command 91. The adder 63c adds a signal 67b from the PI controller 61b and a signal 68b from the non-interference control unit 62 to output the signal 69. The signal 68a is a signal on the d-axis side and the signal 68b is a signal on the q-axis side. The voltage command compensation unit 11 is a circuit that simulates a complicated change of the inductance of the motor 1 and compensates for the voltage command. The voltage command compensation unit 11 receives the d-axis current command ids* and the q-axis current command iqs* and outputs the compensation voltage command vqcmp*. The adder 63a adds the signal 69 and the compensation voltage command vqcmp* to output the q-axis voltage command vq* of the voltage command 91.

The voltage command generation unit 10 is a well-known technique, and details thereof are described in Document A, and therefore, a description thereof will be omitted. In the voltage command generation unit 10, current control response thereof is set by feedback gains of the PI controllers 61a and 61b. As shown in FIG. 5, the q-axis magnetic flux AC components ΦqsAC of the motor 1 change in a complicated manner in response to the q-axis current AC components iqsAC. That is, it can be said that the magnetic flux of the motor 1 shows a complicated change in response to the current, and the inductance also changes in a complicated manner. The q-axis voltage command vq* containing the q-axis voltage command AC component vqAC* shown in FIG. 2 is an energization command for measuring the motor inductance information InfL. Therefore, the current control unit 22 of FIG. 1 does not require processing for the voltage command compensation, and is composed of the voltage command generation unit 10 and the subtractors 64a and 64b.

When the motor inductance information InfL is measured, a sinusoidal current command is given to perform the measurement. However, as shown in FIG. 5, the magnetic flux of the motor 1 changes in a complicated manner, and the response (processing speed) decreases due to the complex change in the inductance accompanied by the change in the magnetic flux. Therefore, when the motor inductance information InfL is measured, as shown in FIG. 3, the current wave forms of the q-axis current AC components iqsAC are distorted. Also, as shown in FIG. 2, the q-axis voltage command AC components vqAC* also have forms that cannot be called sinusoidal waves. In this case, it is difficult to say that the high response performance necessary for the current control of the motor 1 can be achieved by the designing only with the feedback gains in the PI controllers 61a and 61b in the current control unit 22.

The current control unit 9 of Embodiment 5 includes the configuration of the current control unit 22 of Embodiment 1 and the voltage command compensation unit 11 for compensating for the voltage command by simulating the complicated change of the inductance of the motor 1. The voltage command compensation unit 11 uses the motor inductance information InfL of Embodiment 1. The voltage command compensation unit 11 outputs the q-axis magnetic flux AC component ΦqsAC in which the influence of inductance in response to the change in the q-axis current AC component iqsAC is contained, and outputs a signal obtained by time differentiating the q-axis magnetic flux AC component ΦqsAC as the compensation voltage command vqcmp*. The current control unit 9 of Embodiment 5 adds the signal of the compensation voltage command vqcmp* to the signal 69 on the q-axis side in the voltage command generation unit 10, and outputs the q-axis voltage command vq* in which a voltage component associated with the complicated change of the inductance of the motor 1 is compensated. The motor drive system 70 of Embodiment 5 controls the motor 1 using the q-axis voltage command vq* in which the voltage component associated with the complicated change of the inductance of the motor 1 is compensated, so that a voltage command without the complicated noise based on only the PI control and the non-interference control can be outputted. Since the current flows linearly in response to the voltage command, the motor drive system 70 of Embodiment 5 can improve the current control response; that is, high response performance can be achieved. In addition, the motor drive system 70 of Embodiment 5 can improve the current control accuracy as well as the current control response.

FIG. 20 shows an example of a configuration of the voltage command compensation unit 11. The voltage command compensation unit 11 includes a high-pass filter 12, a data determination unit 13, selecting units 14a and 14b, an information storage device 72, and a differentiator 15. The information storage device 72 stores the loop-shaped magnetic flux data data1 which is the motor inductance information InfL measured in accordance with the magnitude of the DC component of the q-axis current command iqs*, the amplitude of the AC component, and the magnitude of the DC component of the d-axis current command ids*, namely the motor inductance information InfL measured for each of the energization conditions. The loop-shaped magnetic flux data data1 measured for each of the energization conditions is arranged as inductance information maps. The information storage device 72 stores a plurality of the inductance information maps. The inductance information map is, for example, a graph in which one characteristic in FIG. 5 is shown. In FIG. 20, three inductance information maps LM1, LM2, and LM3 having different energization conditions are shown. The voltage command compensation unit 11 selects one of the maps recorded in the information storage device 72 in accordance with the energization condition, and inputs the AC component of the q-axis current command iqs*, namely, the axis q-axis current command AC component iqsAC*, to the selected map to generate the q-axis magnetic flux AC component ΦqsAC. Note that, in FIG. 20, the inductance information map is selected in accordance with the dq-axis current command, but it is of course possible to refer to the dq-axis current.

The operation of the voltage command compensation unit 11 will be described in detail. The data determination unit 13 determines the energization condition from the d-axis current command ids* and the q-axis current command iqs*, and outputs a selection signal sig3 for selecting the inductance information map LM1, LM2, or LM3. The high-pass filter 12 outputs the q-axis current command AC component iqsAC* as AC component from the q-axis current command iqs*. The selecting unit 14a and the selecting unit 14b switch signal paths so that the data of the inductance information map LM1, LM2, or LM3 selected by the data determination unit 13 can be read out. The voltage command compensation unit 11 further differentiates the q-axis magnetic flux AC component ΦqsAC generated referring to the selected inductance information map by the differentiator 15, converts the signal 69, which is the initial command of the q-axis voltage command vq*, into the compensation voltage command vqcmp* for compensating for the signal 69 to output vqcmp*.

In the motor drive system 70 of Embodiment 5, by using the voltage command compensation unit 11, the current control response is improved; that is, high response performance can be achieved. In particular, in the motor 1 such as a compressor in which load torque varies periodically, the q-axis current command iqs* also varies periodically, so that the motor drive system 70 of Embodiment 5 can improve the current control response by using the voltage command compensation unit 11, and as a result, it is possible to suppress the speed pulsation or the vibration of the compressor housing, which is caused by the pulsation of the load torque.

The current control unit 9 of Embodiment 5 can improve the current control response of the current control unit 9 by using the motor inductance information InfL of Embodiment 1 in the voltage command compensation unit 11. Since the motor drive system 70 of Embodiment 5 includes the current control unit 9 using the motor inductance information InfL of Embodiment 1, the current control response of the motor 1 can be improved, and the response speed and the accuracy in the control of the motor 1 can be improved.

The information storage device 72 stores the loop-shaped magnetic flux data data1 serving as the motor inductance information InfL measured for each of the energization conditions. That is, a plurality of the loop-shaped magnetic flux data data1 which are a plurality of pieces of the motor inductance information InfL are stored therein. The motor inductance information InfL includes the relationship between the q-axis current AC component iqsAC corresponding to the instantaneous value of the AC current and the q-axis magnetic flux AC component ΦqsAC corresponding to the instantaneous value of the AC magnetic flux, which are calculated on the basis of the AC voltage applied to at least one axis (for example, q-axis) on the two-axis orthogonal rotation coordinates and the AC current (for example, q-axis current iqs) that flows caused by the AC voltage. That is, the motor inductance information InfL includes the q-axis magnetic flux AC component ΦqsAC corresponding to the instantaneous value of the AC magnetic flux, which is in response to the q-axis current AC component iqsAC corresponding to the instantaneous value of the AC current.

Accordingly, the information storage device 72 may be referred to as an inductance output unit that holds the relationship between the q-axis current AC component iqsAC corresponding to the instantaneous value of the dq-axis current on the two-axis orthogonal rotation coordinates of the motor 1 and the q-axis magnetic flux AC component ΦqsAC corresponding to the instantaneous value of the magnetic flux of the motor 1, namely, the loop-shaped magnetic flux data data1 as the motor inductance information InfL and outputs the motor inductance information InfL. It can be said that the motor drive system 70 of Embodiment 5 controls the motor by using the motor inductance information InfL output from the inductance output unit.

Similarly to Embodiment 3, the energization control device 71 of Embodiment 5 may have a configuration in which the function is implemented by signal processing of a program executed on the processor 51 and a result of signal processing in a logic circuit provided on the processor. Also in this case, since the motor drive system 70 of Embodiment 5 includes the current control unit 9 using the motor inductance information InfL of Embodiment 1, the current control response of the motor 1 can be improved, and the response speed and the accuracy in the control of the motor 1 can be improved.

As described above, the motor drive system 70 of Embodiment 5 is a motor drive system for controlling the motor 1. The motor drive system 70 of Embodiment 5 comprises the information storage device 72 for storing the inductance information (motor inductance information InfL) generated by the motor inductance measurement device 50 according to any one of Embodiments 1, 3, and 4, and controls the motor 1 on the basis of the inductance information (motor inductance information InfL). With this configuration, since the motor drive system 70 of Embodiment 5 controls the motor 1 on the basis of the inductance information (motor inductance information InfL), so that the current control response of the motor 1 can be improved, and the response speed and the accuracy in the control of the motor 1 can be improved.

Embodiment 6

Figure 21:
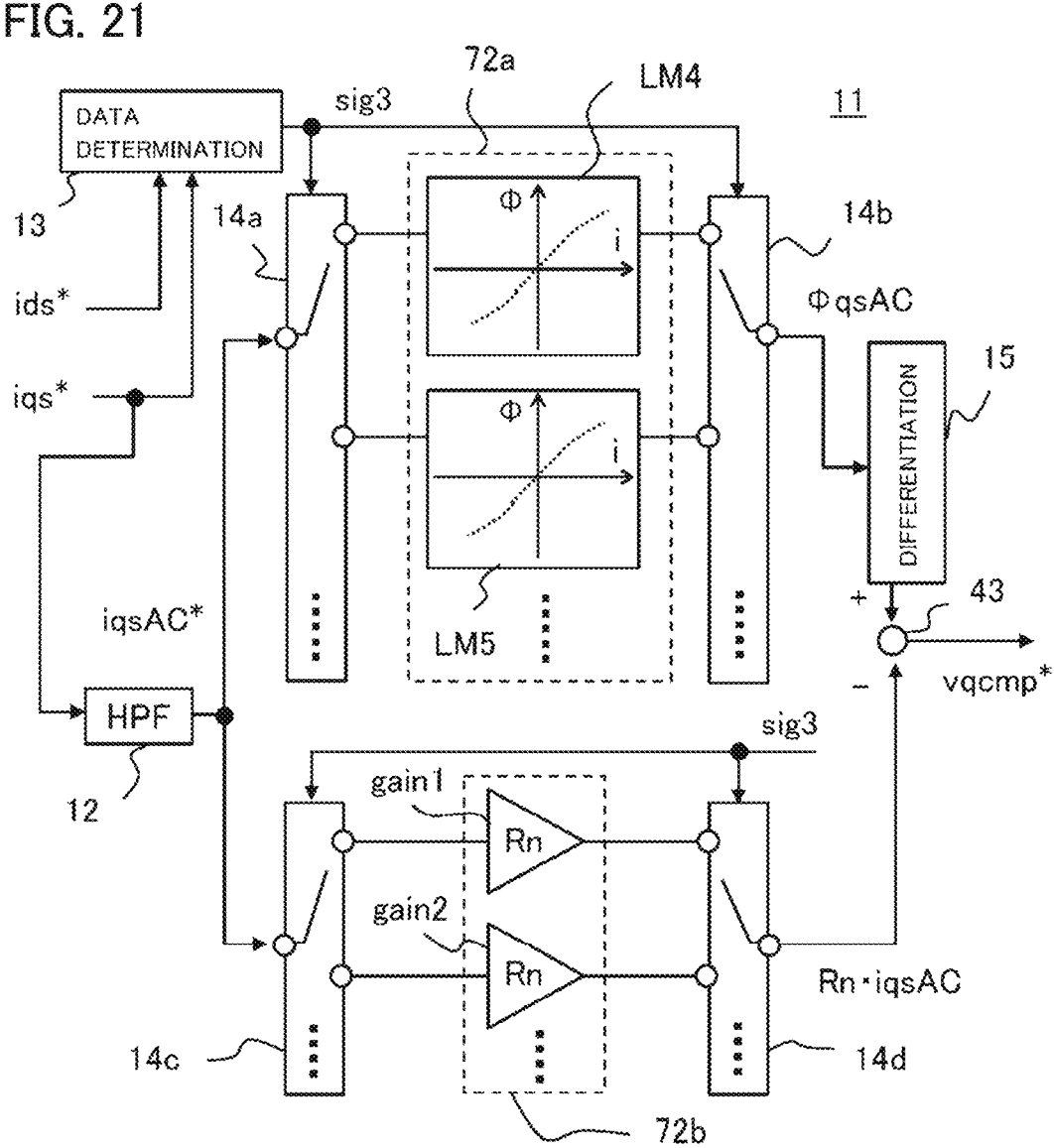
FIG. 21 is a diagram showing a configuration of a voltage command compensation unit according to Embodiment 6.

FIG. 21 is a diagram showing a configuration of a voltage command compensation unit according to Embodiment 6. The voltage command compensation unit 11 of Embodiment 6 shown in FIG. 21 uses the motor inductance information InfL described in Embodiment 2 for the motor control. The current control unit 9 including the voltage command compensation unit 11 of Embodiment 6 has the same configuration as that in FIG. 19, and the motor drive system 70 including the voltage command compensation unit 11 of Embodiment 6 has the same configuration as that in FIG. 18. The motor inductance information InfL of Embodiment 2 includes the non-loop-shaped magnetic flux data data2 and the negative resistance Rn, and the voltage command compensation unit 11 of Embodiment 6 internally stores a combination of the non-loop-shaped magnetic flux data data2 and the negative resistance Rn corresponding to the AC component of the motor current.

The voltage command compensation unit 11 of Embodiment 6 differs from the voltage command compensation unit 11 of Embodiment 5 in that the voltage command compensation unit 11 includes an information storage device 72a for storing the non-loop-shaped magnetic flux data data2 measured for each of the energization conditions and an information storage device 72b for storing the negative resistance Rn measured for each of the energization conditions, and includes selecting units 14c and 14d for switching the negative resistance Rn and an adder 43 for adding a signal on the non-loop-shaped magnetic flux data data2 side and a signal on the negative resistance Rn side.

In the voltage command compensation unit 11 of Embodiment 5, as shown in FIG. 20, the compensation voltage command vqcmp* is generated by time differentiating the q-axis magnetic flux AC component ΦqsAC. In the voltage command compensation unit 11 of Embodiment 6, the compensation voltage command vqcmp* is generated by time differentiating Equation (10) shown in Embodiment 2. In this case, if the resistance voltages at the stator resistance Rs and the rotor resistance Rr in Equation (10) are omitted on the assumption that they are dealt with by the voltage command generation unit 10, the compensation voltage command vqcmp* is calculated by Equation (11) obtained by transforming Equation (10). Note that, in Equation (11), "*" in the compensation voltage command vqcmp* is indicated as superscript after vq.

[Mathematical 11]

$$v_{q\_cmp}^{*} = \frac{d\Phi_{qsAC}}{dt} - R_n \cdot i_{qsAC} \qquad (11)$$

Note that, the voltage command compensation unit 11 of FIG. 21, in order to enhance the current control response, is configured so that the q-axis current command AC component iqsAC* is input instead of the q-axis current AC component iqsAC of the second term of Equation (11). In the voltage command compensation unit 11 of FIG. 21, the compensation voltage command vqcmp* can also be generated by inputting the q-axis current command AC component iqsAC* instead of the q-axis current AC component iqaAC. The part different from those of Embodiment 5 will be mainly described on the operation of the voltage command compensation unit 11 of Embodiment 6.

The information storage device 72a stores the non-loop-shaped magnetic flux data data2 in the motor inductance information InfL measured in accordance with the magnitude of the DC component and the amplitude of the AC component in the q-axis current command iqs*, and the magnitude of the DC component of the d-axis current command ids*, namely in the motor inductance information InfL measured for each of the energization conditions. That is, a plurality of the non-loop-shaped magnetic flux data data2 in a plurality of pieces of the motor inductance information InfL are stored therein. The non-loop-shaped magnetic flux data data2 measured for each energization condition is arranged as the inductance information map. The information storage device 72a stores a plurality of the inductance information maps. The inductance information map is, for example, a graph in which one characteristic 57b in FIG. 8 is described. In FIG. 21, two inductance information maps LM4 and LM5 having different energization conditions are shown. In the information storage device 72b, the negative resistances Rn for each of the energization conditions under which the non-loop-shaped magnetic flux data data2 is measured, namely, a plurality of the negative resistances Rn are stored. The negative resistance Rn is represented as a gain, gain1 or gain2, with respect to the q-axis current command AC component iqsAC *. The voltage command compensation unit 11 selects one of the map recorded in the information storage device 72a and one of the gains corresponding to the negative resistance Rn recorded in the information storage device 72b in accordance with the energization condition. The voltage command compensation unit 11 inputs the AC component of the q-axis current command iqs*, namely, the q-axis current command AC component iqsAC*, to a selected map to generate the q-axis magnetic flux AC component ΦqsAC, and generates Rn·iqsAC obtained by calculating the q-axis current command AC component iqsAC* with a selected gain.

The selecting unit 14a and the selecting unit 14b switch signal paths so that the data of the inductance information map LM4 or LM5 selected by the data determination unit 13 can be read out. Similarly to the selecting units 14a and 14b, the selecting units 14c and 14d switch appropriate signal paths in accordance with the selection signal sig3 so that the data of the gain selected by the data determination unit 13 can be read out. The q-axis magnetic flux AC component ΦqsAC generated referring to the selected inductance information map is further differentiated by the differentiator 15 to become a first signal, and the q-axis current command AC component iqsAC* is multiplied by the gain corresponding to the selected negative resistance Rn and calculated to be a voltage to become a second signal. The voltage command compensation unit 11 adds the first signal and the second signal to generate the compensation voltage command vqcmp* for compensating for the signal 69 which is the initial command of the q-axis voltage command vq*.

By configuring the voltage command compensation unit 11 as shown in FIG. 21, in the current control unit 9, the motor drive system 70 of Embodiment 6 can compress and keep the motor inductance information InfL, as described in Embodiment 2, thereby can reduce the data recording capacity. Further, the current control unit 9 of Embodiment 6 does not need to determine the magnitude of the amplitude of the q-axis current command AC component iqsAC*, and can immediately generate the q-axis magnetic flux AC component ΦqsAC by referring to the instantaneous value of the q-axis current command AC component iqsAC*. That is, the current control unit 9 of Embodiment 6 can simplify the processing more than the current control unit 9 of Embodiment 5 so that the compensation voltage command vqcmp* can be generated fast. Since the current control unit 9 of Embodiment 6 does not need to calculate the amplitude of the q-axis current command AC component iqsAC*, the compensation voltage command vqcmp* can be immediately generated in accordance with the q-axis current command AC component iqsAC* which is non-periodic. That is, the current control unit 9 of Embodiment 6 can improve the current control response even if the q-axis current command iqs* does not include a periodic current waveform. For example, in the case of driving a motor for positioning, namely, a servo motor, using the voltage command compensation unit 11 of Embodiment 6, the effects of improving positioning accuracy and shortening settling time can be obtained.

The current control unit 9 of Embodiment 6 can improve the current control response of the current control unit 9 by using the motor inductance information InfL of Embodiment 2 in the voltage command compensation unit 11. Since the motor drive system 70 of Embodiment 6 includes the current control unit 9 using the motor inductance information InfL of Embodiment 2, the current control response of the motor 1 can be improved, and the response speed and the accuracy in the control of the motor 1 can be improved.

The information storage devices 72a and 72b store the non-loop-shaped magnetic flux data data2 and the negative resistance Rn which serve as the motor inductance information InfL measured for each of the energization conditions, that is, a plurality of the non-loop-shaped magnetic flux data data2 and the negative resistances Rn which serve as a plurality of pieces of the motor inductance information InfL, respectively. The non-loop-shaped flux data data2 includes the relationship between the q-axis current AC component iqsAC corresponding to the instantaneous value of the AC current and the q-axis magnetic flux AC component ΦqsAC corresponding to the instantaneous value of the AC magnetic flux, which are calculated on the basis of the AC voltage applied to at least one axis (for example, q-axis) on the two-axis orthogonal rotation coordinates and the AC current (for example, q-axis current iqs) that flows caused by the AC voltage. That is, the non-loop-shaped magnetic flux data data2 includes the q-axis magnetic flux AC component ΦqsAC corresponding to the instantaneous value of the AC magnetic flux, which is in response to the q-axis current AC component iqsAC corresponding to the instantaneous value of the AC current.

Accordingly, the information storage devices 72a and 72b may be referred to as an inductance output unit that keeps the relationship between the q-axis current AC component iqsAC corresponding to the instantaneous value of the dq-axis current on the two-axis orthogonal rotation coordinates of the motor 1 and the q-axis magnetic flux AC component ΦqsAC corresponding to the instantaneous value of the magnetic flux of the motor 1, namely, the non-loop-shaped magnetic flux data data2 and the negative resistance Rn as the motor inductance information InfL, and outputs the motor inductance information InfL. It can be said that the motor drive system 70 of Embodiment 6 controls the motor by using the motor inductance information InfL output from the inductance output unit.

Similarly to Embodiment 3, the energization control device 71 of Embodiment 6 may have a configuration in which the function is implemented by signal processing of a program executed on the processor 51 and a result of signal processing in a logic circuit provided on the processor. Also in this case, since the motor drive system 70 of Embodiment 6 includes the current control unit 9 using the motor inductance information InfL of Embodiment 2, the current control response of the motor 1 can be improved, and the response speed and the accuracy in the control of the motor 1 can be improved.

As described above, the motor drive system 70 of Embodiment 6 is a motor drive system for controlling the motor 1. The motor drive system 70 of Embodiment 6 comprises the information storage device 72a and 72b for storing the inductance information (motor inductance information InfL) generated by the motor inductance measurement device 50 according to any one of Embodiments 2, 3, and 4, and controls the motor 1 on the basis of the inductance information (motor inductance information InfL). With this configuration, since the motor drive system 70 of Embodiment 6 controls the motor 1 on the basis of the inductance information (motor inductance information InfL), so that the current control response of the motor 1 can be improved, and the response speed and the accuracy in the control of the motor 1 can be improved.

Embodiment 7

Figure 22:
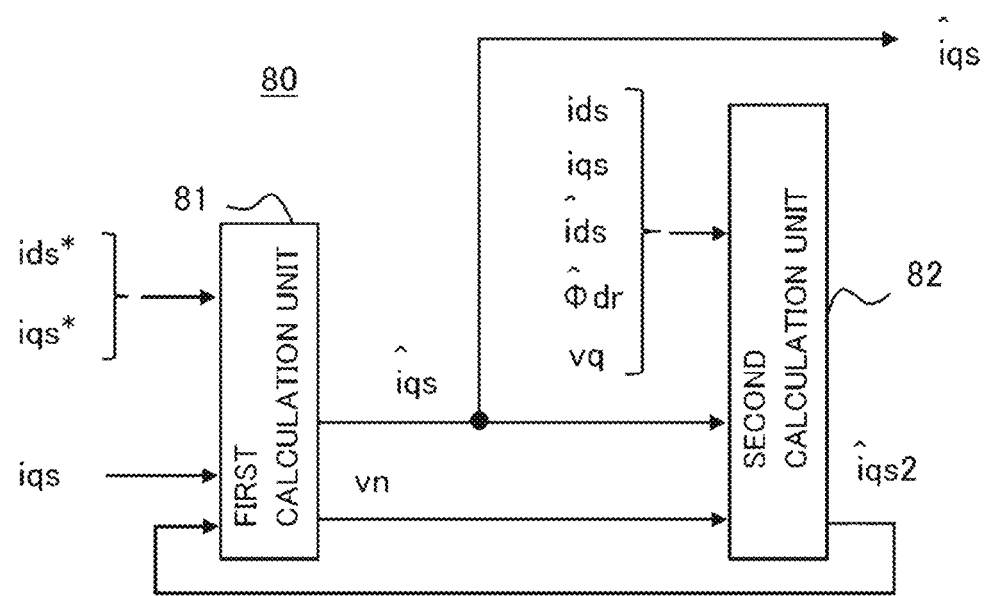
FIG. 22 is a diagram showing a configuration of a part of an observer according to Embodiment 7.
Figure 23:
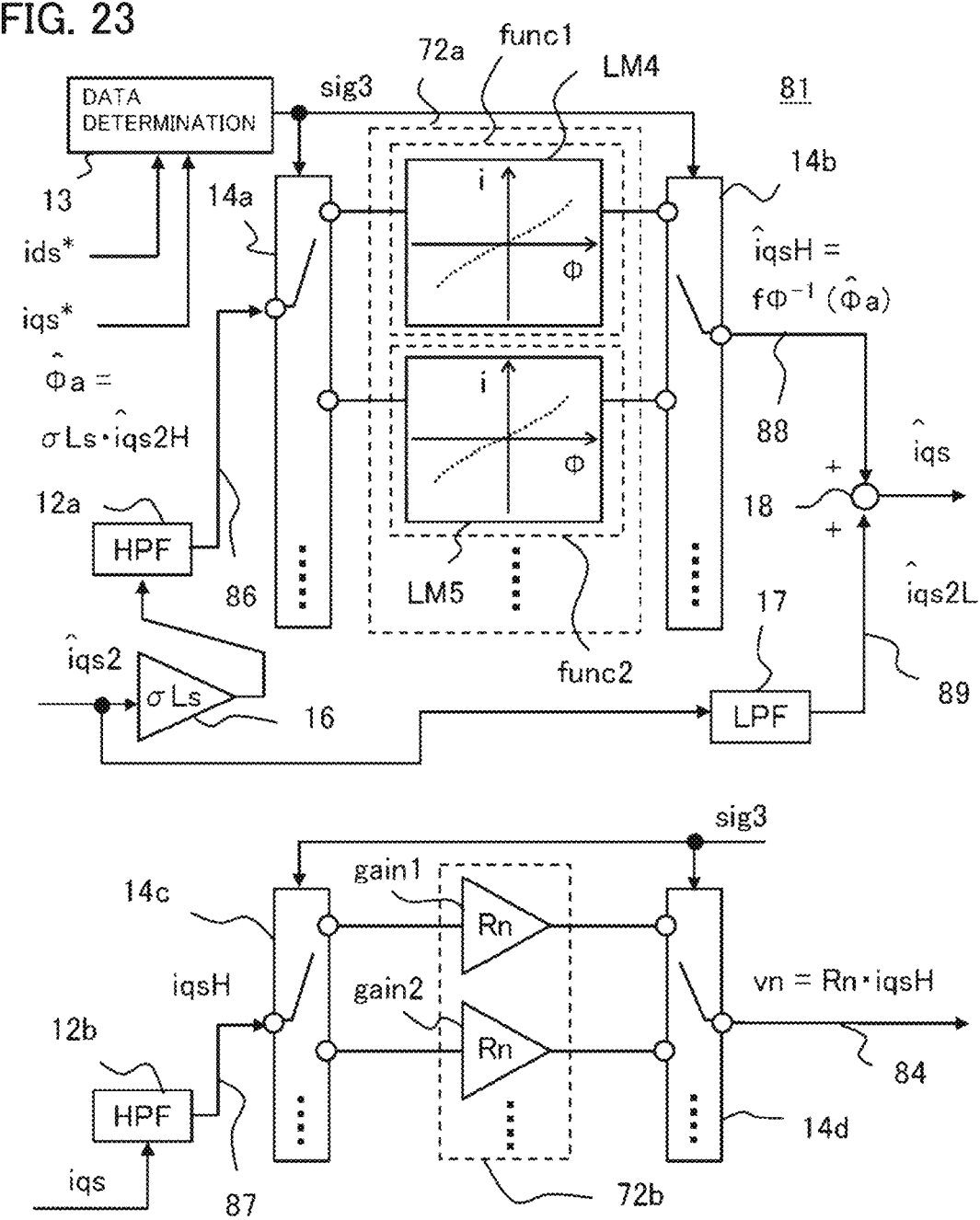
FIG. 23 is a diagram showing a configuration of a first arithmetic unit of FIG. 22.
Figure 24:
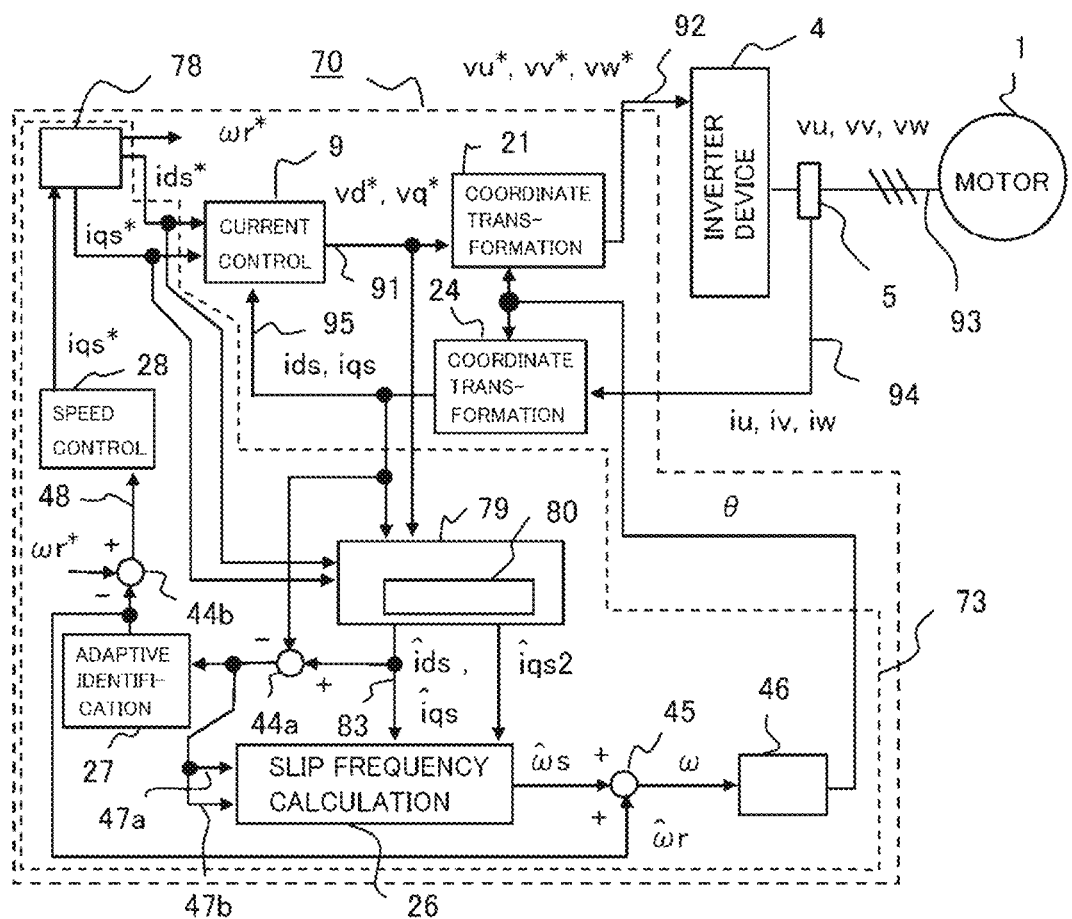
FIG. 24 is a diagram showing a configuration of a motor drive system according to Embodiment 7.

In Embodiment 7, a configuration will be described in a case in which the motor inductance information InfL described in Embodiment 1 or Embodiment 2 is used for the motor control, particularly for an observer (state estimator) 79 of the motor 1. FIG. 22 is a diagram showing a configuration of a part of the observer according to Embodiment 7, and FIG. 23 is a diagram showing a configuration of a first calculation unit of FIG. 22. FIG. 24 is a diagram showing a configuration of a motor drive system according to Embodiment 7. Note that FIG. 24 shows the observer 79 and an observer main part 80 which is a part of the configuration of the observer 79. The observer main part 80 shown in FIG. 22 has a configuration of a q-axis stator side circuit part. Note that the observer main part 80 shown in FIG. 22 has a configuration in the case in which the motor inductance information InfL on the q-axis side obtained by the AC energization to the q-axis is used. The observer simulates electric circuit operation of the motor 1, and is configured to receive current information and voltage information applied to the motor 1 and estimate a state of the motor 1 (for example, motor current, etc.). Further, when the motor current is estimated, the difference between the detection current of the motor 1 and the estimated current estimated by the observer is fed back through a predetermined gain. By devising the configuration of this gain, a sensor-less control system for controlling the motor without detecting the magnetic pole position and the speed of the motor 1 is constructed.

In a sensor-less control method in which the motor is controlled without detecting the magnetic pole position and the speed of the motor 1 by sensors, a state value of an observation target, that is, an estimated value of the observation target is calculated by using the observer which simulates the electric circuit operation of the motor 1 inside the current control system. This observer uses motor parameters, which contain the inductance.

By applying the motor inductance information InfL of Embodiment 1 or Embodiment 2 to the observer, the accuracy in the estimation of the motor current is greatly improved when the motor current is estimated. On the basis of the consideration in which a current estimation error, which is a difference between the detection current and the estimated current, is caused by an error in the estimated value of the electrical angular speed of a motor, which is contained in the observer, the sensor-less control using the observer performs processing to modify the estimated value of the electrical angular speed using adaptive identification processing on the current estimation error. Since the estimated value of the electrical angular speed is a value obtained by multiplying the rotational speed of the motor by the number of pole pairs, the rotational speed of the motor can be estimated by dividing the estimated value of the electrical angular speed by the number of pole pairs. Further, in consideration of the principle of the sensor-less control, it is also necessary to accurately grasp the motor parameters other than the estimated value of the electrical angular speed used for the observer. By using the motor inductance information InfL of Embodiment 1 or Embodiment 2, the observer main part 80 and the observer 79 of Embodiment 7 improve the current estimation accuracy and further improve the estimation accuracy in the estimated value of the electrical angular speed.

The observer main part 80 shown in FIG. 22 includes the first calculation unit 81 and a second calculation unit 82. The observer main part 80 is an example of the q-axis stator side circuit part which calculates a q-axis current estimated value $\hat{i}qs$. $\hat{i}qs$ represents an estimate of the q-axis current iqs. The first calculation unit 81 receives the d-axis current command ids*, the q-axis current command iqs*, the q-axis current iqs, and a q-axis current intermediate estimated value $\hat{i}qs2$ which is output from the second calculation unit 82, and outputs the q-axis current estimated value $\hat{i}qs$ and a voltage drop term vn cause by the negative resistance Rn. The second calculation unit 82 receives the d-axis current ids, the q-axis current iqs, a d-axis current estimated value ids, a d-axis magnetic flux estimated value $\hat{\Phi}dr$, the q-axis voltage vq, the q-axis current estimated value $\hat{i}qs$ which is output from the first calculation unit 81, and the voltage drop term vn caused by the negative resistance Rn, and calculates the q-axis current intermediate estimated value $\hat{i}qs2$. $\hat{i}qs2$ represents an intermediate variable (for estimation) for estimating the q-axis current iqs, namely, an intermediate estimated value of the q-axis current. $\hat{i}da$ and $\hat{\Phi}dr$ represent estimated values of the d-axis current ids and the d-axis rotor magnetic flux $\Phi dr$, respectively.

For example, when sensor-less speed control is performed for the motor 1, the motor 1 is energized by the dq-axis current command (ids*, iqs*) in accordance with the speed command to the motor 1. The dq-axis current command (ids*, iqs*) is the current command 90 shown in FIG. 18. As can be seen from the relationship between the q-axis current AC component iqsAC and the q-axis magnetic flux AC component $\Phi qsAC$ shown in FIG. 5, the AC component of the magnetic flux of the motor 1 vary complicatedly in response to the q-axis current. Similarly, the inductance between the motor magnetic flux and the motor current varies in a complicated manner. As the q-axis energization (energization to the q-axis side) which instantaneously changes in response to the speed control is performed more, the inductance of the motor 1 changes, and accordingly, a current estimation error occurs, and the estimation accuracy in the estimated value of the electrical angular speed decreases. Since the q-axis energization is performed such that the speed control is performed in accordance with the estimated value of the electrical angular speed containing the error, a vicious circle occurs in the case in which the estimation accuracy of the estimated value of the electrical angular speed is reduced. Therefore, in the case in which the sensor-less speed control is performed in the motor 1, the speed control response may be reduced. Further, in the case in which the estimation accuracy in the estimated value of the electrical angular speed is reduced, the speed control accuracy may be reduced if the sensor-less speed control is performed in the motor 1.

In contrast, by using the motor inductance information InfL of Embodiment 1 or Embodiment 2 when the sensor-less speed control is performed for the motor 1, the vicious circle caused by the decrease in the estimation accuracy is broken, and the response of the sensor-less speed control and the speed control accuracy can be improved. As a further application, an AC torque in the motor 1 for testing is generated by using the q-axis current command (iqs*) as an AC, and an AC machine speed in response to the AC torque is estimated, and then on the basis of the amplitude and phase relationship of both signals (AC torque and AC machine speed estimated value), it becomes possible to improve the accuracy of the servo analyzer function for measuring a mechanical transfer characteristic of a load device connected to the motor 1, or to expand the measurement band thereof. Since the accuracy in the speed estimation is improved by applying the motor inductance information InfL of Embodiment 1 or Embodiment 2 to the observer, the effect of improving the measurement accuracy of the mechanical transfer characteristic of the load device and the effect of expanding the measurable frequency band, etc. can be obtained.

There are various methods for configuring the observer of the motor 1, and as an example, an observer in which the current and the magnetic flux on the two-axis orthogonal rotation coordinates are set as the state variables will be described for the induction motor described in Document A. Here, the observer is represented by Equation (12) to Equation (15).

[Mathematical 12]

$$\frac{d}{dt}\begin{bmatrix}\hat{i}_{ds}\\ \hat{i}_{qs}\\ \hat{\Phi}_{dr}\\ \hat{\Phi}_{qr}\end{bmatrix} = \begin{bmatrix}\left(-\frac{R_s}{\sigma L_s}-\frac{R_r\cdot(1-\sigma)}{\sigma L_s}\right)\cdot I - \omega\cdot J & \left(\frac{M\cdot R_r}{\sigma L_s L_r^2}\right)\cdot I - \left(\frac{\omega_{re}\cdot M}{\sigma L_s L_r}\right)\cdot J\\ \left(\frac{M\cdot R_r}{L_r}\right)\cdot I & \left(-\frac{R_s}{L_r}\right)\cdot I - \omega_{re}\cdot J\end{bmatrix}\begin{bmatrix}\hat{i}_{ds}\\ \hat{i}_{qs}\\ \hat{\Phi}_{dr}\\ \hat{\Phi}_{qr}\end{bmatrix} + \begin{bmatrix}\frac{1}{\sigma L_s}\cdot I\\ Z\end{bmatrix}\begin{bmatrix}v_d\\ v_q\end{bmatrix} + \begin{bmatrix}g_{11} & g_{12}\\ g_{21} & g_{22}\\ g_{31} & g_{32}\\ g_{41} & g_{42}\end{bmatrix}\begin{bmatrix}\hat{i}_{ds}-i_{ds}\\ \hat{i}_{qs}-i_{qs}\end{bmatrix} \quad (12)$$

[Mathematical 13]

$$I = \begin{bmatrix}1 & 0\\ 0 & 1\end{bmatrix} \quad (13)$$

[Mathematical 14]

$$J = \begin{bmatrix}0 & -1\\ 1 & 0\end{bmatrix} \quad (14)$$

[Mathematical 15]

$$Z = \begin{bmatrix}0 & 0\\ 0 & 0\end{bmatrix} \quad (15)$$

Here, g11, g12, g21, g22, g31, g32, g41, and g42 are observer feedback gains. As described in Embodiment 1 and Embodiment 2, it is assumed that the information corresponding to the leakage inductance σLs, namely, the motor inductance information InfL, is obtained by AC energization to the q-axis side, and the case where the motor inductance information InfL is incorporated into the observer will be described. The representation of the current on the q-axis stator side is extracted from Equation (12) to Equation (15) by which the observer 79 is represented, and is given by Equation (16). Similarly to Equation (1), in the calculation of the observer 79 represented by Equation (12) to Equation (15), the slip frequency is adjusted such that the value of the q-axis magnetic flux to be estimated, namely, a q-axis estimated magnetic flux value Φ^qr, is to be zero. This is reflected in Equation (16), and the q-axis estimated magnetic flux value Φ^qr becomes zero.

[Mathematical 16]

$$\frac{d\hat{i}_{qs}}{dt} = -\omega\cdot\hat{i}_{ds} + \left(-\frac{R_s}{\sigma L_s}-\frac{R_r\cdot(1-\sigma)}{\sigma L_s}\right)\cdot\hat{i}_{qs} + \left(-\frac{\hat{\omega}_{re}\cdot M}{\sigma L_s L_r}\right)\cdot\hat{\Phi}_{dr} + \frac{1}{\sigma L_s}\cdot v_q + g_{21}\cdot\left(\hat{i}_{ds}-i_{ds}\right) + g_{22}\cdot\left(\hat{i}_{qs}-i_{qs}\right) \quad (16)$$

Here, g21 and g22 are the observer feedback gains. ω^re is an estimate value of the electrical angular frequency are, namely, an estimated value of the electrical angular frequency. Vq is the q-axis voltage. The q-axis voltage vq is often substituted by the q-axis voltage command vq*. The leakage inductance σLs in Equation (16) is different from the motor inductance information InfL of Embodiment 1 or Embodiment 2, and is a value measured or designed by an existing technique. Therefore, the leakage inductance σLs is a fixed constant value or a value that varies in accordance with the magnitude of the DC component of the q-axis current iqs or the d-axis current ids.

The motor inductance information InfL of Embodiment 1 or Embodiment 2 is incorporated into Equation (16). Here, as the motor inductance information InfL, an example will be described in which the motor inductance information InfL described in Embodiment 2 is used. The motor inductance information InfL of Embodiment 2 is the combination of the non-loop-shaped magnetic flux data data2 which is the relationship between the q-axis magnetic flux AC component iqsAC and the q-axis magnetic flux AC component ΦqsAC, and the negative resistance Rn. The observer main part 80 of FIG. 22 is shown as a configuration in a case in which the motor inductance information InfL is used on the basis of the calculation of Equation (16). The observer main part 80 is largely composed of the first calculation part 81 and the second calculation part 82. The second calculation unit 82 incorporates the q-axis current estimated value i^qs and the voltage vn which is a term of the voltage drop caused by the negative resistance Rn, which are calculated by the first calculation unit 81, performs the calculation of Equation (17), and outputs the q-axis current intermediate estimated value i^qs2. Note that the voltage vn is expressed as a voltage drop vn caused by the negative resistance Rn as appropriate.

[Mathematical 17]

$$\frac{d\hat{i}_{qs2}}{dt} = -\omega\cdot\hat{i}_{ds} + \left(-\frac{R_s}{\sigma L_s}-\frac{R_r\cdot(1-\sigma)}{\sigma L_s}\right)\cdot\hat{i}_{qs2} + \left(-\frac{\hat{\omega}_{re}\cdot M}{\sigma L_s L_r}\right)\cdot\hat{\Phi}_{dr} + \frac{1}{\sigma L_s}\cdot v_q + g_{21}\cdot\left(i_{ds}-\hat{i}_{ds}\right) + g_{22}\cdot\left(i_{qs}-\hat{i}_{qs}\right) + \frac{1}{\sigma L_s}\cdot v_n \quad (17)$$

The first calculation unit 81 shown in FIG. 23 includes a proportional calculator 16, high-pass filters 12a and 12b, the data determination unit 13, the selecting units 14a, 14b, 14c and 14d, the information storage devices 72a and 72b, a low-pass filter 17, and an adder 18. The proportional calculator 16 outputs a signal obtained by multiplying the q-axis current intermediate estimated value i^qs2 by σLs to the high-pass filter 12a. The high-pass filter 12a outputs a high-frequency component of the signal output from the proportional calculator 16, namely a signal 86 of an AC component, to the selecting unit 14a. The signal 86 is the AC component of the signal obtained by multiplying the q-axis current intermediate estimated value i^qs2 by σLs, and is denoted by σLs·i^qs2H. The signal 86 may be referred to as a magnetic flux equivalent signal AC component which is a magnetic flux equivalent signal. In FIG. 23, σLs·i^qs2H is expressed by using the magnetic flux estimated value Φ^a in order to simply express a q-axis current estimated value AC component i^qsH, which is a signal 88 output by the selecting unit 14*b*. Note that a function fΦ and an inverse function fΦ$^{-1}$ of the function fΦ will be described later. The low-pass filter 17 outputs a signal 89 which is a DC component of the q-axis current intermediate estimated value i^qs2 or a low-frequency component close thereto, namely a low-frequency component i^qs2L of the q-axis current intermediate estimated value, to the adder 18. The high-pass filter 12*a* and the low-pass filter 17 have complementary transfer characteristics. Since the operations of the data determination unit 13 and the selecting units 14*a*, 14*b*, 14*c*, and 14*d* are the same as those in FIG. 21, the description thereof will be omitted. The adder 18 adds the signal 88 and the signal 89 that is output from the low-pass filter 17, and outputs the q-axis current estimated value i^qs, the signal 88 being the signal calculated using the inductance information maps LM4 or LM5 from the signal 86 output by the high-pass filter 12*a* and output from the selecting unit 14*b*.

The high-pass filter 12*b* outputs a q-axis current AC component iqsH, which is a high-frequency component, namely an AC component of the q-axis current iqs, to the selecting unit 14*c*. A signal 87 in FIG. 23 is the q-axis current AC component iqsH. A signal 84 calculated using the gain: gain1 or gain2, indicating the negative resistance Rn, is the voltage drop vn cause by the negative resistance Rn.

Generally, the q-axis current estimated value i^qs is obtained by adding an estimated value low-frequency component i^qsL of the q-axis current iqs and the estimated value high-frequency component (AC component) i^qsH of the q-axis current iqs. However, here, the q-axis current estimated value i^qs is obtained using the configuration of FIG. 23. Then it means that after passing through the low-pass filter 17, the DC component of the q-axis current intermediate estimated value i^qs2 or the low-frequency component close thereto, namely, the low-frequency component i^qs2L of the q-axis current intermediate estimated value, is directly used as the DC component of the q-axis current estimated value or the low-frequency component close thereto as i^qsL.

On the other hand, the high-frequency component (AC component) of the estimated value of the q-axis current iqs, that is, the q-axis current estimated value AC component i^qsH, which is the signal 88 output by the selecting unit 14*b*, is obtained by referring to the inverse function fΦ$^{-1}$ of the function fΦ from the signal equivalent to the q-axis magnetic flux. Note that the function fΦ is a function for converting the current i into the magnetic flux Φ, and the inverse function fΦ$^{-1}$ is a function for converting the magnetic flux Φ into the current i. The calculation of the q-axis current estimated value AC component i^qsH will be described more specifically. First, the q-axis current intermediate estimated value i^qs2 is multiplied by the leakage inductance σLs and processed by the high-pass filter 12*b* to calculate the signal 86 equivalent to the q-axis magnetic flux. Further, the q-axis current estimated value AC component i^qsH is obtained by referring to the inverse function fΦ$^{-1}$ of the function fΦ from the signal 86 equivalent to the q-axis magnetic flux. The configuration for obtaining the q-axis current estimated value AC component i^qsH means that the AC component of the q-axis current estimated value i^qs is obtained by reflecting the motor inductance information InfL of Embodiment 2.

When the q-axis current iqs of the motor changes fast and the inductance changes accordingly, the observer main part 80 of Embodiment 7 can change the inductance on the q-axis stator circuit side of the observer in accordance with the change of the motor inductance, thereby can improve the accuracy in the q-axis current estimation by the observer. The observer main part 80 of Embodiment 7 can further improve the accuracy in the motor speed estimation in the sensor-less speed control. Further, when the q-axis current iqs does not change fast, the observer main part 80 of Embodiment 7 operates in the same manner on the q-axis stator circuit side in the existing observer described in Equation (16). Therefore, there is an advantage in that the know-how such as the existing observer gain design can be continuously used as it is.

In FIG. 21 of Embodiment 6, the inductance information map LM4 or LM5 is referred to for generating the magnetic flux by inputting the current, but in Embodiment 7, a configuration is used in which the magnetic flux equivalent signal AC component σLs·i^qs2H, which is a signal equivalent to the magnetic flux, is inputted to generate the signal 88, which is a signal equivalent to the current, contrary to FIG. 21 of Embodiment 6. Note that in FIG. 23, in order to show that the inductance information maps LM4 and LM5 stored in the information storage device 72*a* are used to refer to the current from the magnetic flux in the reversed manner, the inductance information maps LM4 and LM5 are covered with frame lines indicated by symbols func1 and func2, respectively, and in the image diagrams of the inductance information maps LM4 and LM5, the vertical axis and the horizontal axis of FIG. 21 are reversed from each other. The frame line with the symbol func1 or func2 indicates the inverse function fΦ$^{-1}$ for converting the magnetic flux into the current in contrast to the function fΦ for converting the current into the magnetic flux. The inverse function func1 inversely refers to the inductance information map LM4, and the inverse function func2 inversely refers to the inductance information map LM5. The signal 88 output from the selecting unit 14*b* of the first calculation unit 81 is a signal calculated by the inverse function fΦ$^{-1}$ using the magnetic flux equivalent signal AC component σLs·i^qs2H as an argument. That is, the signal 88 is fΦ$^{-1}$ (σLs·i^qs2H). The signal 84 output from the selecting unit 14*d* of the first calculation unit 81 is a signal obtained by multiplying the negative resistance Rn and the q-axis current AC component iqsH. That is, the signal 84 is the voltage drop vn caused by the negative resistance Rn and is Rn·igsH. Note that, in FIG. 23, as described above, the flux equivalent signal AC component σLs·i^qs2H is expressed by using the magnetic flux estimated value Φ^a.

The voltage drop vn caused by the negative resistance Rn, the q-axis current estimated value i^qs, and the q-axis current estimated value AC component i^qsH described in FIG. 23 are expressed by Equation (18), Equation (19), and Equation (20), respectively. The value of Rn in Equation (18) is positive, and the addition in Equation (17) expresses that it is a negative resistance.

[Mathematical 18]

$$v_n = R_n \cdot i_{qsH} \quad (18)$$

[Mathematical 19]

$$\hat{i}_{qs} = \hat{i}_{qsH} + \hat{i}_{qs2L} \quad (19)$$

[Mathematical 20]

$$\hat{i}_{qsH} = f_\Phi^{-1}(\sigma L_s \cdot \hat{i}_{qs2H}) \quad (20)$$

Note that, although in Embodiment 7, an example is described in which the motor inductance information InfL of Embodiment 2 is applied to the observer main part 80, the motor inductance information InfL of Embodiment 1 may be applied. In this case, although Equation (16) to Equation (20) are changed, the observer main part 80 to which the motor inductance information InfL of Embodiment 1 is applied can also improve the current estimation accuracy of the observer 79 and further improve the estimation accuracy in the estimated value of the electrical angular speed, similarly to the observer main part 80 to which the motor inductance information InfL of Embodiment 2 is applied. Further, not only the motor inductance information InfL obtained by the q-axis AC energization but also the motor inductance information InfL obtained by AC energization on the d-axis side can be applied in the same manner, so that the current estimation accuracy in the observer 79 can be improved.

Figure 25:
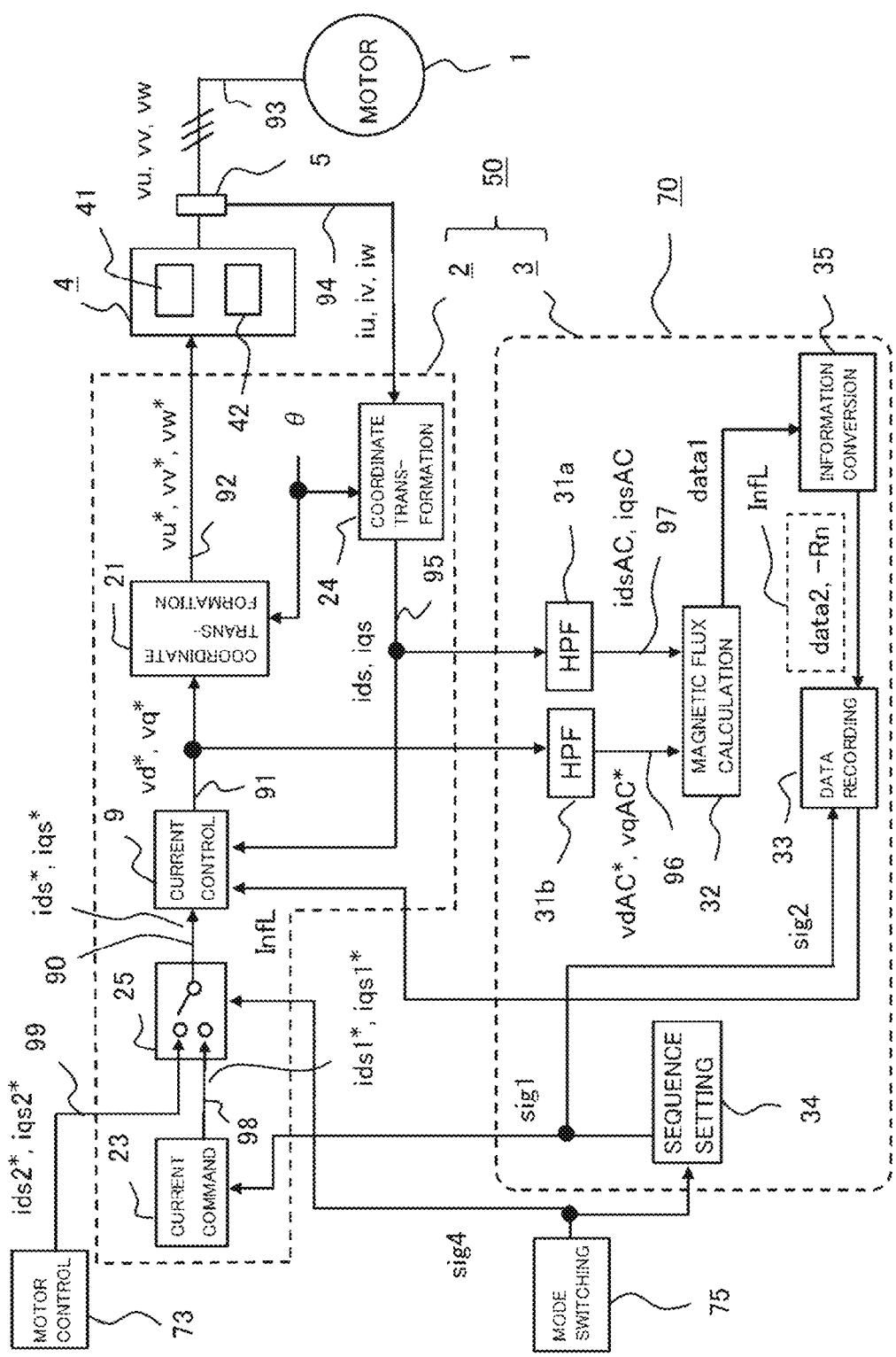
FIG. 25 is a diagram showing a configuration of a motor drive system according to Embodiment 8.

FIG. 25 shows a configuration example of a sensor-less control system for the motor 1 using the observer 79 in which the observer main part 80 described above is included. A motor control unit 73 shown in FIG. 24 is a specific configuration example for implementing the sensor-less control. The motor drive system 70 of Embodiment 7 includes the motor control unit 73, the current control unit 9, the coordinate transformation unit 21, and the coordinate transformation unit 24. The motor control unit 73 includes the observer 79, a slip frequency calculation unit 26, an adaptive identification unit 27, a speed control unit 28, subtractors 44a and 44b, an adder 45, an integrator 46, and a command generation unit 78. Equation (21) can be obtained by incorporating Equation (17) and Equation (18) of the observer main part 80 into Equation (12) of the observer 79 described above, and further transforming it into a form suitable for the sensor-less control.

[Mathematical 21]

$$p\begin{bmatrix}\hat{i}_{ds}\\\hat{i}_{qs2}\\\hat{\Phi}_{dr}\end{bmatrix} = \begin{bmatrix} -\left(\frac{R_s}{\sigma L_s}+\frac{R_r}{\sigma L_r}(1-\sigma)\right) & \omega & \frac{MR_r}{\sigma L_s L_r^2} \\ -\omega & -\left(\frac{R_s}{\sigma L_s}+\frac{R_r}{\sigma L_r}(1-\sigma)\right) & -\frac{\hat{\omega}_{re}M}{\sigma L_s L_r} \\ \frac{MR_r}{L_r} & 0 & -\frac{R_r}{L_r} \end{bmatrix}$$

$$\begin{bmatrix}\hat{i}_{ds}\\\hat{i}_{qs2}\\\hat{\Phi}_{dr}\end{bmatrix} + \begin{bmatrix}\frac{1}{\sigma L_s} & 0\\ 0 & \frac{1}{\sigma L_s}\\ 0 & 0\end{bmatrix}\begin{bmatrix}v_d\\v_q\end{bmatrix} + \begin{bmatrix}g_{11} & g_{12}\\g_{21} & g_{22}\\g_{31} & g_{32}\end{bmatrix}\begin{bmatrix}\hat{i}_{ds}-i_{ds}\\\hat{i}_{qs}-i_{qs}\end{bmatrix} + \begin{bmatrix}0\\\frac{1}{\sigma L_s}\\0\end{bmatrix}v_n \quad (21)$$

In the observer 79 for the sensor-less control shown in FIG. 24, the calculation of Equation (21) is performed. In Equation (21) and Equation (22) described later, the product of a mutual inductance M and the rotor resistance Rr is denoted by MRr. MRr is the same as M Rr in Equation (12). The calculation of Equation (21) for the d-axis current estimated value i^ds, which is the stator current estimated value on the d-axis side, and the d-axis magnetic flux estimated value Φ^dr of the rotor is substantially the same as in Equation (12). As described above, the calculation of the q-axis current estimated value i^qs of the stator is performed by calculating the q-axis current intermediate estimated value i^qs2 once according to Equation (17) and Equation (18) of the observer main part 80, and then Equation (19) and Equation (20) executed by the first calculation part 81 of the observer main part 80 are used. The observer 79 outputs a two-axis current estimated value 83. The two-axis current estimated value 83 has two components, namely, the d-axis current estimated value i^ds and the q-axis current estimated value i^qs. The vector notation of the two-axis current estimated value 83 is (i^ds, i^qs).

When the controller is configured on the dq-axis rotation coordinates as shown in FIG. 24, since the control is performed such that the d-axis coincides with a secondary magnetic flux vector of the motor 1, the q-axis magnetic flux estimated value Φ^qr of the rotor is controlled to be zero. Accordingly, an estimated value of the slip frequency, that is, an estimated value of the slip frequency ω^s is calculated by Equation (22) such that the q-axis magnetic flux estimated value Φ^qr becomes zero. The slip frequency calculation unit 26 calculates the slip frequency estimated value ω^s.

[Mathematical 22]

$$\hat{\omega}_s = \frac{\frac{MR_r}{L_r}\cdot\hat{i}_{qs2} + g_{41}\cdot(\hat{i}_{ds}-i_{ds}) + g_{42}\cdot(\hat{i}_{qs}-i_{qs})}{\hat{\Phi}_{dr}} \quad (22)$$

In Equation (22), i^qs−iqs and i^ds−ids represent a q-axis current estimation error 47a and a d-axis current estimation error 47b, respectively. The q-axis current estimation error 47a is the error between the q-axis current estimated value i^qs and the q-axis current iqs, and the d-axis current estimation error 47b is the error between the d-axis current estimated value i^ds and the d-axis current ids. The subtractor 44a calculates the error between the q-axis current estimated value i^qs and the q-axis current iqs to output the q-axis current estimation error 47a, and calculates the error between the d-axis current estimated value i^ds and the d-axis current ids to output the d-axis current estimation error 47b.

Further, an estimated speed ω^r is calculated by the adaptive identification processing shown in Equation (23). The adaptive identification unit 27 performs the calculation of Equation (23) and outputs the estimated speed ω^r. The subtractor 44b subtracts the estimated speed ω^r output from the adaptive identification unit 27 from the speed command ωr* generated by the command generation unit 78 and outputs a compensation speed command 48. The speed control unit 28 calculates the q-axis current command iqs* on the basis of the compensation speed command 48. The q-axis current command iqs* calculated by the speed control unit 28 is output to the current control unit 9 via the command generation unit 78. The command generation unit 78 generates the d-axis current command ids* and outputs it to the current control unit 9. Thus, the motor control unit 73 of Embodiment 7 performs the processing of the sensor-less speed control, so that the q-axis current command iqs* is calculated. Note that, when the sensor-less control is not performed, the command generation unit 78 generates the d-axis current command ids* and the q-axis current command iqs* for the predetermined control. When performing the speed control by the sensor-less control, the command generation unit 78 generates the speed command ωr* and outputs the q-axis current command iqs* output by the speed control unit 28 to the current control unit 9.

A variety of methods for the adaptive identification processing have been studied, but most of them perform PI control processing for the q-axis current estimation error 47a as shown in Equation (23).

[Mathematical 23]

$$\bar{\omega}_r = K_p \cdot (\hat{i}_{qs} - i_{qs}) + K_i \int (\hat{i}_{qs} - i_{qs})_{dt} \quad (23)$$

Where, Kp and Ki are proportional coefficients.

There are various methods for generating d-axis current command ids*. As described above, in the induction motor, the d-axis current command ids* is set to a fixed constant value or the d-axis current command ids* is not changed sharply, in most cases. Since the d-axis current command ids* is not changed sharply, the description of the d-axis current command ids* will be omitted. The adder 45 adds the estimated speed ω^r calculated by the adaptive identification unit 27 and the frequency estimated value ω^s calculated by the slip frequency calculation unit 26 to output a power supply frequency ω. The power supply frequency ω is integrated by the integrator 46 to output a coordinate transformation phase θ. By performing rotational coordinate transformation with this coordinate transformation phase θ, the d-axis and the secondary magnetic flux vector of the motor 1 that are described above can be made to coincide with each other.

As described above, by incorporating the motor inductance information InfL of Embodiment 1 or Embodiment 2, the observer main part 80 of Embodiment 7 improves the current estimation accuracy and improves the speed estimation accuracy in the sensor-less control. Further, in the motor drive system 70 equipped with the observer main part 80 of Embodiment 7, the speed control of the motor 1 can be performed fast; that is, the speed control response can be improved, and the speed control accuracy of the motor 1 can also be improved. FIG. 24 shows an example of the sensor-less control system using the observer 79 incorporating the observer main part 80, that is, an example of the motor control unit 73. The processing of the observer main part 80 described above is an example of the essential processing of the inductance in the electric circuit of the motor 1, and the motor control unit 73 shown in FIG. 24 is not a limitation in the application range. The processing of the observer main unit 80 can be satisfactory applied to a sensor-less control system using an observer and adaptive identification processing in another configuration, so that the effect is brought about in that the current estimation accuracy is improved and the speed estimation accuracy is improved in the sensor-less control.

The effect of incorporating the motor inductance information InfL of Embodiment 1 or Embodiment 2 into the observer main part 80 is not limited to the configuration based on the description in Equation (16) to Equation (20) but can be obtained by other configurations. For example, the motor inductance information InfL of Embodiment 1 or Embodiment 2 can be also incorporated into a state equation in which the observer feedback gains g11, g12, g21, g22, g31, g32, g41, and g42 are changed, a state variable of the observer is changed, the type of the motor 1 is changed, or the like. In this case as well, the observer current estimation accuracy can be improved, thereby obtaining the above-described effect.

Similarly to Embodiment 3, the observer main part 80 of Embodiment 7 may have a configuration in which the function is implemented by signal processing of a program executed on the processor 51 and a result of signal processing in a logic circuit provided on the processor. Also in this case, by using the motor inductance information InfL of Embodiment 1 or Embodiment 2, the observer main part 80 of Embodiment 7 can improve the current estimation accuracy of the observer and further improve the estimation accuracy in the estimated value of the electrical angular speed. Note that, although an example in which the observer 79 is included in the motor control unit 73 has been described, this example is not a limitation, and the observer 79 may be included in the motor drive system 70 outside the motor control unit 73.

As described above, the motor drive system 70 of Embodiment 7 is a motor drive system for controlling the motor 1. The motor drive system 70 of Embodiment 7 comprises the information storage devices 72, 72a, and 72b for storing the inductance information (motor inductance information InfL) generated by the motor inductance measurement device 50 according to any one of Embodiments 1 to 4, and the state estimator (observer 79) for estimating the state of the motor 1 using a mathematical model on the two-axis orthogonal rotation coordinates of the motor 1, and controls the motor 1 on the basis of the inductance information (motor inductance information InfL). The state estimator (observer 79) performs a state estimation calculation using the inductance information (motor inductance information InfL) corresponding to the two-axis current command (current command 90) or the two-axis current (dq-axis current 95). With this configuration, the motor drive system 70 of Embodiment 7 controls the motor 1 on the basis of the two-axis current estimated value (two-axis current estimated value 83) calculated using the inductance information (motor inductance information InfL), so that the current estimation accuracy and the speed estimation accuracy are improved, the current control response of the motor 1 is improved, and the response speed and the accuracy in the control of the motor 1 are improved.

Embodiment 8

FIG. 25 shows a configuration of a motor drive system according to Embodiment 8. The motor drive system 70 of Embodiment 8 is the motor drive system which includes the motor inductance measurement device 50. In Embodiment 5, the motor drive system 70 which is composed of the energization control device 71 is shown. The energization control device 71 of Embodiment 5 has circuit blocks in common with the motor inductance measurement device 50 of Embodiment 1 or Embodiment 2. Therefore, the motor drive system 70 of Embodiment 8 is configured such that the common circuit blocks are not duplicated. The motor drive system 70 of Embodiment 8 has a motor inductance measurement mode for measuring motor inductance information InfL of the motor 1 and a motor control mode for controlling the motor 1 to perform normal operation. The motor drive system 70 of Embodiment 8 records the motor inductance information InfL measured in the motor inductance measurement mode, and controls the motor 1 using the motor inductance information InfL in the motor control mode. Since the motor drive system 70 of Embodiment 8 controls the motor 1 using the motor inductance information InfL of Embodiment 1 or Embodiment 2, the motor drive system 70 of Embodiment 8 has the same effect as the motor drive system 70 of Embodiment 5 or Embodiment 6. That is, the motor drive system 70 of Embodiment 8 can improve the response speed and the accuracy in the control of the motor 1.

FIG. 25 shows an example of the motor drive system 70 of Embodiment 8. FIG. 25 shows an example of a case in which the configuration of the motor inductance measurement device 50 described in Embodiment 2 is combined with the current control unit 9 and the motor control unit 73 described in Embodiment 6. The motor drive system 70 of Embodiment 8 includes the energization control unit 2, the inductance calculation unit 3, the motor control unit 73, and a mode switching unit 75. The energization control unit 2 and the inductance calculation unit 3 constitute the motor inductance measurement device 50. The energization control unit 2, the motor control unit 73, and the mode switching unit 75 constitute the energization control device 71 described referring to FIG. 18. The energization control unit 2 of Embodiment 8 shown in FIG. 25 differs from the energization control unit 2 of Embodiment 2 shown in FIG. 7 in that a selecting unit 25 is added, the current control unit 22 is changed to the current control unit 9, and the motor inductance information InfL is transferred from the data recording unit 33 of the inductance calculation unit 3 to the current control unit 9. The inductance calculation unit 3 of Embodiment 8 shown in FIG. 25 is the same as the inductance calculation unit 3 of Embodiment 2 shown in FIG. 7 except that a path for transferring the motor inductance information InfL from the data recording unit 33 to the current control unit 9 is added. The motor drive system 70 of Embodiment 8 will be mainly described on the different parts from the motor inductance measurement device 50 of Embodiment 2 and the motor drive system 70 of Embodiment 6.

The mode switching unit 75 outputs a mode switching signal sig4 which gives an instruction to switch between the motor inductance measurement mode and the motor control mode. It can also be said that the mode switching unit 75 outputs the mode switching signal sig4 for setting either the motor inductance measurement mode or the motor control mode. The motor control mode can also be referred to as a non-measurement mode. The motor drive system 70 of Embodiment 8 is configured to measure the motor inductance information InfL prior to the actual operation of the motor 1. Specifically, the mode switching unit 75 outputs the mode switching signal sig4 indicating the motor inductance measurement mode in response to a mode change command (not shown) based on an instruction from an operator. For example, when the mode switching signal sig4 is at a high level potential, it indicates the motor inductance measurement mode, and when the mode switching signal sig4 is at a low level potential, it indicates the motor control mode. When the mode switching signal sig4 indicating the motor control mode is output from the mode switching unit 75, the inductance calculation unit 3 does not operate.

When the mode switching signal sig4 indicating the motor inductance measurement mode is output from the mode switching unit 75, the inductance calculation unit 3 operates to measure the motor inductance information InfL. In the case of the motor inductance measurement mode, the inductance calculation unit 3 outputs the measurement execution signal sig1 to the current command output unit 23 to cause the current command output unit 23 to operate, measures the motor inductance information InfL, and records the motor inductance information InfL in the data recording unit 33. When the mode switching signal sig4 indicating the motor control mode is output from the mode switching unit 75 to the inductance calculation unit 3, the inductance calculation unit 3 stops its operation, and the motor inductance information InfL is transferred from the data recording unit 33 to the information storage devices 72a and 72b of the current control unit 9. Note that, in the motor inductance measurement mode in which no data is stored in the information storage devices 72, 72a and 72b, the current control unit 9 generates the q-axis voltage command vq* in which the value of the compensation voltage command vqcmp* becomes zero, so that the same voltage command 91 as that in the current control unit 22 of Embodiment 1 or Embodiment 2 can be generated. More specifically, in the motor inductance measurement mode in which no data is stored in the information storage devices 72, 72a and 72b, since the signal values output from the selecting units 14b and 14d in FIGS. 20 and 21 become zero, the value of the compensation voltage command vqcmp* becomes zero. The adder 63a adds the value of the signal 69 and the value of the compensation voltage command vqcmp* which is zero to generate the q-axis voltage command vq*. Therefore, the current control unit 9 generates the q-axis voltage command vq* in which the value of the compensation voltage command vqcmp* has become zero. The current control unit 9 in the motor inductance measurement mode can implement the operation of the current control unit 22 of Embodiment 1 or Embodiment 2.

The energization control unit 2 operates in both the motor inductance measurement mode and the motor control mode. When the mode switching signal sig4 indicates the motor inductance measurement mode, the selecting unit 25 outputs the current command 98 output from the current command output unit 23 to the current control unit 9 as the current command 90. Further, when the mode switching signal sig4 indicates the motor control mode, the selecting unit 25 outputs the current command 99 output by the motor control unit 73 to the current control unit 9 as the current command 90. Note that the vector notation of the current command 98 is (ids1*, iqs1*), and the vector notation of the current command 99 is (ids2*, iqs2*). Here, the current command from the motor control unit 73 configured to control the torque of the motor 1 is used.

Note that, although an example is shown in which the information storage devices 72a and 72b are installed on the current control unit 9, the motor inductance information InfL may be read out from the data recording unit 33 when the current control unit 9 operates without the information storage devices 72a and 72b being installed on the current control unit 9. In this case, the information storage devices 72a and 72b can be deleted, and it is not necessary to transfer the motor inductance information InfL in advance from the data recording unit 33 to the information storage devices 72a and 72b of the current control unit 9.

The motor drive system 70 of Embodiment 8 may have a configuration in which the motor inductance measurement device 50 is operated in a role-sharing manner with the server 8 described in Embodiment 4. In addition, as described in Embodiment 4, the set of the motor inductance information InfL of the accumulated data data3 accumulated in the server 8, namely, the motor inductance information set InfLs may be used. In the motor drive system 70 of Embodiment 8, by configuring a part of or all of the components of the inductance calculation unit 3 on the server 8, it is possible to perform the processing required for the inductance calculation externally, and it is possible to reduce the processing resources to be provided in the device on which the energization control unit 2 is mounted, that is, the energization control device 71. Furthermore, in the motor drive system 70 of Embodiment 8, all the components of the inductance calculation unit 3 may be configured on the server 8, and the motor inductance information set InfLs of the accumulated data data3 accumulated in advance may be used via the communication network 7. In the case of the configuration described above, the motor 1 can be controlled in the motor control mode without executing the motor inductance measurement mode before executing the motor control mode. That is, in the motor drive system 70 of Embodiment 8, the motor 1 can be controlled quickly in the motor control mode by configuring all the components of the inductance calculation unit 3 on the server 8 and using the motor inductance information set InfLs of the accumulated data data3 accumulated in advance via the communication network 7.

In the measurement of the motor inductance information InfL described in Embodiment 1 or Embodiment 2, the AC energization on the dq-axis rotation coordinates is performed. Since the AC torque is generated when the AC energization on the dq-axis rotational coordinates is performed, it is assumed that there is a limitation in the magnitude of the current or there is a case where the AC energization is not possible, depending on the load device operated by the motor 1. In this case, the motor drive system 70 of Embodiment 8 should be configured to use the motor inductance information set InfLs of the accumulated data data3 accumulated in the server 8 in advance. Further, the motor drive system 70 of Embodiment 8 should be configured to include a data transfer unit which transmits a motor specification or a model name to the server 8, acquires a motor inductance information set InfLs of a motor having a similar specification from the accumulated data data3 of the server 8, and transfers the motor inductance information set to the information storage devices 72a and 72b of the current control unit 9. With this configuration, the motor drive system 70 of Embodiment 8 can use the motor inductance information InfL of Embodiment 1 or Embodiment 2 even when operating a load device which has a limitation in the magnitude of the current or in which the AC energization is not possible.

As described above, the motor drive system 70 of Embodiment 8 controls the motor 1 using the motor inductance information InfL of Embodiment 1 or Embodiment 2, so that the motor drive system 70 has the same effect as the motor drive system 70 of Embodiment 5 or Embodiment 6.

The motor drive system 70 of Embodiment 8 is a motor drive system for controlling the motor 1. The motor drive system 70 of Embodiment 8 comprises the mode switching unit 75 that sets either the motor control mode for controlling the motor 1 or the motor inductance measurement mode for measuring the inductance information (motor inductance information InfL) containing characteristics 56a and 56b (or 57b) regarding the instantaneous value of the AC magnetic flux (q-axis magnetic flux AC component ΦqsAC) corresponding to the instantaneous value of the AC current (q-axis current AC component iqsAC) flowing in the motor 1, the energization control unit 2 that performs energization control of the motor 1 in the motor inductance measurement mode such that the AC voltage (q-axis voltage AC component vqAC) is applied to at least one axis (q-axis) on the two-axis orthogonal rotation coordinates of the motor 1 to flow the AC current (q-axis current AC component iqsAC) and that performs the energization control of the motor 1 in the motor control mode such that the current (dq-axis current 95) is caused to flow to the two axes (d-axis, q-axis) on the two-axis orthogonal rotation coordinates of the motor 1, and the inductance calculation unit 3 that calculates the instantaneous value of the AC magnetic flux (q-axis magnetic flux AC current component ΦqsAC) by integrating the residual voltage obtained by subtracting the resistance voltage ((Rs+Rr) iqsAC or (Rs+Rr−Rn)·iqsAC) from the AC voltage (q-axis voltage AC component vqAC) in the motor inductance measurement mode, the residual voltage being obtained from the AC current (q-axis current AC component iqsAC) of the motor 1 based on the detection current 94 detected from the motor 1, and from the resistances ((stator resistance Rs, rotor resistance Rr) or (stator resistance Rs, rotor resistance Rr, negative resistance Rn) of the motor 1, and that generates the characteristic of the instantaneous value of the AC flux (q-axis magnetic flux AC component ΦqsAC) corresponding to the instantaneous value of the AC current (q-axis current AC component iqsAC) as the inductance information (motor inductance information InfL). In the motor drive system 70 of Embodiment 8, in the motor control mode, the energization control unit 2 controls the motor 1 on the basis of the two-axis current command (current command 90) for controlling the current (dq-axis current 95) flowing for the two axes (d-axis and q-axis) on the two-axis orthogonal rotation coordinates of the motor 1 and the inductance information (motor inductance information InfL). With this configuration, since the motor drive system 70 of Embodiment 8 controls the motor 1 on the basis of the two-axis current command (current command 90) and the inductance information (motor inductance information InfL), the current control response of the motor 1 can be improved, and the response speed and the accuracy in the control of the motor 1 can be improved.

Note that, although various exemplary embodiments and examples are described in the present application, various features, aspects, and functions described in one or more embodiments are not inherent in a particular embodiment and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component in another embodiment are included.

DESCRIPTION OF REFERENCE NUMERALS AND SIGNS

1 motor, 2 energization control unit, 3 inductance calculation unit, 7 communication network, 8 server, 9 current control unit, 10 voltage command generation unit, 11 voltage command compensation unit, 22 current control unit, 32 magnetic flux calculation unit, 33 data recording unit, 34 sequence setting unit, 35 information conversion unit, 50 motor inductance measurement device, 56a, 56b, 57a, 57b characteristic, 58 processor, 59 storage device, 70 motor drive system, 72, 72a, 72b information storage device, 73 motor control unit, 75 mode switching unit, 79 observer (state estimator), 83 two-axis current estimated value, 90 current command (two-axis current command), 91 voltage command (two-axis voltage command), 94 detection current, 95 dq-axis current (two-axis current), Iac1 AC signal amplitude, Idc1 DC signal value, Idc2 DC signal value, Iacm maximum value of AC signal amplitude, InfL motor inductance information (inductance information), data1 loop-shaped magnetic flux data (first magnetic flux data), data2 non-loop-shaped magnetic flux data (second magnetic flux data), sig1 measurement execution signal, Rs stator resistance, Rr rotor resistance, Rn negative resistance (resistance type parameter), vqAC q-axis voltage AC component (AC voltage), iqsAC q-axis current AC component (AC current), ΦqsAC q-axis magnetic flux AC component (AC magnetic flux), vqcmp* compensation voltage command

The invention claimed is:

1. A motor inductance measurement comprising:
an energization control circuitry to perform energization control of the motor such that an AC voltage is applied to at least one axis on two-axis orthogonal rotation coordinates of the motor to cause the AC current to flow; and
an inductance calculation circuitry to generate the characteristic of the instantaneous value of the AC magnetic flux corresponding to the instantaneous value of the AC current as the inductance information by calculating the instantaneous value of the AC magnetic flux by integrating a residual voltage which is obtained by subtracting a resistance voltage from the AC voltage, the resistance voltage being obtained from the AC current of the motor based on a detection current detected from the motor, and from resistances of the motor, wherein
the inductance calculation circuitry includes a magnetic flux calculation circuitry that calculates the AC magnetic flux having a first shape in a characteristic with respect to the AC current and generates first magnetic flux data that is the characteristic of the instantaneous value of the AC current corresponding to the instantaneous value of the AC magnetic flux, and an information conversion circuitry that converts the first magnetic flux data into second magnetic flux data having a second shape using a resistance type parameter, and
the inductance calculation circuitry generates the second magnetic flux data and the resistance type parameter at a time of the second magnetic flux data that is generated, as the inductance information.

2. The motor inductance measurement device according to claim 1, wherein the inductance calculation circuitry includes a magnetic flux calculation circuitry that calculates the AC magnetic flux having a first shape in a characteristic with respect to the AC current and generates first magnetic flux data that is the characteristic of the instantaneous value of the AC current corresponding to the instantaneous value of the AC magnetic flux, and the inductance calculation circuitry generates the first magnetic flux data as the inductance information.

3. The motor inductance measurement device according to claim 2, wherein the inductance calculation circuitry includes a sequence setting circuitry that outputs at least one measurement execution signal containing an amplitude command value of the AC current and a command value of a magnitude of a DC current to the energization control circuitry such that a DC voltage is further applied to an axis to which the AC voltage is applied to cause the DC current to flow in a superimposed manner, and
the energization control circuitry performs energization control of the motor based on the at least one measurement execution signal such that the AC current and the DC current flow to the axis of the motor to which the AC voltage is applied.

4. The motor inductance measurement device according to claim 1, wherein the inductance calculation circuitry includes a sequence setting circuitry that outputs at least one measurement execution signal containing an amplitude command value of the AC current and a command value of a magnitude of a DC current to the energization control circuitry such that a DC voltage is further applied to an axis to which the AC voltage is applied to cause the DC current to flow in a superimposed manner, and
the energization control circuitry performs energization control of the motor based on the at least one measurement execution signal such that the AC current and the DC current flow to the axis of the motor to which the AC voltage is applied.

5. The motor inductance measurement device according to claim 1, wherein the inductance calculation circuitry includes a sequence setting circuitry that outputs at least one measurement execution signal to the energization control circuitry, the at least one measurement execution signal containing an amplitude command value of the AC current caused to flow to a first axis that is the axis to which the AC voltage is applied and a command value of a magnitude of a first axis DC current that is a DC current, and also containing a command value of a magnitude of a second axis DC current that is a DC current caused to flow to a second axis that is an axis different from the first axis and to which the DC voltage is applied, and
the energization control circuitry performs energization control of the motor so as to cause the AC current and the first axis DC current to flow to the first axis on the two-axis orthogonal rotation coordinates of the motor and performs energization control of the motor so as to cause the second axis DC current to flow to the second axis, based on the at least one measurement execution signal.

6. The motor inductance measurement device according to claim 4, wherein the inductance calculation circuitry in which the sequence setting circuitry outputs, to the energization control circuitry, a plurality of the measurement execution signals in which the amplitude command value of the AC current and the command value of the magnitude of the DC current are changed generates a plurality of pieces of the inductance information based on the detection current of the motor operated by each of the measurement execution signals.

7. The motor inductance measurement device according to claim 5, wherein the inductance calculation circuitry in which the sequence setting circuitry outputs, to the energization control circuitry, a plurality of the measurement execution signals in which the amplitude command value of the AC current to be applied to the first axis, the command value of the magnitude of the first axis DC current, and the command value of the magnitude of the second axis DC current to be applied to the second axis are changed generates a plurality of pieces of the inductance information based on the detection current of the motor operated by each of the measurement execution signals.

8. The motor inductance measurement device according to claim 1, wherein the inductance calculation circuitry includes a data recording circuitry to record the inductance information.

9. The motor inductance measurement device according to claim 1, wherein a function of the inductance calculation circuitry is implemented by a program stored in a storage device of a server and a processor to execute the program, and the server is connected to the energization control circuitry via a communication network.

10. A motor drive system for controlling a motor, comprising: an information storage device to store the inductance information generated by the motor inductance measurement device according to claim 1, wherein the motor is controlled based on the inductance information.

11. The motor drive system according to claim 10, further comprising:
a current control circuitry to output a two-axis voltage command for controlling a voltage to be applied to two axes on the two-axis orthogonal rotation coordinates of the motor;

a motor control circuitry to output a two-axis current command for controlling a current to flow to the two axes on the two-axis orthogonal rotation coordinates of the motor,
wherein the current control circuitry includes a voltage command generation circuitry that generates an initial two-axis voltage command from the two-axis current command output from the motor control circuitry, and
a voltage command compensation circuitry that calculates the instantaneous value of the AC magnetic flux corresponding to the instantaneous value of the AC current from the inductance information corresponding to the two-axis current command or the two-axis current and generates a compensation voltage command based on the instantaneous value of the AC magnetic flux, and the current control circuitry generates the two-axis voltage command by compensating for the initial two-axis voltage command based on the compensation voltage command.

12. The motor drive system according to claim 10, further comprising: a state estimator to estimate a state of the motor using a mathematical model constructed on the two-axis orthogonal rotation coordinates of the motor, wherein the state estimator performs a state estimation calculation using the inductance information corresponding to the two-axis current command or the two-axis current.

13. A motor drive system for controlling a motor, comprising:
a mode switching circuitry to set either a motor control mode for controlling the motor or a motor inductance measurement mode for measuring inductance information containing a characteristic of an instantaneous value of an AC magnetic flux corresponding to an instantaneous value of an AC current flowing in the motor;
an energization control circuitry to perform energization control of the motor in the motor inductance measurement mode such that an AC voltage is applied to at least one axis on two-axis orthogonal rotation coordinates of the motor to cause the AC current to flow and to perform energization control of the motor in a motor control mode such that a current is caused to flow to two axes on the two-axis orthogonal rotation coordinates of the motor; and
an inductance calculation circuitry to generate a characteristic of the instantaneous value of the AC magnetic flux corresponding to the instantaneous value of the AC current as the inductance information by calculating the instantaneous value of the AC magnetic flux by integrating a residual voltage obtained by subtracting a resistance voltage from the AC voltage in the motor inductance measurement mode, the resistance voltage being obtained from the AC current of the motor based on a detection current detected from the motor, and from resistances of the motor, wherein
the energization control circuitry controls, in a motor control mode, the motor based on the inductance information and a two-axis current command that controls the current flowing to the two axes on the two-axis orthogonal rotation coordinates of the motor, wherein
the inductance calculation circuitry includes a magnetic flux calculation circuitry that calculates the AC magnetic flux having a first shape in a characteristic with respect to the AC current and generates first magnetic flux data that is the characteristic of the instantaneous value of the AC current corresponding to the instantaneous value of the AC magnetic flux, and an information conversion circuitry that converts the first magnetic flux data into second magnetic flux data having a second shape using a resistance type parameter, and the inductance calculation circuitry generates the second magnetic flux data and the resistance type parameter at a time of the second magnetic flux data that is generated, as the inductance information.

14. The motor drive system according to claim 13, wherein the inductance calculation circuitry includes a magnetic flux calculation circuitry that calculates the AC magnetic flux having a first shape in a characteristic with respect to the AC current and generates first magnetic flux data that is the characteristic of the instantaneous value of the AC current corresponding to the instantaneous value of the AC magnetic flux, and the inductance calculation circuitry generates the first magnetic flux data as the inductance information.

15. A motor inductance measurement method comprising:
a current command setting step of setting a current value of at least one current command for controlling a current flowing in two axes on two-axis orthogonal rotation coordinates of the motor such that an AC voltage is applied to at least one axis on the two-axis orthogonal rotation coordinates of the motor to flow the AC current;
a current detection step of detecting a detection current from the motor based on the at least one current command set in the current command setting step; and
an inductance information generation step of generating the characteristic of the instantaneous value of the AC magnetic flux corresponding to the instantaneous value of the AC current as the inductance information by calculating the instantaneous value of the AC magnetic flux by integrating a residual voltage obtained by subtracting a resistance voltage from the AC voltage, the resistance voltage being obtained from the AC current of the motor based on the detection current detected in the current detection step and from resistances of the motor,
wherein
the inductance information generation step comprises:
a magnetic flux data generation step of calculating the AC magnetic flux whose characteristic with respect to the AC current has the first shape and generating first magnetic flux data which is the characteristic of the instantaneous value of the AC current corresponding to the instantaneous value of the AC magnetic flux;
a magnetic flux data conversion step of converting the first magnetic flux data generated in the magnetic flux data generation step into second magnetic flux data having a second shape using a resistance type parameter; and
an information generation step of generating the second magnetic flux data generated in the magnetic flux data conversion step and the resistance type parameter at a time of the second magnetic flux data that is generated, as the inductance information.

16. The motor inductance measurement method according to claim 15, wherein in the inductance information generation step, the AC magnetic flux having a first shape in a characteristic with respect to the AC current is calculated, and first magnetic flux data that is the characteristic of the instantaneous value of the AC current corresponding to the instantaneous value of the AC magnetic flux is generated as the inductance information.

17. The motor inductance measurement method according to claim 15, further comprising:

a current command change step of changing the current value of the at least one current command; and a measurement end determination step of determining whether the motor is energized or not by a plurality of the current commands that are predetermined, wherein in the current command change step, the current value of the at least one current command is changed after the current command setting step, the current detection step, and the inductance information generation step under one energization condition are executed, and the current command setting step, the current detection step, and the inductance information generation step under another energization condition that is set by another of the at least one current command changed in the current command change step are executed until the motor is determined to have been energized by all of the current commands in the measurement end determination step.

\* \* \* \* \*